(12) United States Patent
Foucault et al.

(10) Patent No.: US 11,759,674 B2
(45) Date of Patent: Sep. 19, 2023

(54) KINOPED LOWER EXTREMITY PERFORMANCE IMPROVEMENT, INJURY PREVENTION, AND REHABILITATION SYSTEM

(71) Applicant: Andre Foucault, Victoriaville (CA)

(72) Inventors: Andre Foucault, Victoriaville (CA); Dan Niccum, Carmichael, CA (US); Philippe Morin, Granby (CA)

(73) Assignee: Andre Foucault, Victoriaville (CA)

( * ) Notice: Subject to any disclaimer, the term of this patent is extended or adjusted under 35 U.S.C. 154(b) by 74 days.

(21) Appl. No.: 17/195,575

(22) Filed: Mar. 8, 2021

(65) Prior Publication Data

US 2021/0187349 A1 Jun. 24, 2021

Related U.S. Application Data

(62) Division of application No. 16/562,040, filed on Sep. 5, 2019, now Pat. No. 10,940,362.

(51) Int. Cl.
*A63B 23/04* (2006.01)
*A63B 21/00* (2006.01)
(Continued)

(52) U.S. Cl.
CPC ...... *A63B 23/0429* (2013.01); *A63B 21/0085* (2013.01); *A63B 21/4034* (2015.10);
(Continued)

(58) Field of Classification Search
CPC ............ A63B 23/0429; A63B 71/0622; A63B 23/03541; A63B 21/0085; A63B 24/0087;
(Continued)

(56) References Cited

U.S. PATENT DOCUMENTS

| 2,966,905 A | 1/1961 | Kamenshine |
| 8,249,714 B1 * | 8/2012 | Hartman ......... A63B 23/03525 |
| | | 607/48 |

(Continued)

FOREIGN PATENT DOCUMENTS

| CN | 206566167 U * | 10/2017 | ............. A61B 5/112 |
| CN | 111419644 B * | 9/2020 | ........... A61H 1/0237 |

(Continued)

OTHER PUBLICATIONS

International Search Report, dated Dec. 21, 2020, for corresponding International Application No. PCT/US2020/049583, pp. 1-2.

(Continued)

*Primary Examiner* — Andrew S Lo
(74) *Attorney, Agent, or Firm* — Intellectual Property Law Group LLP

(57) ABSTRACT

A ground-effect footplate against which a user applies plantar force and moves their foot in 3D across all seven lower-extremity biomechanical axes to accomplish specific as well as global ambulatory objectives related to lower extremity performance improvement, injury prevention and rehabilitation. A device comprising at least one articulating leg connected to a ground-effect footplate and a surface for a user to position against. The device can be used in conjunction with software to create virtual ambulatory environments that mimic GRFVs and cause moments of force that initiate muscular activations that substantially mimic human ambulation, and can couple those movements with non-functional movements in order to improve ROM, speed, strength, and proprioception.

8 Claims, 51 Drawing Sheets

(51) Int. Cl.
*A63B 21/008* (2006.01)
*A63B 24/00* (2006.01)
*A63B 71/06* (2006.01)
*A63B 23/035* (2006.01)
*A63F 13/24* (2014.01)

(52) U.S. Cl.
CPC .... *A63B 23/03541* (2013.01); *A63B 24/0087* (2013.01); *A63B 71/0622* (2013.01); *A63B 2023/0441* (2013.01); *A63B 2024/0093* (2013.01); *A63B 2024/0096* (2013.01); *A63B 2208/0233* (2013.01); *A63B 2208/0252* (2013.01); *A63B 2220/833* (2013.01); *A63B 2225/09* (2013.01); *A63F 13/24* (2014.09)

(58) Field of Classification Search
CPC ........ A63B 21/4034; A63B 2208/0252; A63B 2225/09; A63B 2220/833; A63B 2024/0096; A63B 2023/0441; A63B 2024/0093; A63B 2208/0233; A63B 22/0605; A63B 24/0062; A63B 71/0054; A63B 2071/0638; A63B 2071/063; A63B 2071/0666; A63B 2071/0675; A63B 2071/0683; A63B 2220/10; A63B 2220/16; A63B 2220/40; A63B 2220/51; A63B 2220/803; A63B 2225/20; A63B 2225/50; A61H 3/008; A61H 3/00; A61H 2201/164; A61H 2201/1628; A61H 2201/1676; A63F 13/24
See application file for complete search history.

(56) References Cited

U.S. PATENT DOCUMENTS

| | | |
|---|---|---|
| 9,987,188 B1 | 6/2018 | Diao |
| 2007/0016116 A1 | 1/2007 | Reinkensmeyer et al. |
| 2010/0285882 A1 | 11/2010 | Hsu |
| 2011/0066088 A1* | 3/2011 | Little ................ A61H 3/00 601/35 |
| 2011/0256983 A1* | 10/2011 | Malack ............ A63B 21/4015 482/4 |
| 2014/0277739 A1* | 9/2014 | Kornbluh ............ F16D 28/00 29/428 |
| 2015/0297934 A1* | 10/2015 | Agrawal ............ A61H 1/0266 482/4 |
| 2017/0027803 A1* | 2/2017 | Agrawal ............ A61B 5/1122 |
| 2017/0035638 A1* | 2/2017 | Koenig ............ A61H 1/0262 |
| 2017/0061817 A1 | 3/2017 | May |
| 2018/0071580 A1* | 3/2018 | Lee ................ A61H 3/00 |
| 2018/0085276 A1* | 3/2018 | Brodard ............ A61N 1/0484 |
| 2018/0207467 A1* | 7/2018 | Shimizu ............ A63B 21/4041 |
| 2019/0054342 A1* | 2/2019 | Christy ............ A63B 21/4009 |

FOREIGN PATENT DOCUMENTS

| | | | |
|---|---|---|---|
| GB | 2561605 A * | 10/2018 | ............ A61B 5/112 |
| WO | WO-2009125347 A2 * | 10/2009 | ........... A61H 1/0214 |

OTHER PUBLICATIONS

Written Opinion of the International Searching Authority, dated Dec. 21, 2020, for corresponding International Application No. PCT/US2020/049583, pp. 1-5.

* cited by examiner

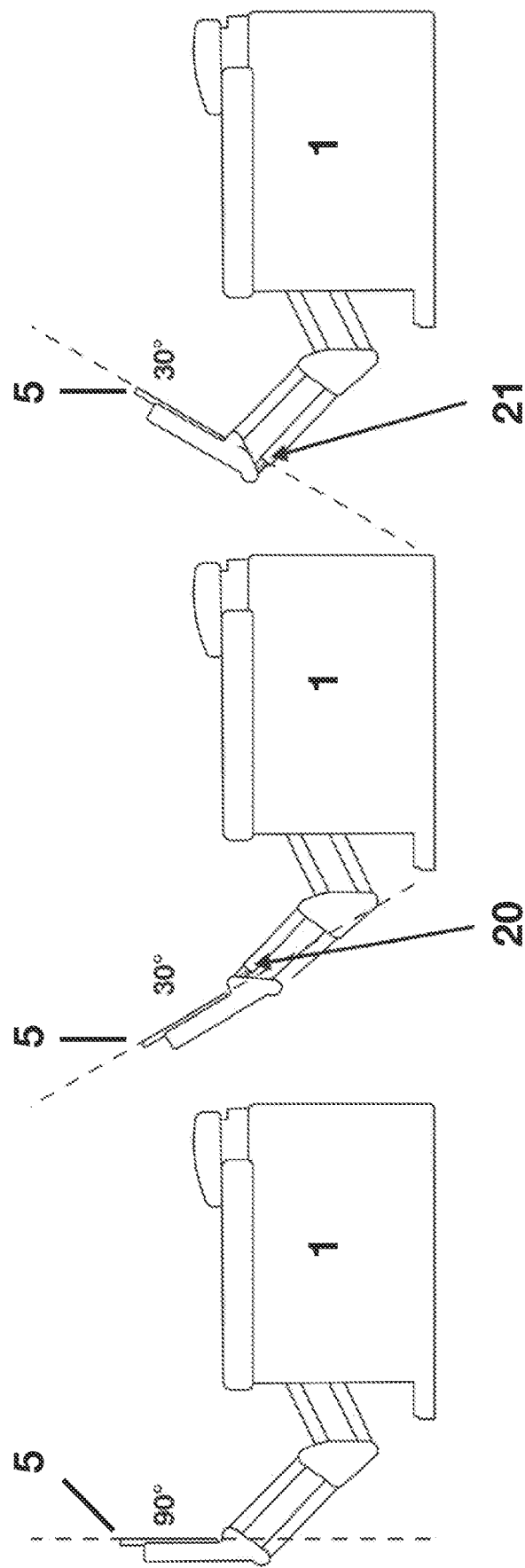

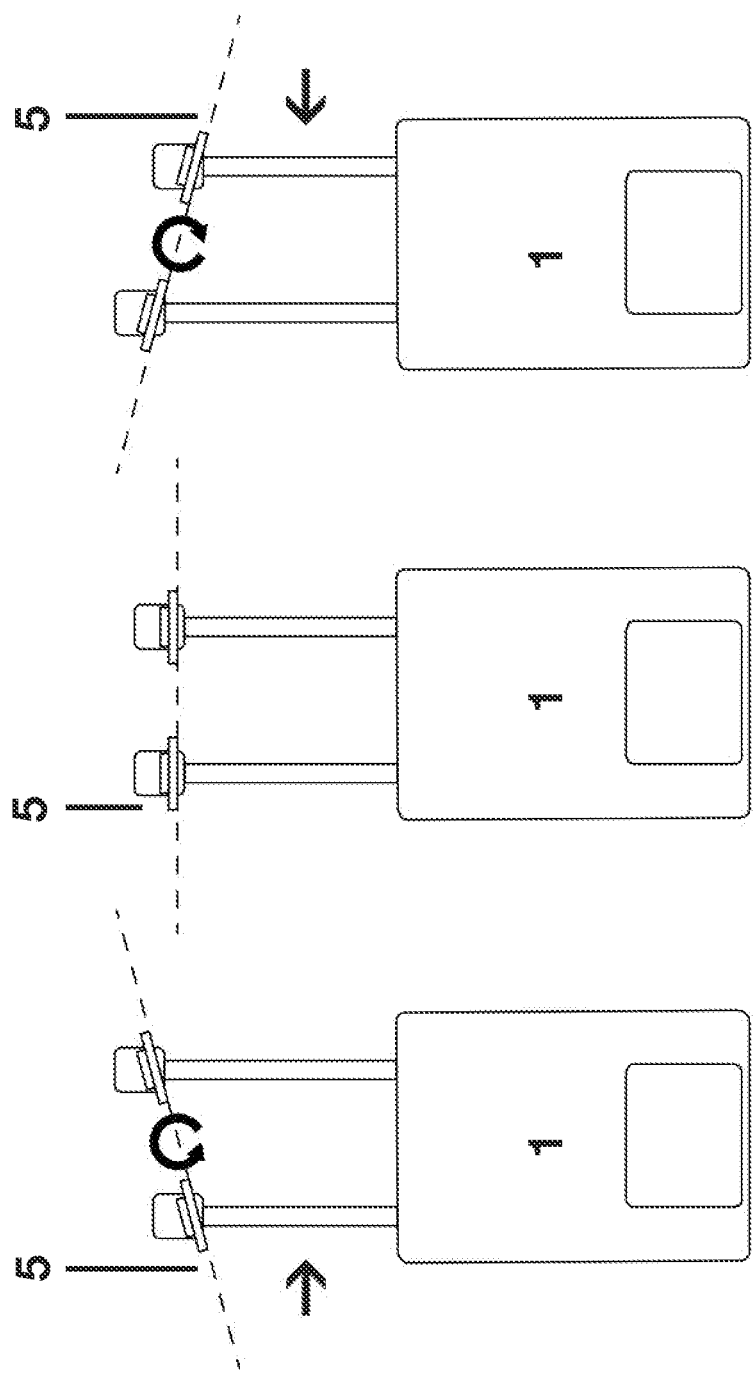

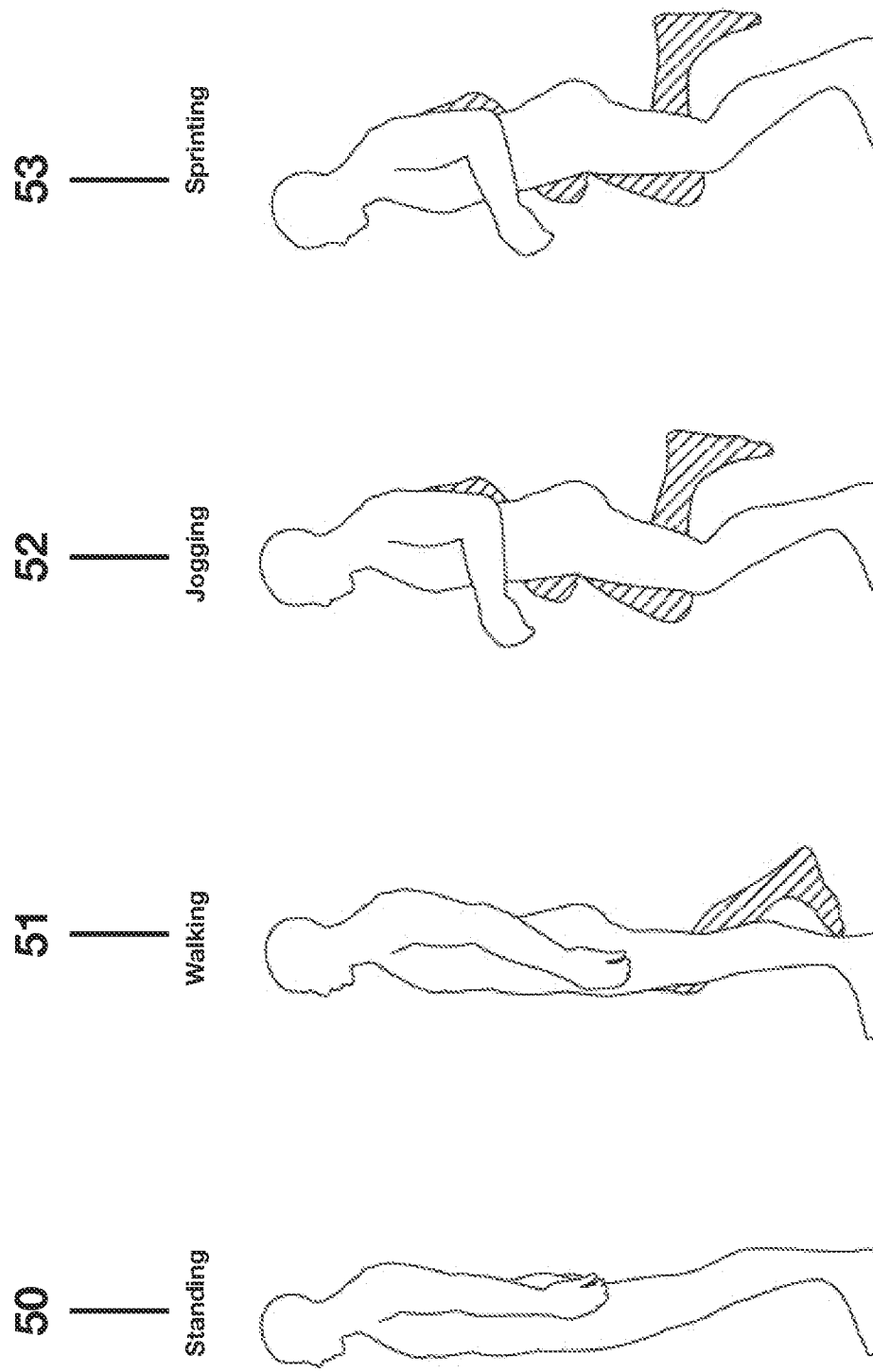

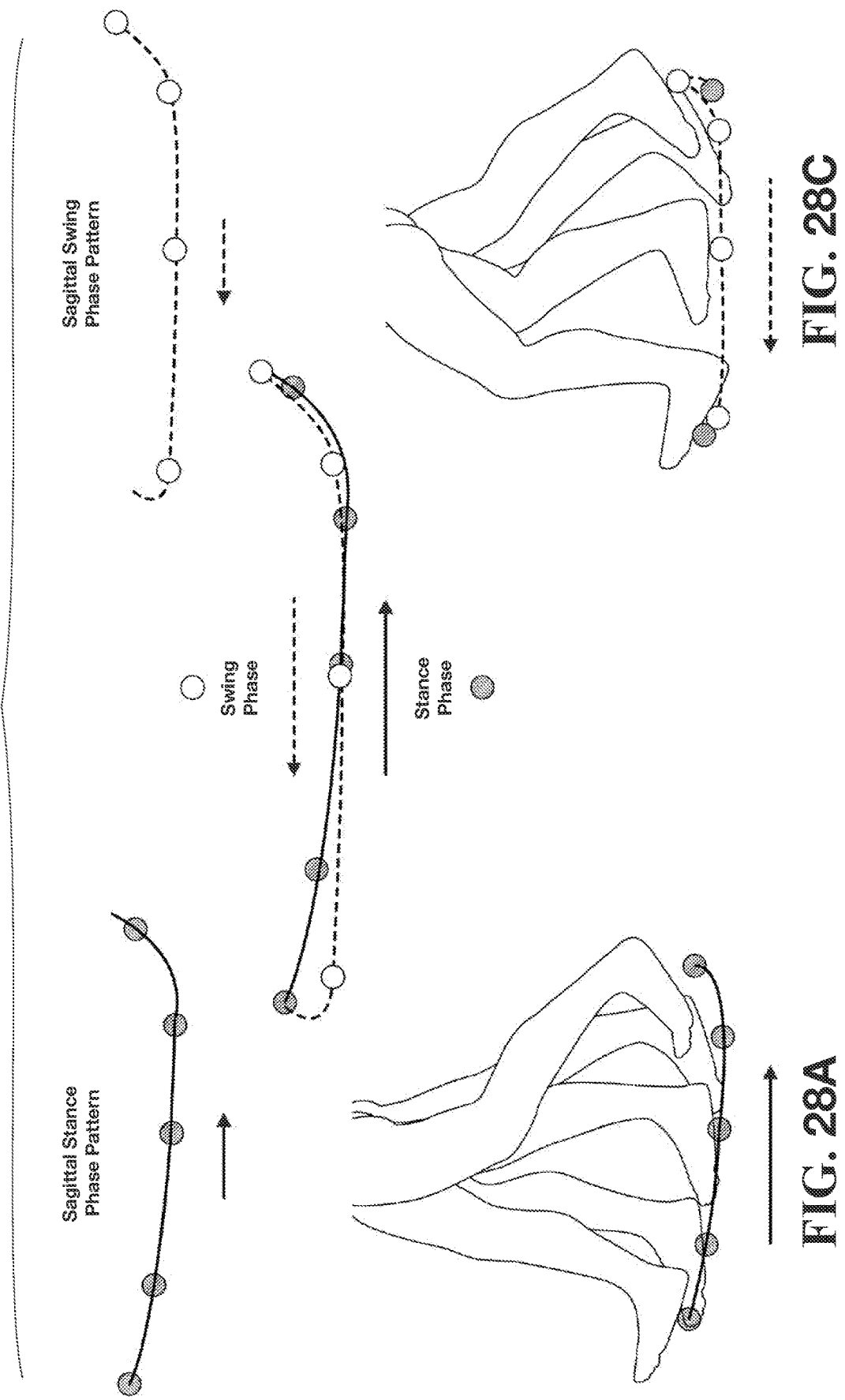

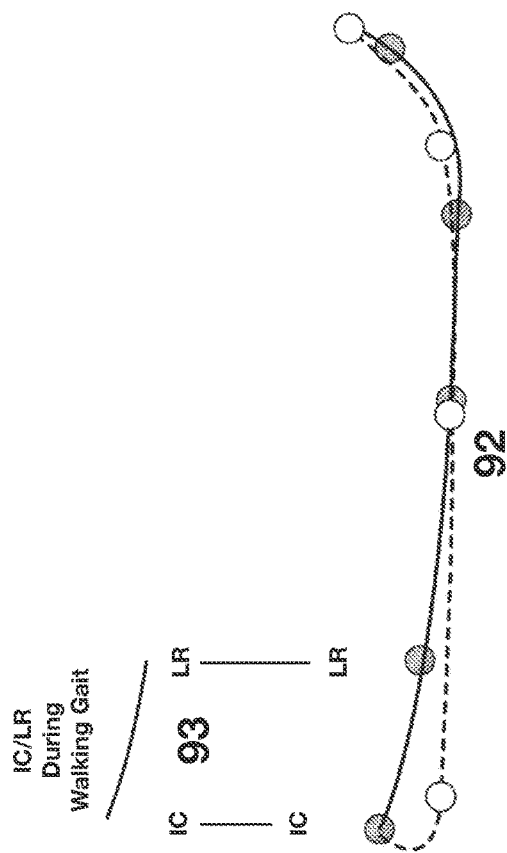

FIG. 32A

IC to LR VPE Moments of Force and Muscular Activations

| | Frontal Plane | Sagittal Plane | Transverse Plane |
|---|---|---|---|
| Force Moments Around Joints | • Foot Pronation Moment<br>• Knee Varus Moment<br>• Hip Adduction Moment | • Plantar Flexion Moment<br>• Knee Flexion Moment<br>• Hip Flexion Moment | |
| Muscular Activations | • Eccentric Supinators<br>• Eccentric Hip Abductors | • Eccentric Dorsiflexors<br>• Eccentric Quadriceps<br>• Eccentric Hip Extensors | • Eccentric Foot Abductors<br>• Eccentric Hip External Rotators |

FIG. 32B

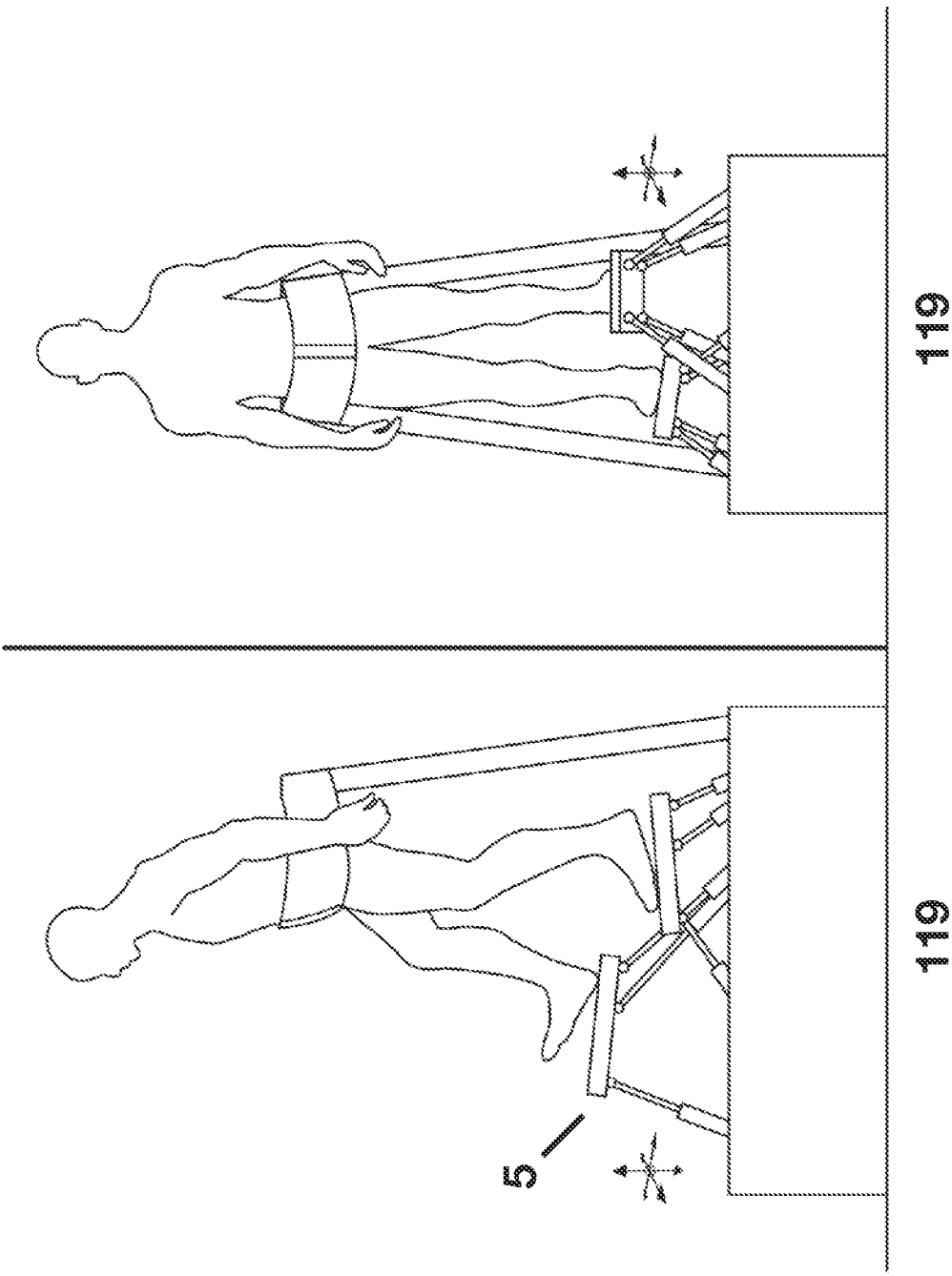

KINOPED LOWER EXTREMITY PERFORMANCE IMPROVEMENT, INJURY PREVENTION, AND REHABILITATION SYSTEM

CROSS-REFERENCE TO RELATED APPLICATION

This application is a divisional of U.S. patent application Ser. No. 16/562,040, filed on Sep. 5, 2019, and entitled "Kinoped Lower Extremity Performance Improvement, Injury Prevention, and Rehabilitation System". All of which is hereby incorporated by reference in its entirety.

BACKGROUND OF THE INVENTION

1. Field of the Invention

Embodiments of the present invention relates to a comprehensive lower extremity exercise device; specifically, embodiments relate to a device that produces variable resistance on three axes through a "ground-effect" footplate that moves in 3-dimension (3D), creating simulated ambulatory environments throughout a user's functional range of motion (ROM) and across various modes of ambulation. The user manages external forces (resistance) with plantar force against the footplate as they move their foot through functional motion patterns, thus experiencing simulated ground reaction force vectors (GRFVs) with variable simulated gravitational values and inertial values. The user reacts to the resistance of the footplate by applying plantar force in order to load the joints and allow for the moments of force that initiate specific muscular activations in specific sequences.

2. Background

Current devices and protocols attempt to accomplish functional lower extremity objectives such as biomechanical performance improvement (i.e., strength, speed, endurance, proprioception, ROM, and motor control), prevention of injuries (i.e., ligament, tendon, and muscle tears and strains), and correction of ambulatory kinematics (patterns of movement during gait and running) and kinetics (muscular activation patterns). However, these approaches fail to adequately address global ambulatory objectives. This inability of existing devices and programs to effectively manage interconnected neuromuscular challenges has significantly impacted individual and societal ambulatory health and fitness, a situation that has been exacerbated by radical changes to our ambulatory environment and physical activity levels.

Although human ambulation may appear to be a linear experience, in fact it is a complex 3D body mass displacement process that relies on constant weight transfers across alternate supporting legs. Recent gait analysis studies have defined the significant biomechanical challenges faced by the legs in order to adapt to the ground forces that must be managed during ambulation. Ground reaction vectors are primarily implemented by changing gravitational forces, acceleration, and inertia acting on the moving center of mass. At ground level, these forces are also conditioned by two integrated factors acting on both sagittal and frontal planes: Fluctuating angular leg positioning and plantar rocking relative to (normally) stable ground. Accordingly, effective lower extremity health and fitness protocols must address the functional challenges of ambulation by providing for plantar contact and replicating the ground forces experienced during human ambulation.

Ambulation strategies rely on deeply integrated neurological and biomechanical systems that control complex eccentric/concentric muscular activations along kinetic chains. Such specific 3D joint movements allow the body to respond to ground forces while maintaining proper biomechanical alignment and following precise kinetic and kinematic patterns during ambulation. These ambulatory strategies evolved in a 3D world where every step required acute kinesthetic awareness and the continuous involvement of hip and foot/ankle-complex stabilizers. As humans have abandoned rural lifestyles for urban ones, the physical environments over which we ambulate have been radically flattened, largely due to the advent of compacted asphalt (patented 1903) and concrete (patented 1911) roads and walkways, which have replaced the dirt, stone, and gravel roads and trails on which we previously trod. In effect, we have transformed our natural 3D ambulatory environment into a largely two-dimensional (2D) environment that significantly reduces muscular activation and diminishes the need for precise neuromuscular control. The mostly automatic process of ambulating over "safe" surfaces without a means to replace the biomechanical challenges of ambulating across a variable 3D environment has contributed to an epidemic of poor ambulatory health and led to decreased proprioception and a resultant increase in lower extremity injuries.

Over the past 50 years, significant technological advances have revolutionized lower extremity surgical devices, procedures, and techniques. At the same time, sophisticated technological approaches and intensive research have improved injury diagnosis and have significantly advanced our understanding of kinematics, kinetics, and biomechanics. However, the devices and protocols used to accomplish lower extremity performance improvement, injury prevention, and rehabilitation objectives have not kept pace with these advances.

The difficulty of addressing specific lower extremity muscle groups in a functional manner has led to a plethora of products and protocol, including devices that either partially or fully stabilize the body and pelvis (i.e., leg press, bicycle, leg lifts). For the most part, the isolation of leg movements is either an unintended consequence in the design of these products (i.e. bicycle, leg press), or an attempt to isolate specific muscle groups (i.e., ground-based leg lifts, adduction/abduction devices). During gait, leg movements are combined with 3D pelvic movements to allow ambulation using an alternating-leg approach. Existing stable-pelvis approaches attempt to fulfill multiple goals such as addressing specific biomechanical deficits, promoting progressive training parameters, facilitating real-time performance monitoring, and improving cardiovascular health. But these current devices that stabilize the pelvis cannot account for these combined pelvic/leg motions. Furthermore, because they are absent a moving body mass, they cannot replicate the kinematic and kinetic requirements of ambulation, including the two-plane plantar rocking phase that is central to managing ground reaction forces.

Current devices used to improve lower extremity performance (including, but not limited to, bicycles, stationary cycles, elliptical machines, treadmills, leg presses, balance trainers, and adduction/abduction machines) may accomplish isolated objectives, but they cannot comprehensively address the full spectrum of requirements necessary for optimal ambulatory performance.

For example, stationary cycles improve cardiovascular fitness, but alter ambulation kinematics and even kinetics because they 1) place the hips in a non-ambulatory flexed position that operates outside of the functional sagittal ROM of walking and running gaits, 2) operate predominantly on a single plane (sagittal) in a seated position, which significantly limits the activation of hip stabilizers, 3) rely primarily on a single major muscle group (quadriceps), thus contributing to muscular imbalance (i.e., hamstrings), 4) automate lower extremity performance, which contributes to decreased kinesthetic proprioception, 5) operate primarily in a concentric mode, limiting critical eccentric involvement, and 6) bypass plantar rocking in favor of a mid-sole application of force that fails to replicate the functional ground reaction force vectors (GRFVs) experienced during ambulation. Ground forces load the joints and allow for the creation of the moments of force that initiate sequential activations of lower extremity muscular groups.

In another example, powered treadmills may improve cardiovascular fitness and support functional kinematics, but alter kinetics because they 1) provide powered propulsion, reducing the concentric activation of hip extensors and plantar flexors during terminal stance and 2) exaggerating eccentric hip flexor responses during loading response, 3) fail to provide a variable 3D ambulatory environment, limiting the activation of hip and ankle stabilizers, and 4) provide a predictable environment that results in repetitive and stereotyped motion patterns, that fail to challenge proprioception and motor control abilities.

Current physical therapy programs are comprised of infrequent episodic interventions reliant on therapist-led ground-based exercises, segmented muscle strengthening, analgesic modalities, and subjective or non-specific performance monitoring. Such programs require patients to perform the majority of their rehabilitation in non-clinical settings through the unmonitored execution of prescribed routines using simplistic modalities. This results in poor outcomes due to systemic non-compliance and a failure of patients to properly execute (if they even undertake) the prescribed protocol. These programs also fail to satisfy global evidence-based ambulatory health and fitness requirements, are largely static, fail to address 3D human kinetics and kinematics, and lack the critical dynamic components necessary in order to maximize ambulatory proprioception.

For example, a typical therapy program following hip-replacement surgery relies on ground exercise routines that isolate hip muscle groups (i.e., leg lifts for adductor/abductors and hip flexors), coupled with the use of a stationary cycle to improve endurance. These programs may also incorporate various devices such as parallel bars and walkers to address weight-bearing issues. Such programs 1) engage isolated muscle groups, limiting global neuromuscular performance, 2) utilize non-functional assisted weight-bearing approaches, precluding the development of hip-level control, 3) fail to train the neuromuscular system to respond to ground forces, thus failing to address weight-bearing deficiencies in a functional manner, 4) rely on exercises that do not involve ambulatory plantar rocking, thus failing to activate functional kinetic chains, 5) provide little to no real-time feedback, hindering proprioceptive improvement and motor control, and 6) reinforce poor gait kinematics with predictable compensations.

For example, standard anterior cruciate ligament (ACL) rehabilitation and injury prevention programs typically include 0-40 degrees closed-chain knee extension strengthening exercises (i.e., leg press or squats), 40-90 degrees open-chain knee extension exercises (i.e., leg extension machines or ankle weights), isolated hip abduction (i.e., abduction machines, ankle weights, or elastic bands) and global lower limb fitness, (i.e., stationary cycles).

Such protocols 1) do not incorporate the two-plane ambulatory plantar rocking process that is required in order to activate integrated hip, knee, and foot/ankle complex functional muscular responses, 2) utilize stationary cycles, thus creating a non-functional flexed-knee, flexed-hip motion pattern that primarily activates concentric quadriceps responses and which contributes to quadriceps/hamstring muscular imbalance (one of main cause of ACL injuries), 3) primarily operate in a single (sagittal) plane, promoting hip stabilizer weakness, 4) and do not engage foot/ankle stabilizers through plantar rocking on the frontal plane, contributing to overall supinator weakness and a lack of control. Hip and foot/ankle stabilizer weakness is a key contributor to ACL, Achille's tendon, and other lower extremity injuries.

Since existing devices and protocols were not designed with the explicit objective of globally satisfying the evidence-based components of human ambulation necessary to obtain and sustain optimal lower extremity health and fitness, they are, unsurprisingly, ineffective at satisfying said requirements. No current device or protocol comes close to addressing even a bare majority of required functional ambulatory elements; further, no combination of current devices or protocols can safely satisfy all of the ambulatory requirements necessary in order to achieve and maintain optimal human ambulatory performance.

Human ambulation occurs across a broad spectrum. The biomechanical and neuromuscular needs of a professional athlete intent on improving speed, motion control, and strength may appear to be very different from a senior citizen learning to walk again following a catastrophic stroke, but the fundamental elements of ambulation apply equally to both. Health and fitness have been segmented into specialties that deal with various aspects of ambulation (i.e., podiatrists, orthopedic surgeons, neurologists, physical therapists, occupational therapists, exercise physiologists, kinesiologists, personal trainers, or sports medicine specialists), but the biomechanics of human mobility encompass all of these disciplines.

As such, there is a need for a device that addresses all of the functional components of lower extremity health and fitness that are necessary in order to maximize global ambulatory performance, prevent injuries, and provide for optimal rehabilitation outcomes. This device must 1) facilitate functional ambulatory motion patterns, 2) activate functional kinetic synergies in order to optimize neuromuscular performance, 3) enhance proprioception, 4) facilitate active correction of ambulatory kinematics, 5) replicate gravitational (vertical) and inertial (sagittal and frontal horizontal vectors) components of GRFVs, thus creating three axes of functional resistance, 6) safely replicate the variable external forces experienced in diverse 3D ambulatory environments, 7) simulate various gravitational environments, 8) improve user compliance, 9) provide real-time feedback and objective assessments in clinical as well as non-clinical environments, and 10) automate communication of outcomes to appropriate audiences.

SUMMARY

An object of the present invention is to provide a device that simulates 2D and 3D ambulatory environments through the real-time angular adjustment of a ground effect footplate that provides consistent resistance in three axes. The user applies plantar force opposing footplate resistance as they follow on-screen guidance, gameplay, or therapist/trainer instructions in moving the footplates in 3D to navigate various functional and non-functional virtual ambulatory environments in order to achieve specific or global ambulatory performance objectives.

An object of the present invention is to provide a stable pelvis approach that allows for the performance of functional 3D kinematic and kinetic parameters during ambulation. This approach allows for the execution of focused lower extremity objectives and accurate performance monitoring while following precise kinematic and kinetic parameters associated with ambulation.

An object of the present invention is to provide a device that elicits natural plantar rocking on sagittal and frontal planes and simulates GRFV values across various ambulatory environments in order to create moments of force about all seven biomechanical axes (per leg) during various gaits in order to activate functional ambulatory muscular responses.

An object of the present invention is to provide a device that allows for performance of complete ambulatory gait cycles in order to correct or improve gait biomechanics and perform functional training in order to address global ambulatory objectives.

An object of the present invention is to provide a device that allows for performance of distinct segments of ambulatory gait cycles in order to address specific ambulatory objectives.

An object of the present invention is to provide a device that displays a real-time visualization of actual and optimal kinematic and kinetic performance in order to address proprioception and motion-control issues.

An object of the present invention is to provide a device that can vary GRFV values associated with specific 3D ambulatory segments in order to simulate different gravitational and inertial performance environments so as to allow for incremental training and for use by individuals with limited weight-bearing capabilities or for those in low-gravity environments.

An object of the present invention is to provide a device that adapts to user performance by modifying device resistance and ROM values according to therapist or trainer-defined algorithms in order to optimize ambulatory performance.

An object of the present invention is to provide a device that allows for unilateral or bilateral performance based on the performance characteristics of each limb, in order to promote optimal biomechanics and allow for maintenance of one limb while the other limb is undergoing progressive rehabilitation.

An object of the present invention is to provide a functional, foot-activated game controller that maximizes a user's lower extremity speed, strength, ROM, and control, by having them play foot-operated video games built on segments of functional and non-functional ambulatory patterns and their associated variable simulated GRFV values.

BRIEF DESCRIPTION OF THE DRAWINGS

In order to more fully describe embodiments of the present invention, reference is made to the accompanying drawings. These drawings are merely illustrative and not to be considered limitations in the scope of the invention.

FIGS. 9A-9C illustrate some embodiment of the present invention, describing control in variation of footplate position on the user's sagittal plane.

FIGS. 11A-11C illustrate some embodiment of the present invention, describing adjustment of the footplate motors to create and maintain variable footplate angles on the user's frontal plane.

FIGS. 19A-19D illustrate some embodiment of human ambulation, describing relative BW values experienced while standing and at mid-stance of various gaits.

FIGS. 28A-28C illustrate some embodiment of the present invention, describing stance and swing phase foot motions from a stable-pelvis perspective on the sagittal plane during walking gait.

FIG. 32A-32B illustrate some embodiment of the present invention, describing how specific segments of ambulatory motion patterns correlate to specific moments of force and resultant muscular activations.

FIG. 50A-50B illustrate some embodiment of the present invention, describing use in a vertical orientation, where the user stands on the footplates.

Figure 1:
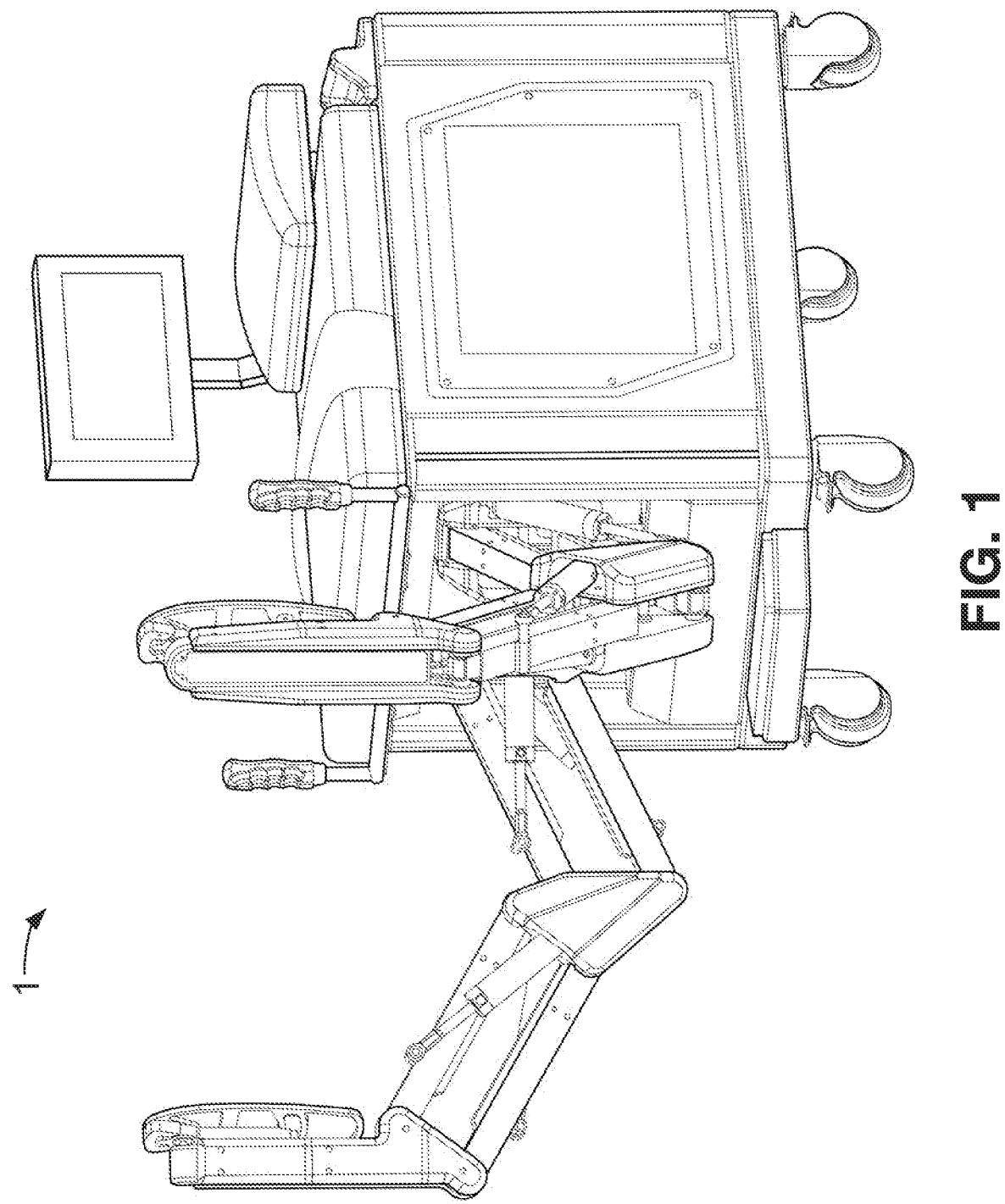
FIG. 1 illustrates some embodiment of the present invention, describing a perspective view of the device.

The description above and below and the drawings of the present document focus on one or more currently preferred embodiments of the present invention and also describe some exemplary optional features and/or alternative embodiments. The description and drawings are for the purpose of illustration and not to be considered limitations in the scope of the invention. Those of ordinary skill in the art would recognize variations, modifications, and alternatives. Such variations, modifications, and alternatives are also within the scope of the present invention. Section titles are terse and are for convenience only.

DETAILED DESCRIPTION OF EMBODIMENTS

These features, advantages and embodiments of the present invention are further made apparent, in the remainder of the present document, to those of ordinary skill in the art.

Two dimensional (2D) refers to a geometric setting in which two values (length and width) are required to determine the position of an element on a flat surface. For example, movement on a plane is 2D. Three dimensional (3D) refers to a geometric setting in which three values (length, width and height) are required to determine the position of an element in space. For example, movement on two or three planes is 3D. The seven biomechanical axes of the lower extremities references the seven main rotational pivots of each leg's biomechanical joints: three at the hip, one at the knee, and three at the foot/ankle complex. Body weight (BW) refers to the vertical downward acceleration force exerted by a mass as a result of gravity. Closed-chain, or closed kinetic chain, refer to motions or exercises performed by a limb and where the distal extremity (i.e., foot) remains in constant contact with an immobile surface (i.e., ground). Open-chain, or open kinetic chain, is referred to as a combination of successively arranged joints along the segments of a limb, in which the terminal segment can move freely. Thus, an open chain movement is when the peripheral segment/joint of an extremity is free to move. Compensation refers to an atypical biomechanical movement currently used to achieve functional motor skills when a normal movement pattern has not been established or is unavailable. External forces, or resistance, refer to a force whose direction is opposite to the internal muscular forces acting on a moving body or body segment. Fixed-foot refers to a stable positioning of the foot on the ground or a resting support. Ground reaction force (GRF) refers to the force exerted by the ground on a moving body in contact with it. Applied to human ambulation, a ground reaction force declines in three vectors: the main one being vertical, along with two horizontal ones (anterior-posterior and medial-lateral). Ground reaction force vectors (GRFVs) create moments of force that initiate sequences of muscular activation (kinetic chains) during the stance phase of ambulation. The ground-effect footplate refers to a dynamic footplate which maintains a consistent angular position relative to the longitudinal body axis of the user on two planes (sagittal and frontal), while providing simulated GRFVs on three planes in order to mimic 2D and 3D ground conditions in real-time. In this application, the terms footplate and ground-effect footplate can be used interchangeably. Plantar surface refers to a surface of or relating to the sole of the foot. Plantar resistance refers to an external force applied to the plantar region during closed kinetic chain exercises for the lower extremity. Virtual ambulatory environment refers to an exercise environment that simulates realistic ambulatory conditions, based on consistent replication of GRFVs presented through a computer generated visual environment. Virtual programming element (VPE) refers to a gait cycle segment with relative GRFVs applied to create a 3D programming element that can be combined with non-functional motion patterns to create functional and non-functional exercise programs and gameplay. Virtual ambulatory environments may comprise of combinations of both functional and non-functional movement patterns.

FIG. 1 illustrates embodiments of the present invention, describing a perspective view of the device 1.

Figure 2:
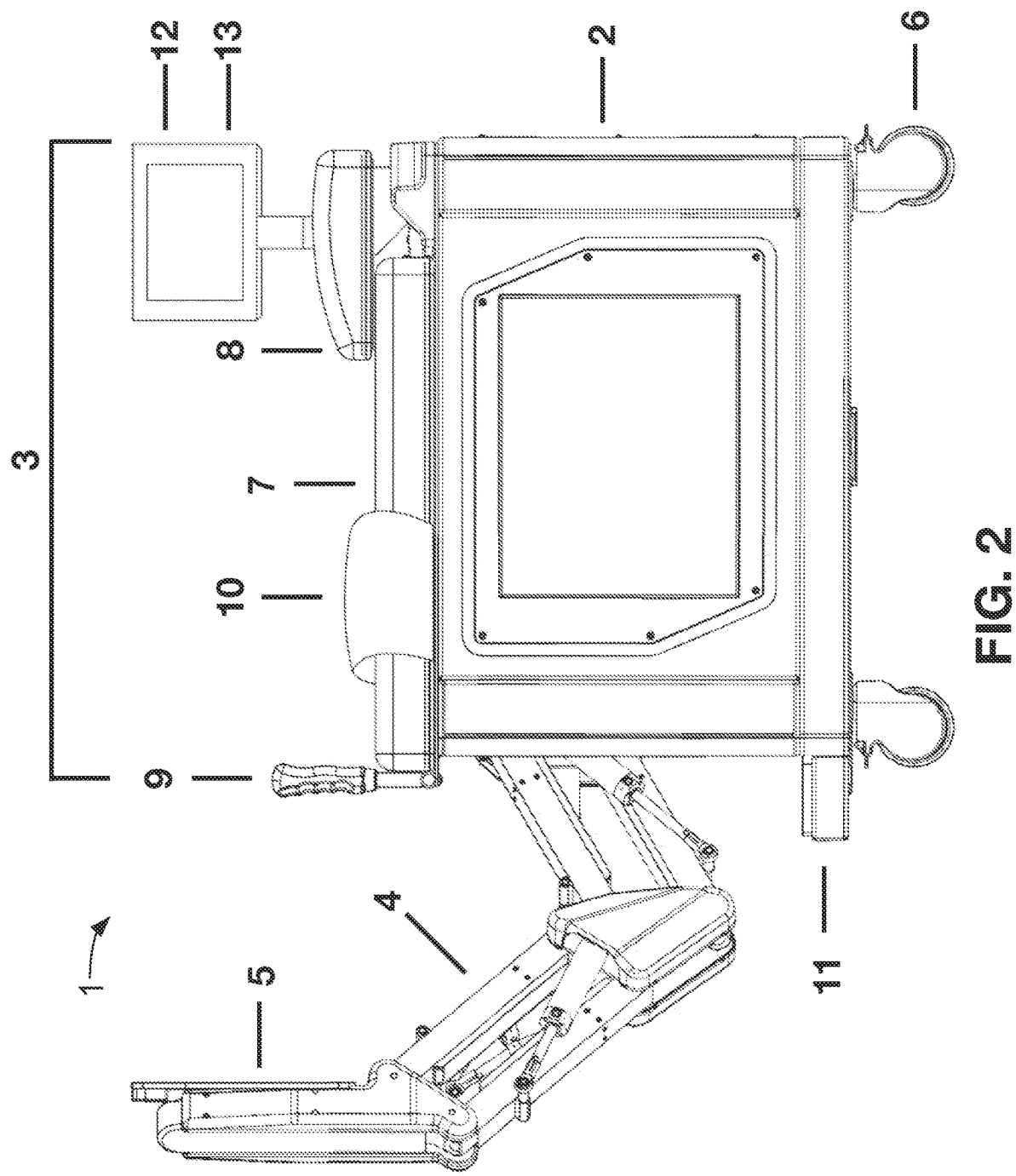
FIG. 2 illustrates some embodiment of the present invention, describing a side view of the device.

FIG. 2 illustrates some embodiments describing a side view of the device 1 comprising the cabinet 2, with a pelvic-to-head positioning system 3, and which is connected by means of two articulated mechanical legs 4 to two dynamic footplates 5. The cabinet 2 is supported by casters 6 and is covered with a cushion 7 to support the user's upper body from the shoulders to the pelvis, an adjustable headrest 8, adjustable hand grips 9, a pelvic positioning mechanism or belt 10, and a step 11. The cabinet 2 also includes a display 12, (i.e., computer monitor, tablet computer, virtual reality (VR) headset, augmented reality (AR) headset, wearable device, or smart phone) that may or may not be physically attached to the cabinet 2, and an input mechanism 13 (i.e., keyboard, touchscreen display, voice control, touchpad, or game controller) that may or may not be attached to the cabinet 2. The user is in a supine position against the cushion 7. The head and neck regions of the user are supported by an adjustable headrest 8. The trunk starting from approximately the shoulder region down to the pelvic region rest against the pelvic-to-head positioning system 3. The user can hold the hand grips 9 to gain support and the pelvic positioning mechanism or belt 10 secures the user into position. The legs of the user are unsupported with the user's foot resting against the footplate 5, although other embodiments may incorporate leg bracing for individuals with limited mobility or control, or for amputees.

Figure 3:
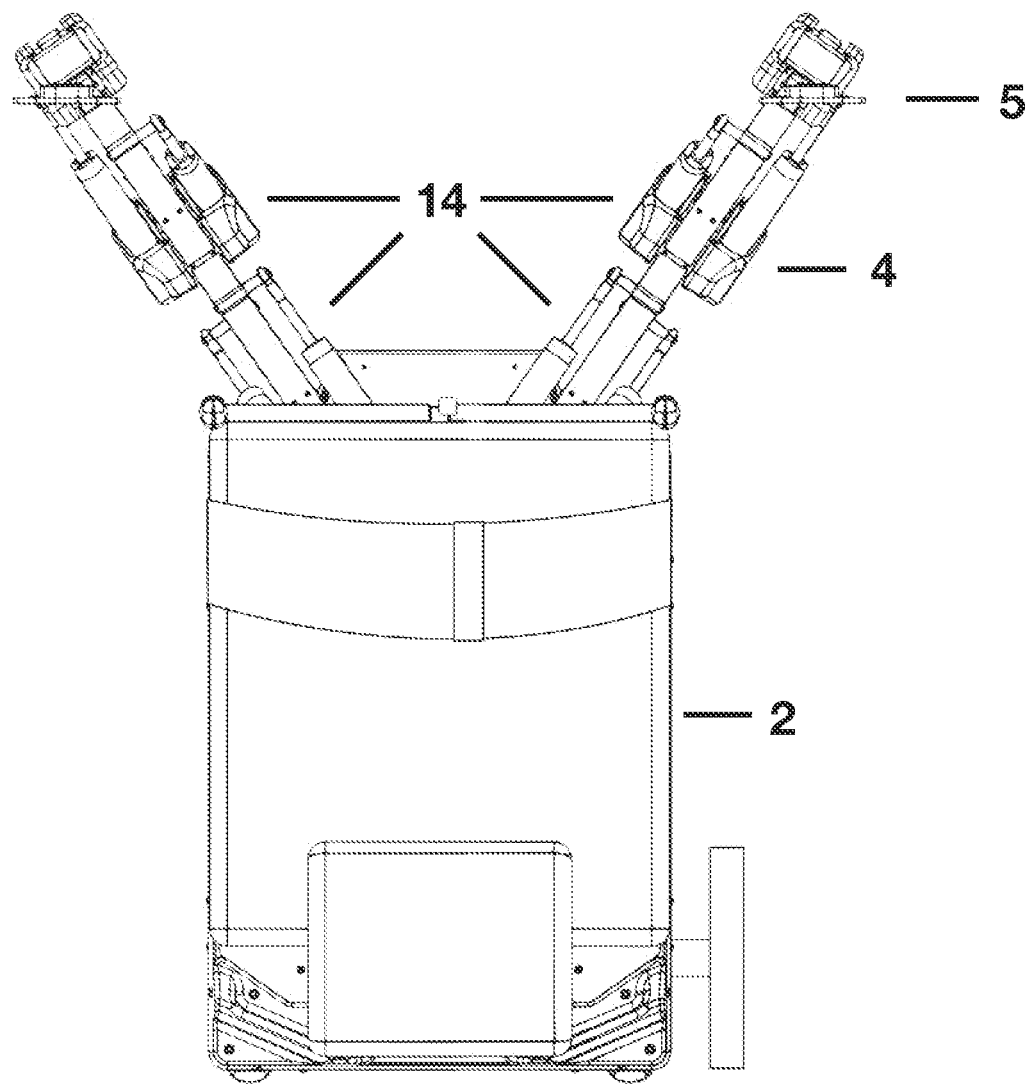
FIG. 3 illustrates some embodiment of the present invention, describing a top view of the device.

FIG. 3 illustrates embodiments of the present invention, describing a top view of the cabinet 2, mechanical legs 4 and footplates 5. Eight pneumatic cylinders 14 are connected to either side of the mechanical legs to provide resistance on the user's sagittal plane 4. In other embodiments, a user can operate the device 1 having one mechanical leg 4 with two footrests and use of the one mechanical leg 4 can be alternated between the users' legs (not shown, see FIG. 51).

Figure 4:
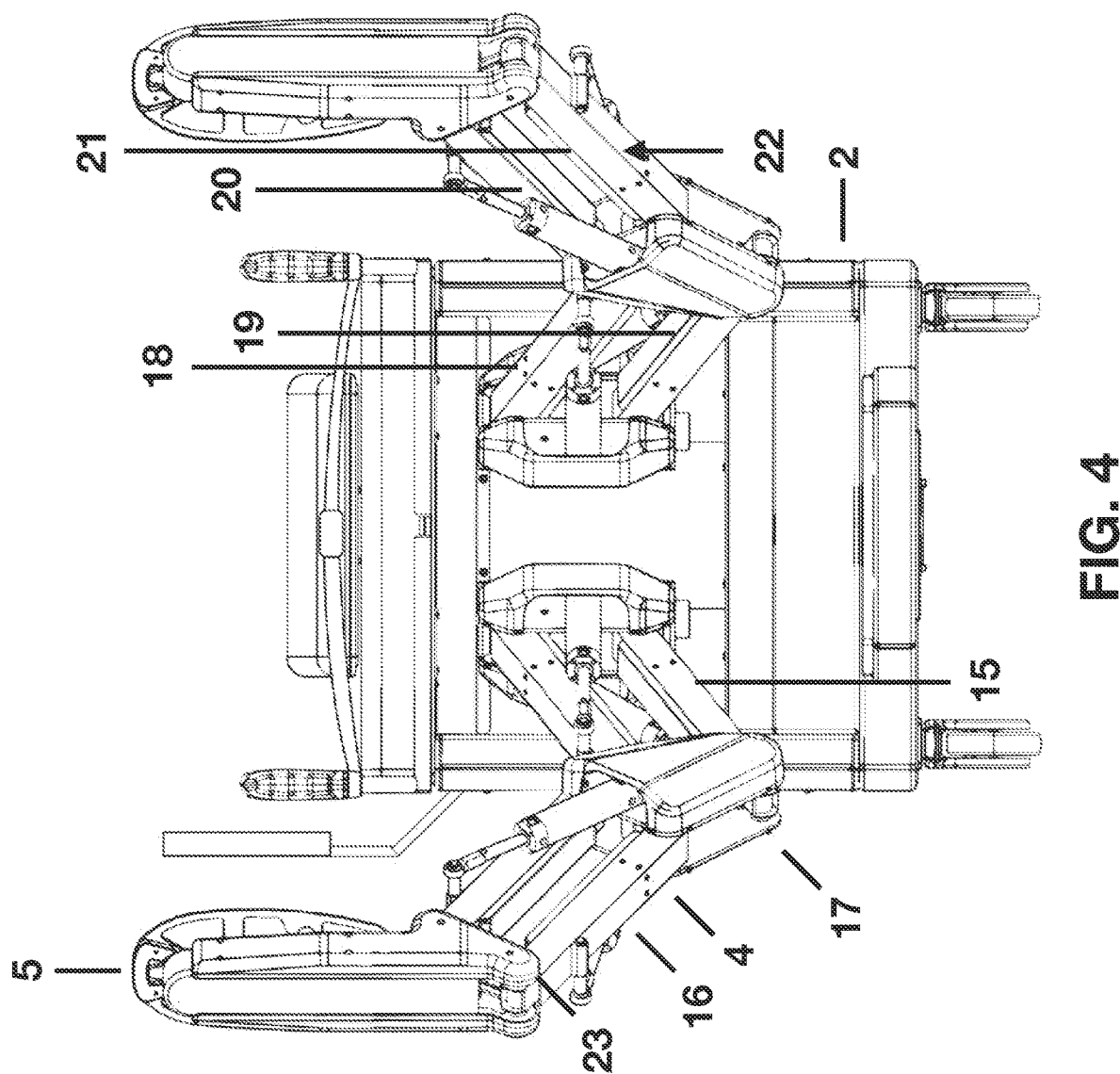
FIG. 4 illustrates some embodiment of the present invention, describing an end view of the device.

FIG. 4 illustrates embodiments of the present invention, describing an end view of the cabinet 2, two mechanical legs 4, and two footplates 5. There are ten pneumatic cylinders 14 that attach to the mechanical legs 2. In some embodiments, the main cabinet 2 features two articulated mechanical legs 4, each mechanical leg 4 comprises an upper leg section 15 and a lower leg section 16, with the two sections connected by a mechanical linkage 17. Each upper leg section 15 comprises sections 18 and 19. Each lower leg section 16 comprises sections 20 and 21. The sections 18, 19, 20, and 21 are also referred to as telescoping sections because they telescope as a result of the electric motor with worm drive 22 encased in its hollow body. Section 18 and section 19 are connected to the mechanical linkage 17 and section 20 and section 21 are connected to the mechanical linkage 17 creating a parallelogram configuration for each mechanical leg 4. Each lower leg section 15 is connected by mechanical linkage 23 to the footplates 5.

Figure 5:
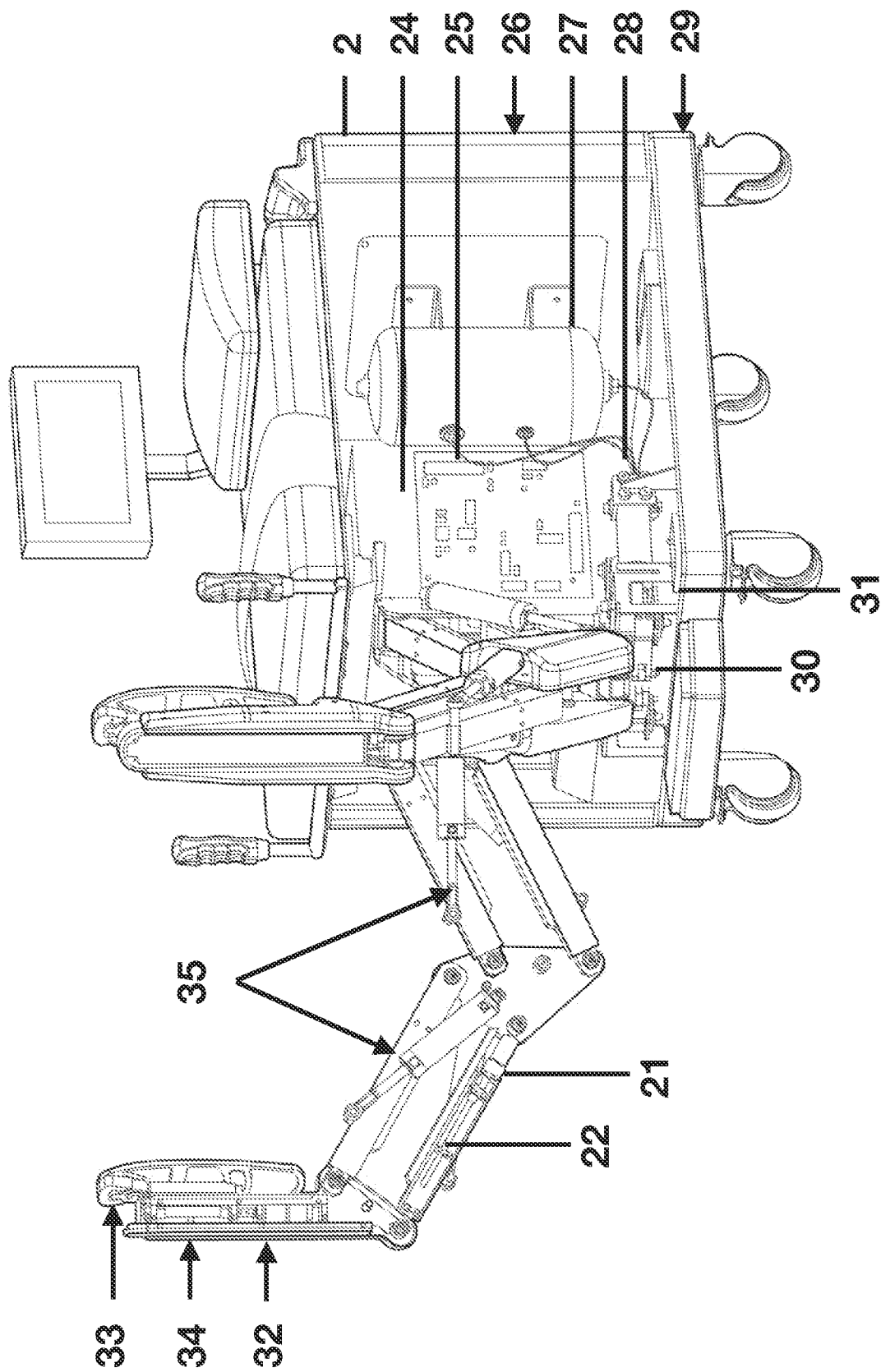
FIG. 5 illustrates some embodiment of the present invention, describing a perspective internal view of the device and internal components.

FIG. 5 illustrates embodiments of the present invention, describing a perspective internal view of the cabinet 2. The internal components of the cabinet 2 are the electronics 24, wiring 25, retractable power cord and 26, auxiliary air tank 27, pneumatic valves and tubing 28, and external air supply quick-connect valve 29, and a mechanical device to prevent the legs from colliding 30. An external air source connects to the device via a pneumatic hose and air is delivered to the auxiliary air tank 27 and then through internal pneumatic tubing and valves 28 to the pneumatic cylinders 14. There are ten pneumatic cylinders 14 that connect to the mechanical legs 4. However, in other embodiments, the quantity of pneumatic cylinders can vary, or other resistance mechanisms (i.e., elastomeric, hydraulic, magnetic) or drive systems (i.e., cable and cam, belt-drive, gearbox, direct-drive, worm drive) can be used. Two of the ten pneumatic cylinders 14 are located in the main cabinet 2. These two pneumatic cylinders 14 connect the base of the main cabinet 2 to a rotating shaft via a linkage 31. When these pneumatic cylinders 14 expand or contract, the mechanical legs 4 move relative to the user's frontal plan. Each mechanical leg 4 is comprised of four square, telescopic extrusion sections 18, 19, 20, 21, with each section containing a motor and worm-drive gear 22. Four additional pneumatic cylinders 14 are connected to the rotating shaft on one end and to each of the two sides of sections 18 and 19. There are four additional pneumatic cylinders 14 connecting section 20 and 21 to the footplate 5 via a mechanical linkage 19. The combination of these eight pneumatic cylinders 22 raise and lower the footplates 5 and move the footplates 5 towards and away from the user on their sagittal plane. There is a mechanical device 29 to prevent contact between the mechanical legs 4 during device 1 use. Each footplate 5 contains an electric motor and gearbox 32, and a rotational mechanism 33. During the loading component of the stance phase of gait, propulsion and weight transfer are initiated by a combination of muscle groups, including hip extensors, adductors, and internal rotators. As the unloading phase occurs at approximately mid-stance, abductors and external rotators combine with the hip extensors to complete the stance phase and prepare for swing phase. This series of movements occurs with a fixed foot and moving pelvis. The fixed foot provides significant resistance, and the body rotates with limited resistance. To replicate the transverse component of this complex series of motions and muscular activations during device 1 use, the pelvis is fixed and the foot is allowed to rotate freely, with resistance provided by mechanical leverage (the rotation point is located above the toes and the lever (leg) is located below the heel) combined with sagittal and frontal resistance.

The device 1 has at least one inertial and 3D positional sensor 34 located approximately at the footplate 5. Additional sensors 35 may be located on the upper leg section 15 and lower leg section 16, and approximately in line with the center of the user's pelvis, located on or near the edge of the pelvic-to-head positioning system 3, or elsewhere as appropriate. The sensors 35 can also be referred to as accelerometers or force transducers. Plantar forces may also be measured, either by extrapolation of inertial movements of the footplate sensor 34, or by placing another sensor 35 at the footplate 5. The sensors 34, 35, electric motors with worm drives 22, valves 28, display 12, and input mechanism 13 can be either physically or wirelessly connected to the electronics 24. A worm drive 22 is shown in the section 21. Other sensors, including biometric sensors, may also be incorporated into the design of the device.

Figure 6:
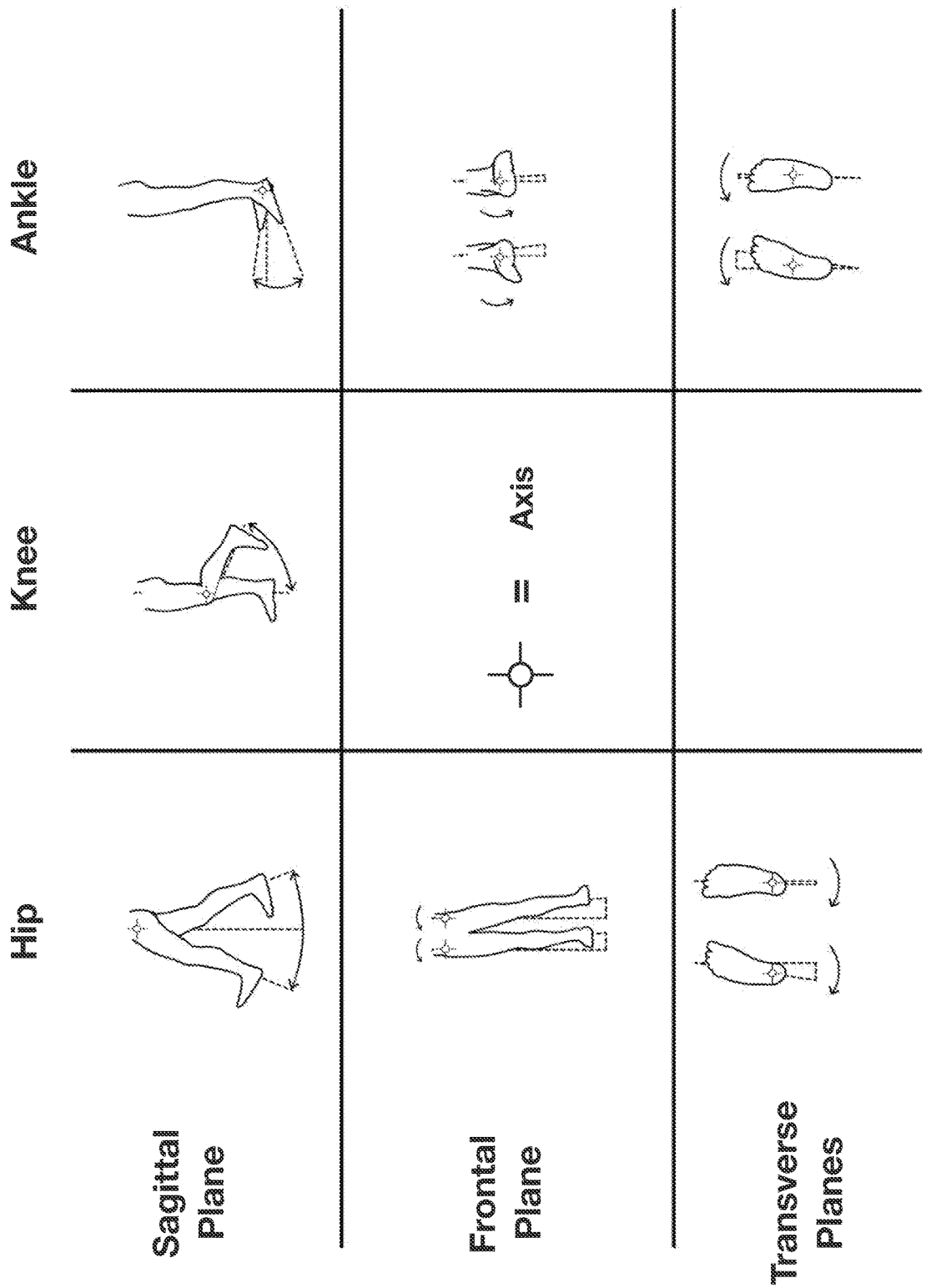
FIG. 6 illustrates a chart of human ambulation, describing rotations about the seven lower extremity biomechanical axes that allow for human ambulation.

FIG. 6 illustrates a chart of human ambulation, showing rotations about the seven lower extremity biomechanical axes that allow for human ambulation. Although ambulation represents a complex blending of movements on multiple axes across all planes, these movements are isolated in this drawing for purposes of illustration. The seven lower extremity biomechanical axes are at the hip level along the sagittal, frontal and transverse planes; at the knee level along the sagittal plane; and at the foot/ankle level on the sagittal, frontal and transverse planes. For purposes of illustration, the transverse plane shows how an extended knee position facilitates hip rotation, and how a flexed knee isolates foot adduction and abduction. The chart describes the approximate range of motion in degrees about the seven axes during walking gait.

Figure 7:
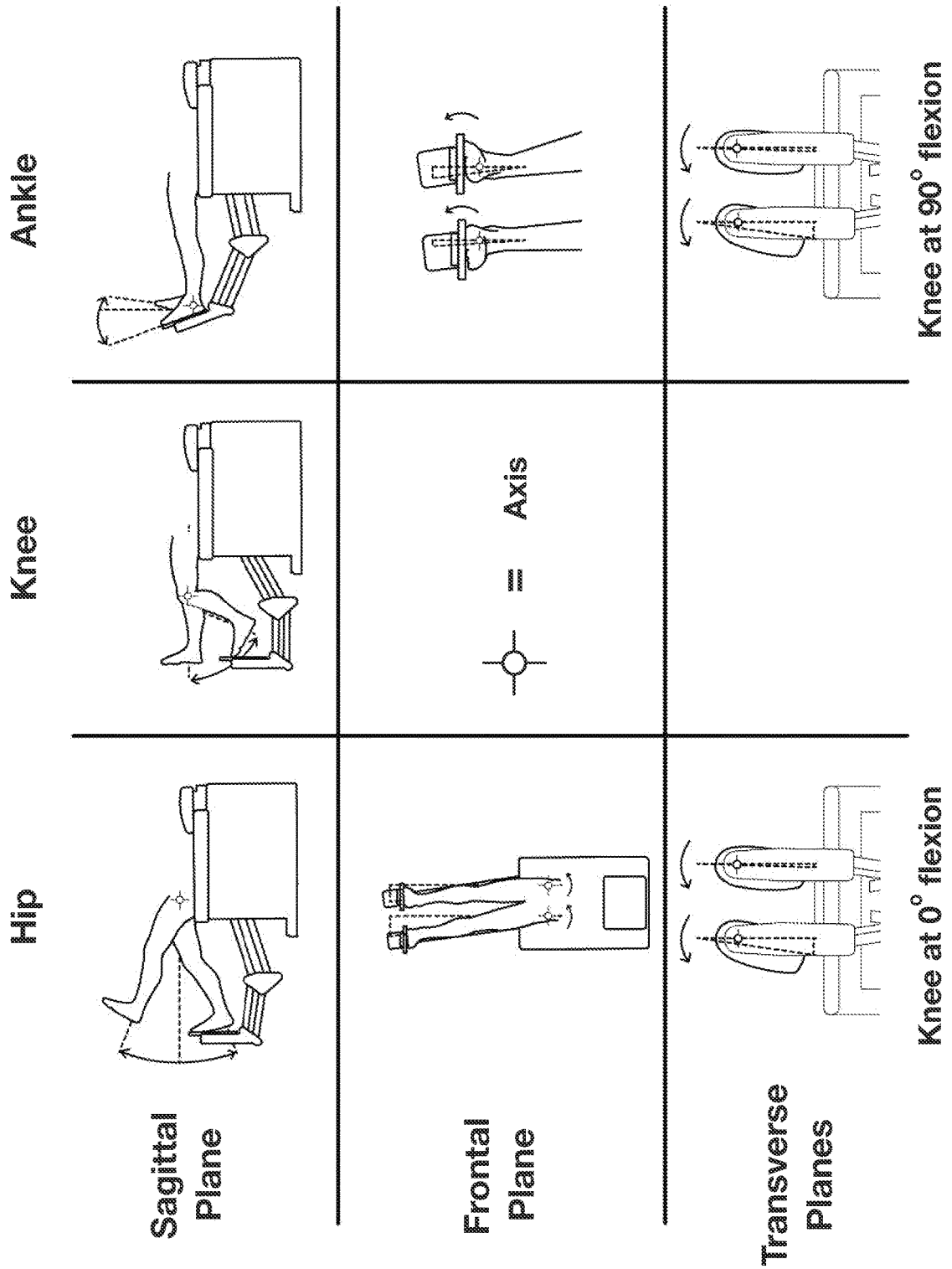
FIG. 7 illustrates some embodiment of the present invention, describing rotations about the seven lower extremity biomechanical axes that allow for simulated human ambulation during device use.

The following description illustrates how embodiments of the present invention mimic multiple gravitational environments and ambulation modes and speeds in a manner substantially similar to ambulation. FIG. 7 illustrates embodiments of the present invention, describing rotations about the seven lower extremity biomechanical axes that allow for human ambulation during device 1 use. Although ambulation represents a complex blending of movements on multiple axes across all planes, these movements are isolated in this drawing for purposes of illustration. The device 1 allows for the performance of functional motions of walking and running gait about all seven lower extremity axes and in 3D on the user's sagittal, frontal and transverse planes. The three axes at the hip refer to the frontal, sagittal and transverse axes. Movements on these axes are often referred to as hip flexion and extension (sagittal plane), adduction and abduction (frontal plane), and internal and external rotation (transverse plane). The axis at the knee refers to the sagittal axis. Movements on this axis are often referred to as knee flexion and extension. Although complementary knee movement occurs on the frontal and vertical axes (i.e., tibial rotation), these motions are relatively insignificant in amplitude and are highly constrained by ligaments during ambulation to protect the knee from injury. The foot/ankle complex moves on the sagittal plane (plantar and dorsal flexion), the frontal plane (inversion and eversion), and on the transverse axis (foot adduction and abduction). Due to the complex multi-articular motions performed by the foot/ankle complex during ambulation, rotations about the frontal and transverse planes are collectively referred to as pronation and supination.

Figure 8C:
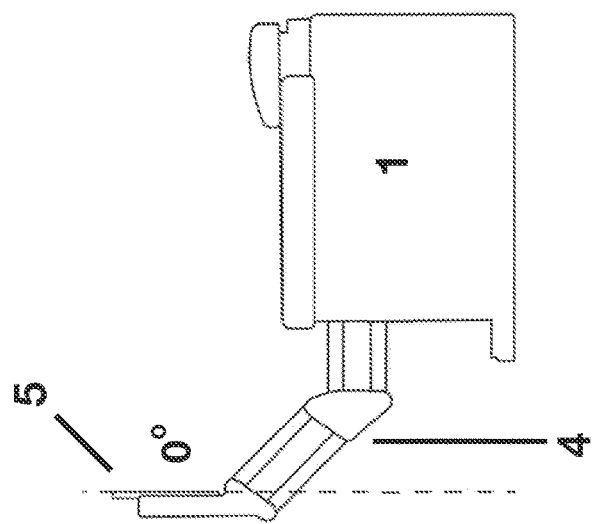
FIGS. 8A-8C illustrate some embodiment of the present invention, describing how the parallelogram structure/configuration of the device legs maintain a perpendicular footplate position on the user's sagittal plane.
Figure 8B:
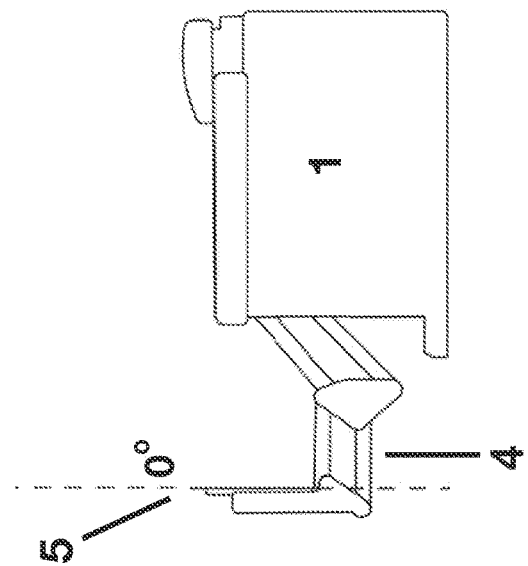
Figure 8A:
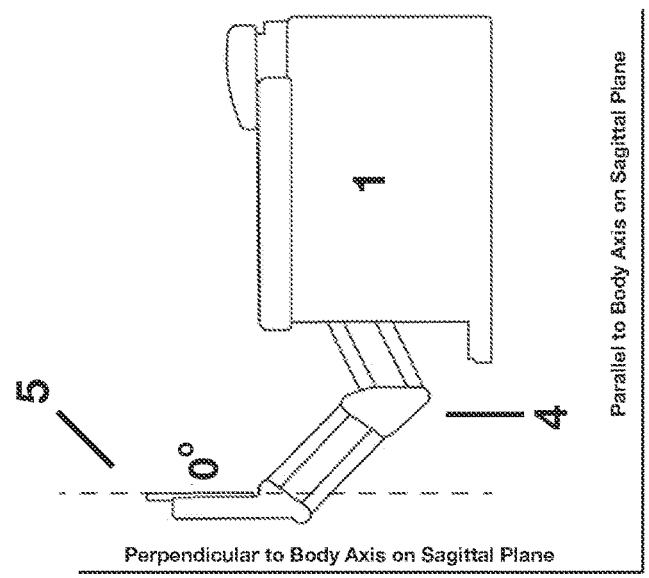

FIGS. 8A-8C illustrate embodiments of the present invention, showing the device 1 maintaining a default perpendicular footplate 5 position relative to the user's sagittal plane. During use, the parallelogram configuration of the mechanical legs 4 creates and maintains the footplate's position perpendicular to the user's longitudinal axis on the sagittal plane throughout the device 1 ROM. FIG. 8A illustrates the footplate position in a neutral or standing position. FIG. 8B illustrates the footplate position with the hip extended and knee flexed. FIG. 8C illustrates the footplate position with the hip flexed. Throughout the range of motion, the footplate retains a default position perpendicular to the user's longitudinal axis on the sagittal plane.

FIGS. 9A-9C illustrate embodiments of the present invention, showing the device 1 with variation of footplate 5 positions relative to the user's sagittal plane. Variation of footplate 5 positions can also be referred to as footplate 5 angle or angular position of the footplate. Footplate angular adjustments refer to the ability of the electric motor and the worm drive to adjust the footplate 5 angle. The electric motor and worm drive 22 (see FIG. 5) can be adjusted in real-time during use to change the footplate 5 angle relative to the user's longitudinal axis on the sagittal plane, simulating uphill or downhill ambulatory environments. FIG. 9A illustrates the default position of the footplate perpendicular to the user's longitudinal axis on the sagittal plane 5. As shown in FIG. 9B, extension of the section 20 causes the footplate 5 to slope "downhill" relative to the user's sagittal plane at any angle up to approximately −30 degrees relative to the default perpendicular position. FIG. 9C illustrates extension of section 21 causing the footplate to slope "uphill" at any angle up to approximately 30 degrees relative to the default perpendicular position.

Figure 10C:
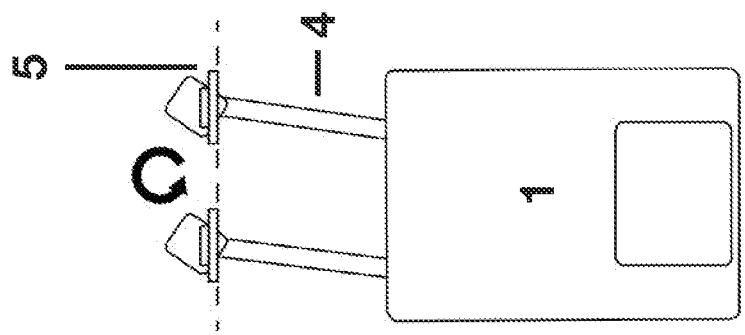
FIGS. 10A-10C illustrate some embodiment of the present invention, describing adjustment of the footplate motors to create and maintain a footplate angle parallel to the user's frontal plane.
Figure 10B:
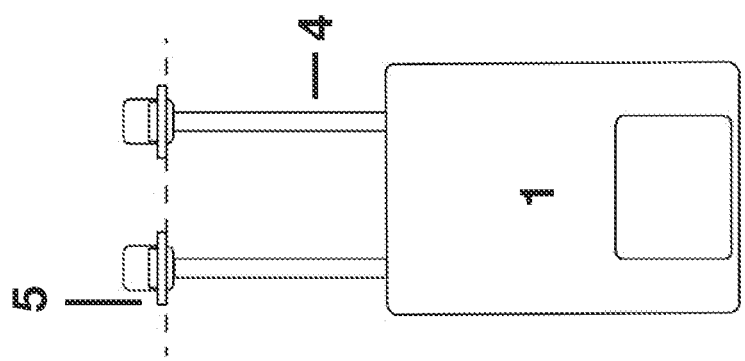
Figure 10A:
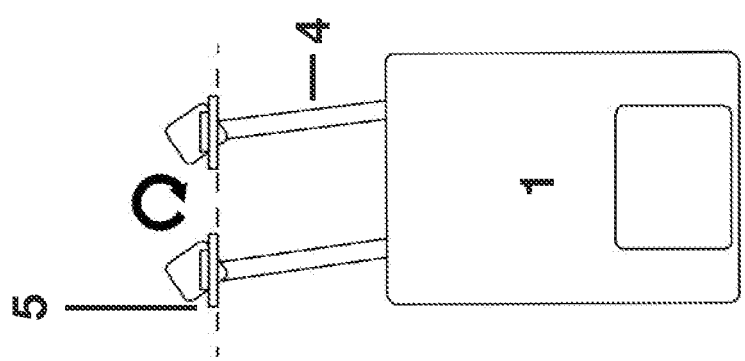

FIG. 10 illustrates embodiments of the present invention, showing the device 1 with adjustment of the electric motor and gearbox 34 (see FIG. 5) to create and maintain a footplate 5 position perpendicular to the user's longitudinal axis on the frontal plane. In order to create and maintain a consistent footplate 5 angle, the motorized footplate 5 adjusts in response to lateral movement of the mechanical legs 4. The electric motor and gearbox 34 are adjusted in real-time during use to create and maintain a footplate 5 position perpendicular to the user's longitudinal axis on the frontal plane. For example, FIG. 10A, shows the left hip abduction and right hip adduction with rotation of the footplate 5 in a clockwise direction, and the footplate 5 angle maintaining a position perpendicular to the user's longitudinal axis on the frontal plane. FIG. 10B shows no hip abduction or hip adduction and no rotation of the footplate 5. FIG. 10C shows the left hip adduction and right hip abduction with rotation of the footplate in a counterclockwise direction and the footplate 5 angle maintaining a position perpendicular to the user's longitudinal axis on the frontal plane.

FIGS. 11A-11C illustrate embodiments of the present invention, showing the device 1 and how the electronic motor and gearbox 34 can be adjusted in real-time during use to vary the footplate 5 angle relative to the user's longitudinal axis on the frontal plane, simulating a left or right sloping ambulatory environment. As shown in FIGS. 11A-11C, the footplate 5 angle is not perpendicular to the user's longitudinal axis on the frontal plane. In response to lateral movement, the motorized footplate can adjust to create and maintain variable footplate 5 angles. In FIG. 11A, there is increased knee flexion on the "uphill" side and the rotation of the footplates 5 occur in a counterclockwise direction. In FIG. 11B, there is no increased knee flexion and no rotation of the footplates 5. In FIG. 11C, there is increased knee flexion on the "uphill" side and the rotation of the footplates 5 occur in a clockwise direction.

Figure 12B:
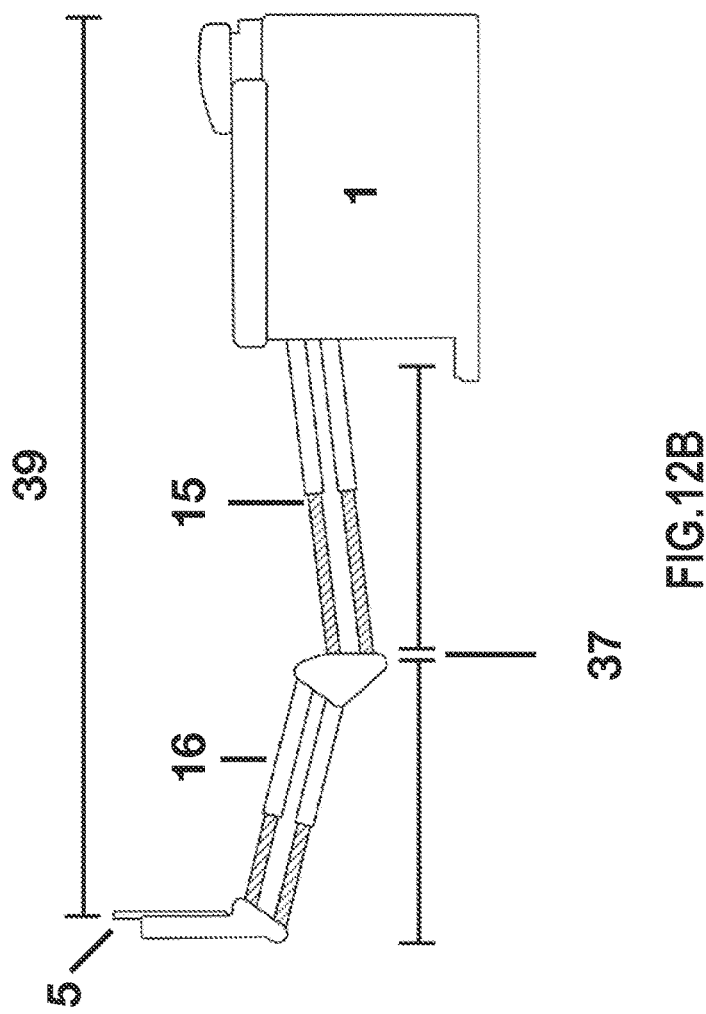
FIGS. 12A-12B illustrate some embodiment of the present invention, describing the sizing of the device's upper and lower leg sections.
Figure 12A:
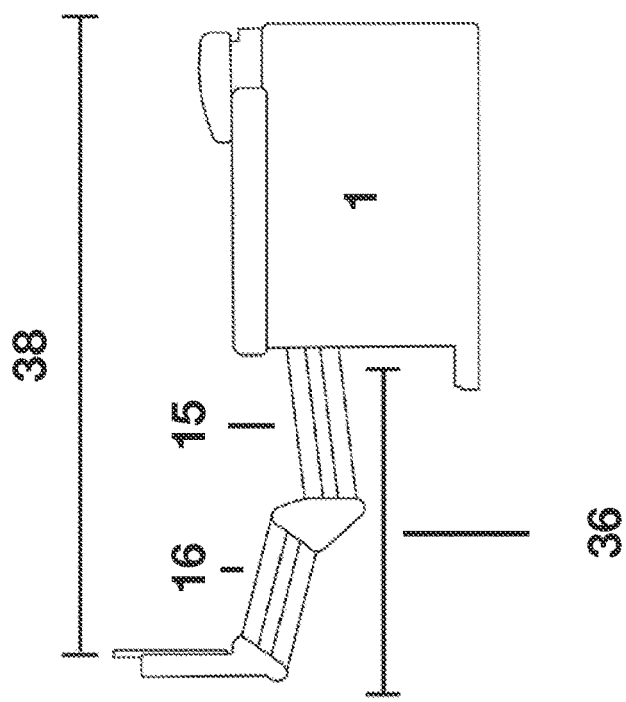

FIGS. 12A-12B illustrate embodiments of the present invention, showing the sizing of the device's 1 upper leg section 15 and lower leg section 16. The device 1 is sized to fit each user based on their upper and lower leg measurements by adjustment of the device's 1 upper leg section 15 and lower leg section 16 using an electronic worm drive motor 22 encased in the upper leg section 15 and lower leg section 16. In FIG. 12A, the worm drive 22 is fully retracted 36 in both the upper leg 15 and lower leg 16 sections. The approximate minimum user height 38 is about 4 feet 8 inches measured from the headrest 8 to the footplate 5. As shown in FIG. 12B, the worm drive 22 is fully extended 37 in both the upper leg 15 and lower leg 16 sections. The approximate maximum user height 39 is about 7 feet 2 inches measured from the headrest 8 to the footplate 5 (see FIG. 2).

Figure 13:
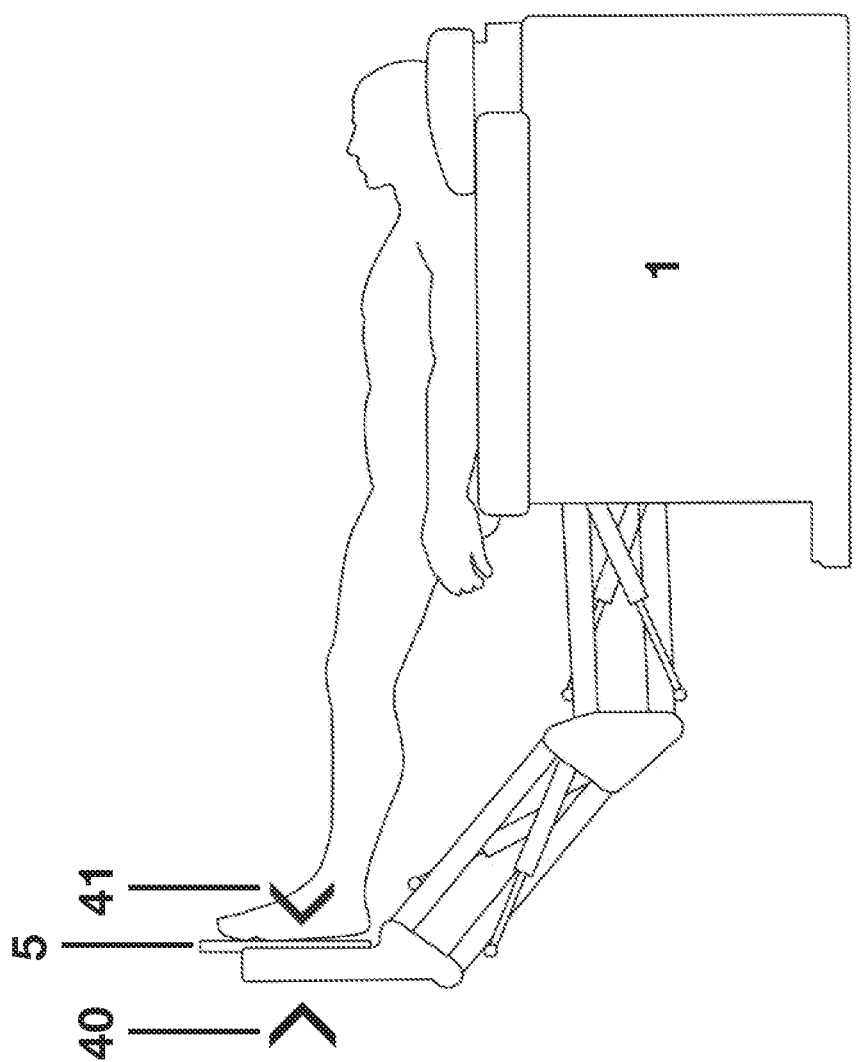
FIG. 13 illustrates some embodiment of the present invention, describing the application of 3D mechanical resistance to the footplate, against which the user applies plantar force in order to simulate standing while in a supine position on the device.

FIG. 13 illustrates embodiments of the present invention, showing the application of 3D mechanical resistance 40 to the footplate 5, against which the user applies plantar force 41 in order to simulate standing while in a supine position on the device 1. Mechanical resistance 40 on three planes is directed through the footplate, against which the user applies plantar forces 41 during device 1 use, although for purposes of illustration only plantar resistance on the sagittal plane is shown. Mechanical resistance is provided by pneumatic cylinders 22 as described above (see FIG. 5).

Figure 14:
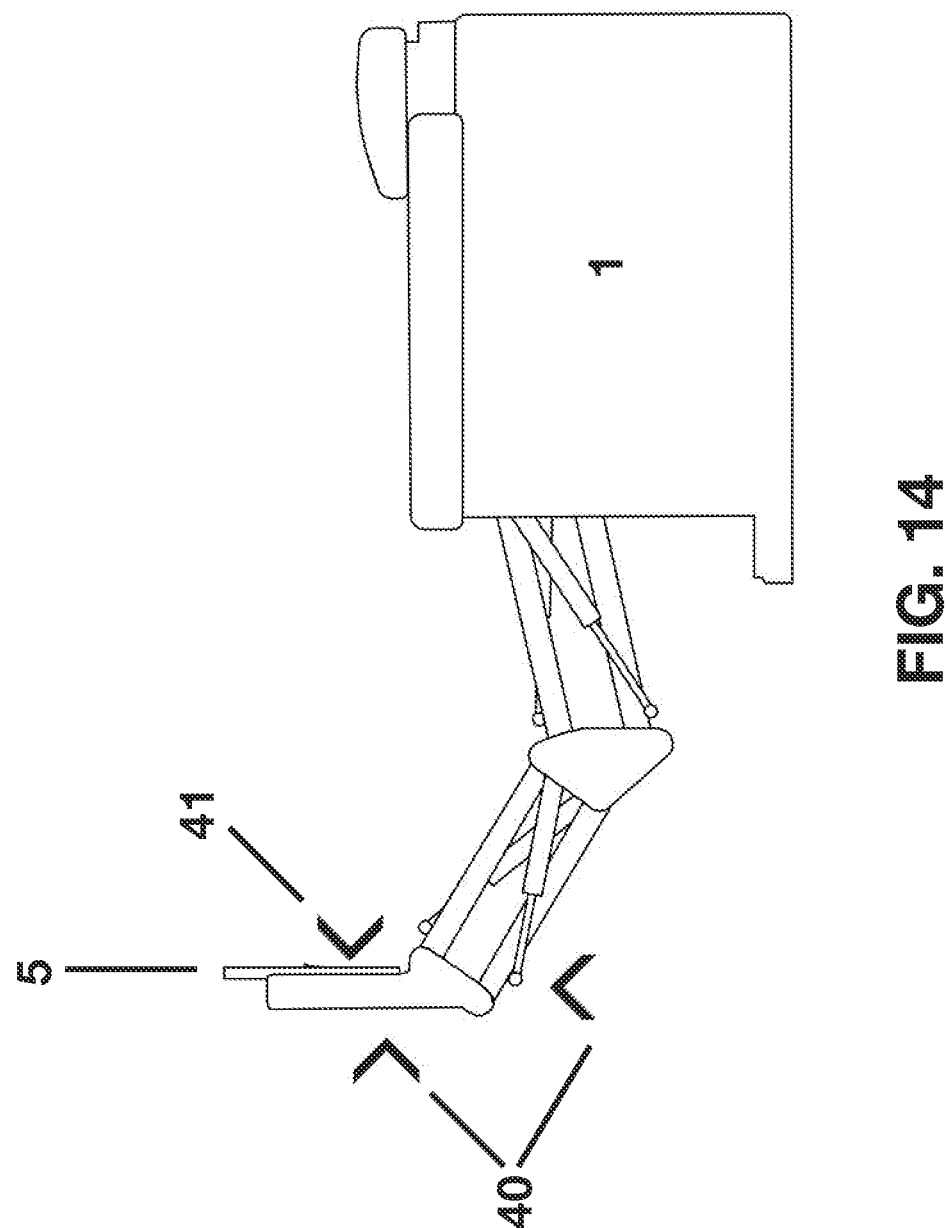
FIG. 14 illustrates some embodiment of the present invention, describing the application of mechanical resistance on the user's sagittal plane during device use.

FIG. 14 illustrates embodiments of the present invention, showing the application of mechanical resistance 40 on the sagittal plane during device 1 use. The adjustment of the leg section pneumatic cylinders 22 as described above (see FIG. 5) lifts and pulls the footplate 5 towards the user, simulating gravitational forces. The upper leg section also serves to simulate anteroposterior ground vector inertial forces, while the lower leg simulates vertical vector forces. The user's application of plantar force 41 against these mechanical forces 5 creates hip flexion and hip extension, knee flexion and knee extension and foot dorsal and foot plantar flexion moments on the sagittal plane during ambulation, due to the plantar rocking process on the ground effect footplate. The mechanical resistance 40 simulates both the gravitational vertical vector (created by the lower leg pneumatic system) and the horizontal anteroposterior vector (created by the upper leg pneumatic system). This resistance simulates forces experienced by the musculoskeletal system on the sagittal plane during gait and elicits gait appropriate kinetic patterns including hip flexion/extension, knee flexion/extension, and foot dorsal/planter flexion moments on the sagittal plane.

Figure 15:
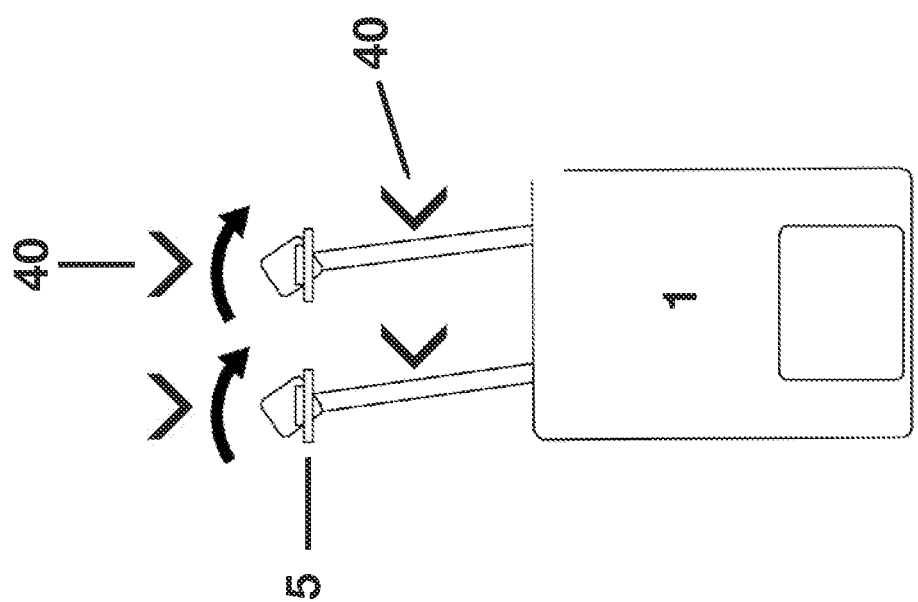
FIG. 15 illustrates some embodiment of the present invention, describing the application of mechanical resistance on the user's frontal plane during device use.

FIG. 15 illustrates embodiments of the present invention, showing the application of mechanical resistance 40 on the longitudinal axis of the user's frontal plane during device 1 use. Adjustment of cabinet-to shaft-pneumatic cylinders 22 (see FIG. 5) creates lateral mechanical resistance. User resistance against the footplate 5 allows for the hip adduction and hip abduction and foot inversion and foot eversion moments on the frontal plane during device 1 use. This mechanical resistance simulates forces experienced by the musculoskeletal system during gait and elicits gait-appropriate kinetic patterns including hip adduction/abduction and foot inversion/eversion on the frontal plane.

Figure 16B:
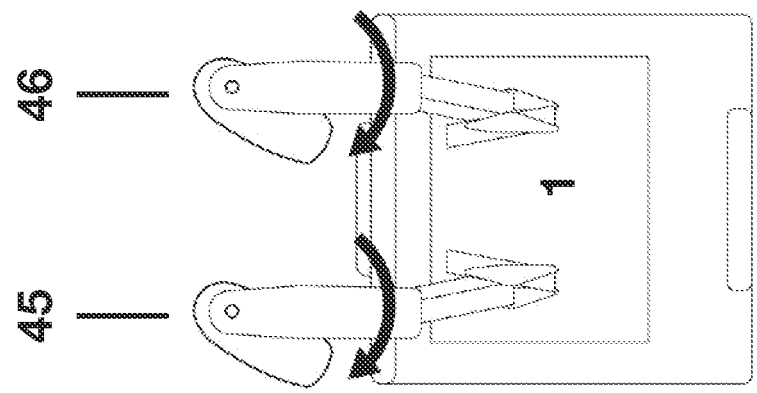
FIGS. 16A-16B illustrate some embodiment of the present invention, describing the application of mechanical resistance on the user's transverse planes during device use.
Figure 16A:
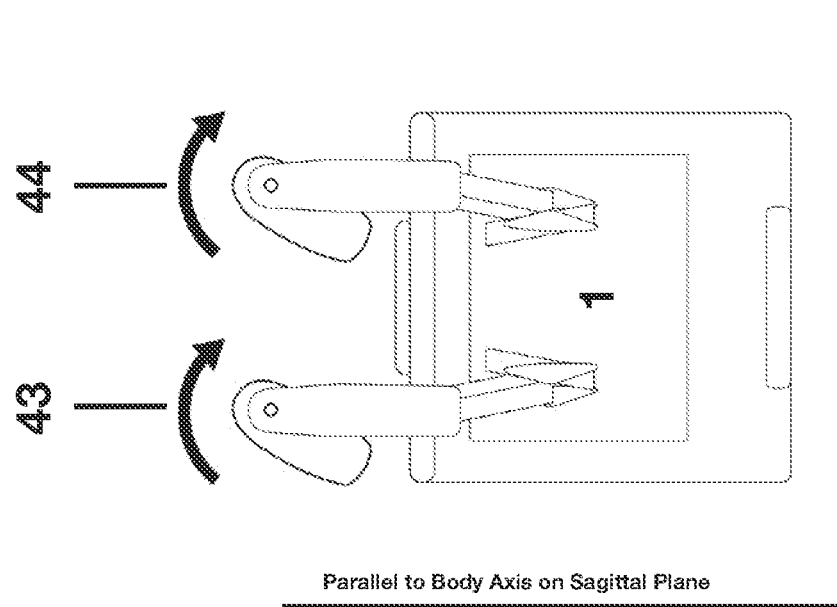

FIGS. 16A-16B illustrates embodiments of the present invention, showing the indirect application of transverse plane mechanical resistance through an upper footplate pivot during device 1 use. When a lateral mechanical force is applied, user rotational force at the upper footplate 5 pivot isolates foot adduction and foot abduction moments on the transverse plane (when the user's knees are flexed to 90 degrees). The user's rotational force 42 applied to the footplate 5 creates hip internal and hip external rotation moments and foot adduction and foot abduction moments on the transverse plane during ambulation (when the knees are fully or mostly extended). During ambulation as well as during device 1 use, transverse force moments are created at both the hip and the foot levels. During device 1 use combination of frontal plane mechanical resistance and footplate leverage through an upper rotational pivot creates transverse force moments at both the hip and the foot levels. As shown in FIG. 16A, the knees are flexed to 90 degrees and there is foot adduction 43 and foot abduction 44. As shown in FIG. 16B, the knees are extended to 0 degrees and there is hip internal rotation 45 and hip external rotation 46. Isolated movements are shown here for illustrative purposes. During both ambulation and device use, hip internal/external rotation, and foot ankle adduction/abduction generally occur as complex, integrated motions, rather than isolated movements. Assistive lower extremity movement, also known as passive motion, across the functional ROM of the user can also be accomplished.

Figure 17B:
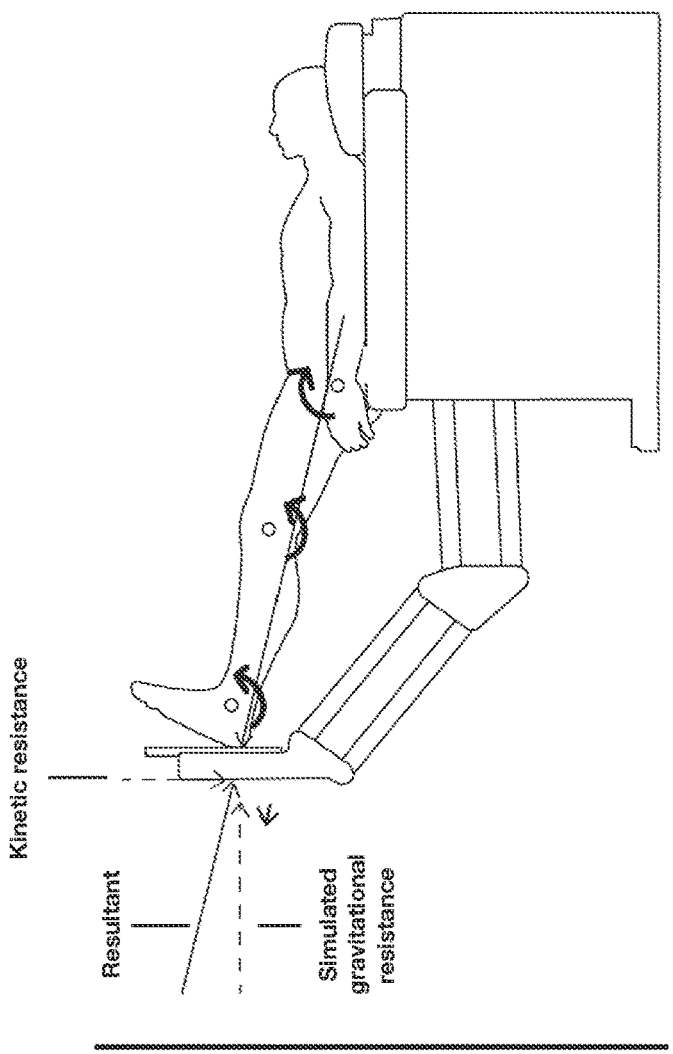
FIGS. 17A-17B illustrate some embodiment of the present invention, describing GRFVs both as experienced at loading response during gait and as applied during device use.
Figure 17A:
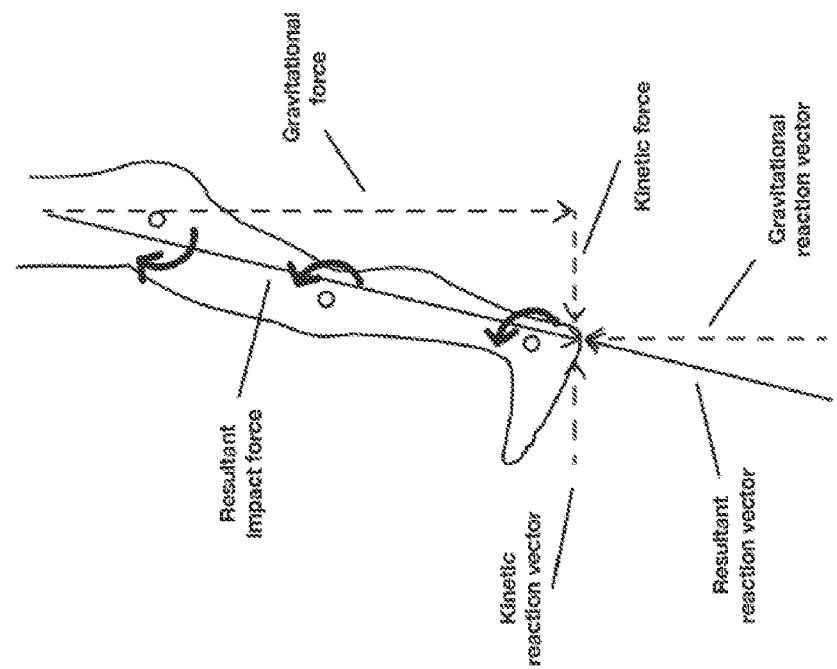

FIGS. 17A-17B illustrate embodiments of the present invention, showing ground reaction force vectors both as experienced at loading response during gait and during device 1 use. Ground reaction force vectors experienced during gait can be replicated during device 1 use. FIGS. 17A-17B illustrates resultant moments of force and muscular activations as viewed from a sagittal perspective. FIG. 17A illustrates the ground reaction force vectors during gait. As shown in FIG. 17A, during gait, there are several forces present. There is the gravitational force, kinetic or inertial force, and resultant impact force. FIG. 17B, illustrates how vertical and anteroposterior ground reaction force vectors can be simulated during device 1 use.

Figure 18B:
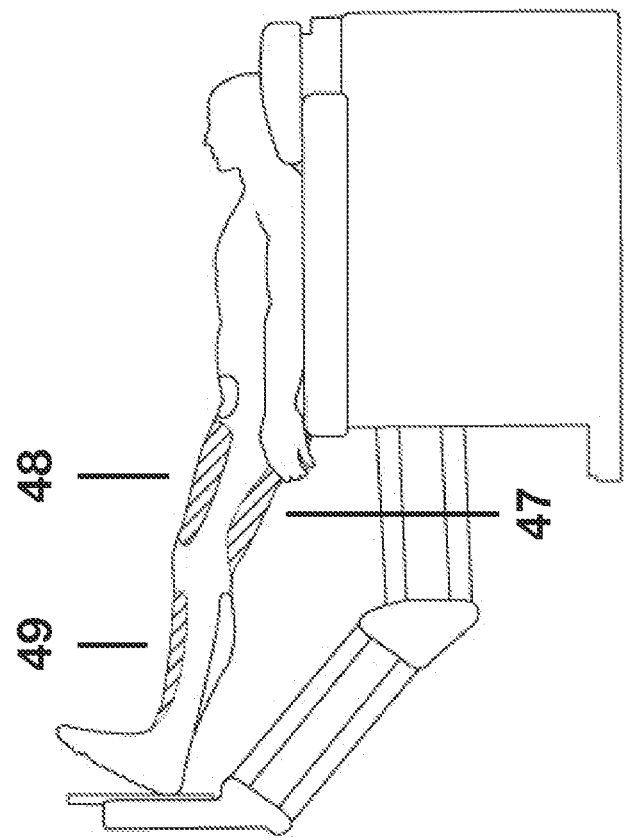
FIGS. 18A-18B illustrate some embodiment of the present invention, describing muscular activation at loading response both during gait and during device use.
Figure 18A:
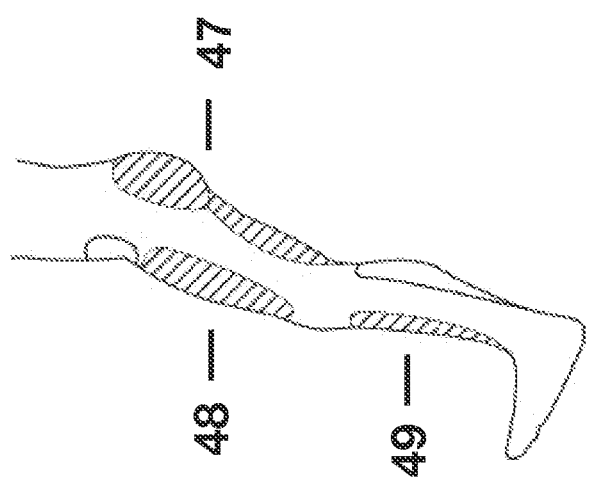

FIGS. 18A-18B illustrate embodiments of the present invention, showing muscular activation at loading response both during gait and during device 1 use from a sagittal perspective. Muscular activations experienced during gait can be replicated during device use. As shown in FIG. 18A, the highlighted muscle groups, mainly eccentric hip extensors 47, eccentric quadriceps 48, and eccentric dorsiflexors 49 are activated during gait at loading response. As shown in FIG. 18B, the same muscle groups, eccentric hip extensors 47, eccentric quadriceps 48, and eccentric dorsiflexors 49, are activated during device 1 use at loading response.

FIG. 19 illustrates human ambulation, showing relative body weight (BW) values experienced while standing and at mid-stance of various gaits. Different gaits cause the musculoskeletal system to experience varying force magnitudes (expressed as BW) due to differences in the musculoskeletal system's vertical acceleration and deceleration against the ambulatory environment. For example, FIG. 19A shows a human standing on earth experiences 1 BW (750N) 50, FIG. 19B shows a human during walking experiences 1.5 BW 51, FIG. 19C shows a human during jogging experiences 2.5 BW 52, and FIG. 19D shows a human sprinting experiences 7.5 BW 53. Even higher BW values can be experienced when landing from jumps.

Figure 20A:
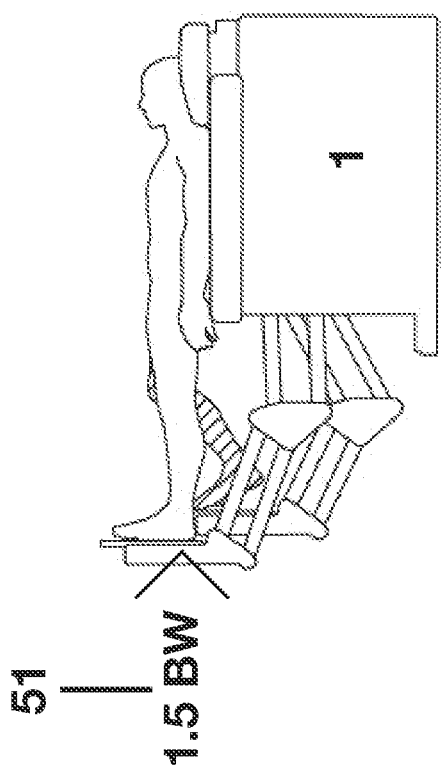
FIGS. 20A-20D illustrate some embodiment of the present invention, describing relative BW values during device use that replicate the BW values experienced while standing and at mid-stance of various gaits.
Figure 20B:
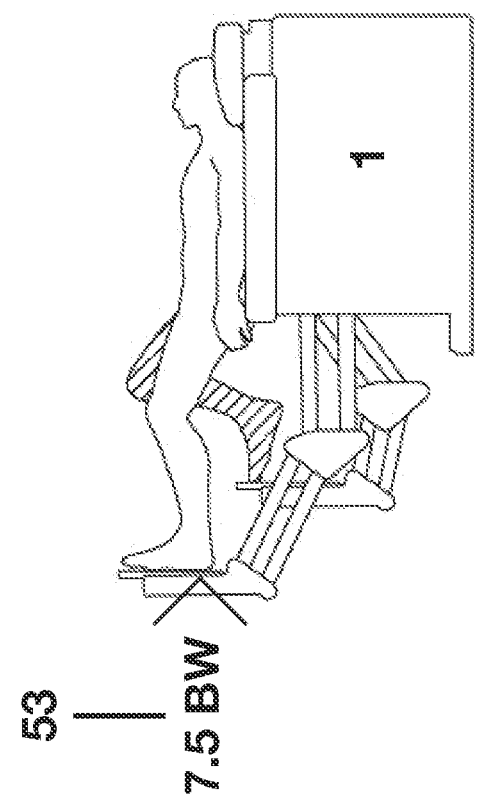
Figure 20C:
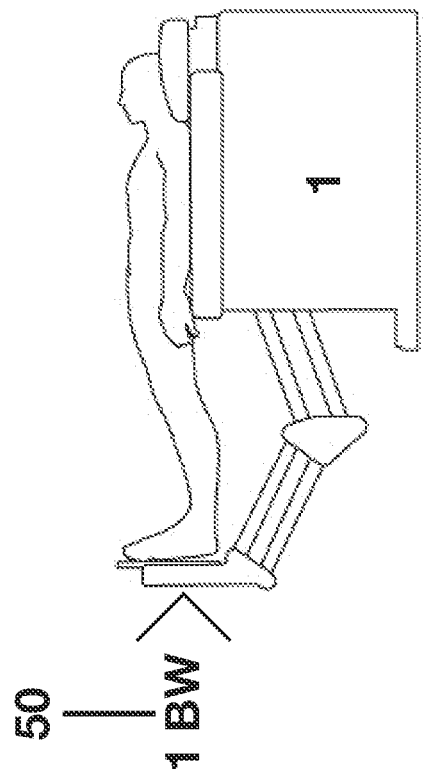
Figure 20D:
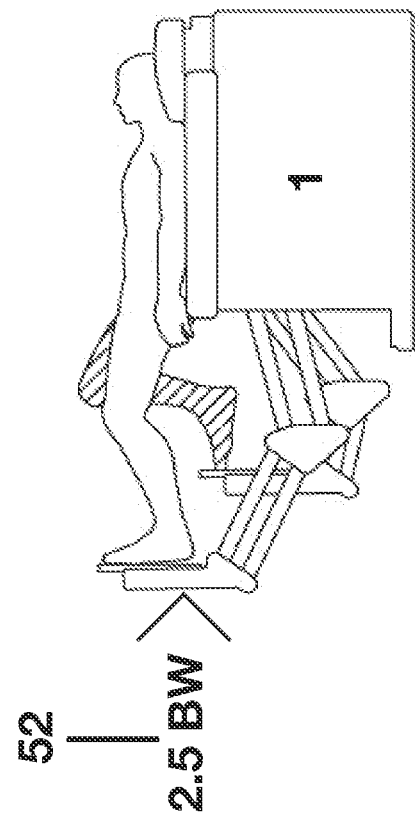

FIGS. 20A-20D illustrate embodiments of the present invention, showing relative BW values experienced while standing and at mid-stance of various gaits during device 1 use. BW values experienced during various gaits can be replicated during device 1 use. Increasing resistance allows for replication of various gait BW values. For example, FIG. 20A illustrates a human on the device mimicking standing with a BW value of about 1 BW 50. FIG. 20B illustrates a human on the device mimicking mid-stance during walking with a BW value of about 1.5 BW 51. FIG. 20C illustrates a human on the device mimicking mid-stance during jogging with a BW value of about 2.5 BW 52, and FIG. 20D illustrates a human on the device mimicking mid-stance during sprinting with a BW value of about 7.5 BW 53.

Figure 21A:
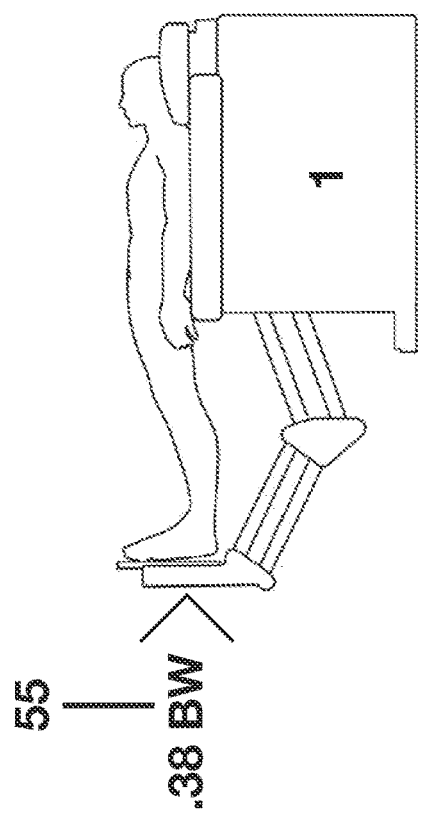
FIGS. 21A-21D illustrate some embodiment of the present invention, describing application of reduced BW values during device use in order to mimic low-gravity environments.
Figure 21B:
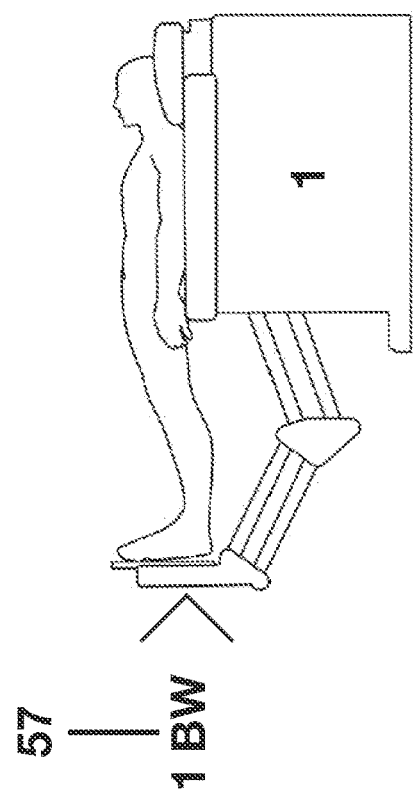
Figure 21C:
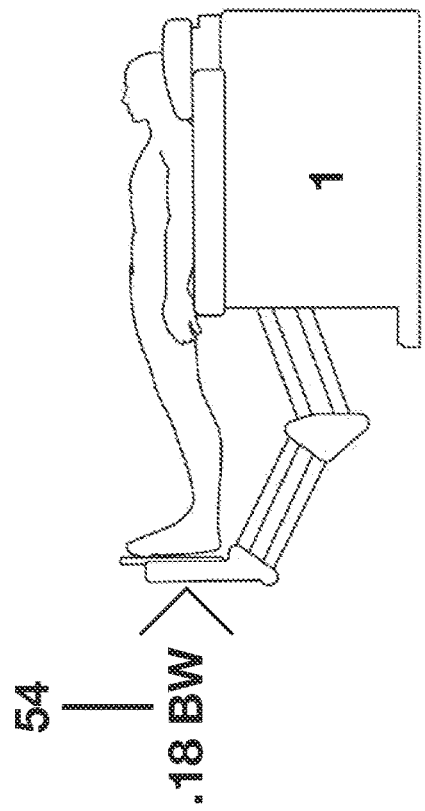
Figure 21D:
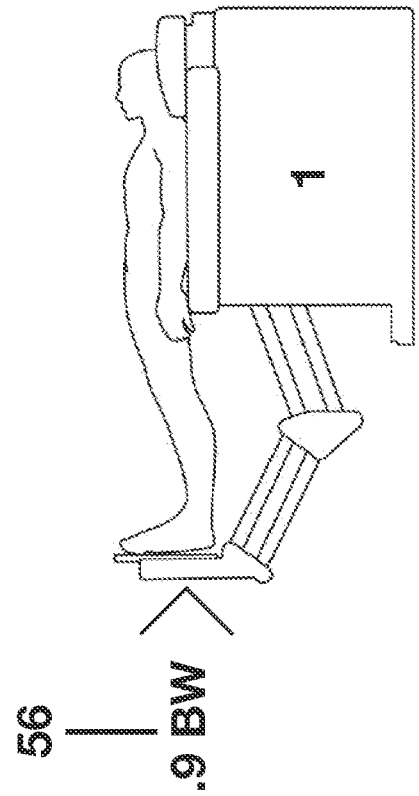

FIGS. 21A-21D illustrate embodiments of the present invention, showing reduced BW values during device 1 use in order to mimic low-gravity environments. BW values during device 1 use can be reduced to simulate low gravity environments or adjusted to allow for progressive exercise programs or use by individuals unable to perform weight-bearing ambulation. For example, as shown in FIG. 21A, the device 1 can be adjusted to mimic standing on the moon with a BW value of about 0.18 BW 54. In FIG. 21B, the device 1 can be adjusted to mimic standing on Mars with a BW value of about 0.38 BW 55. In FIG. 20C, the device 1 can be adjusted to mimic standing on Venus with a BW value of about 0.9 BW 56. In FIG. 20D, the device 1 can be adjusted to mimic standing on Earth with a BW value of about 1 BW 57.

Figure 22A:
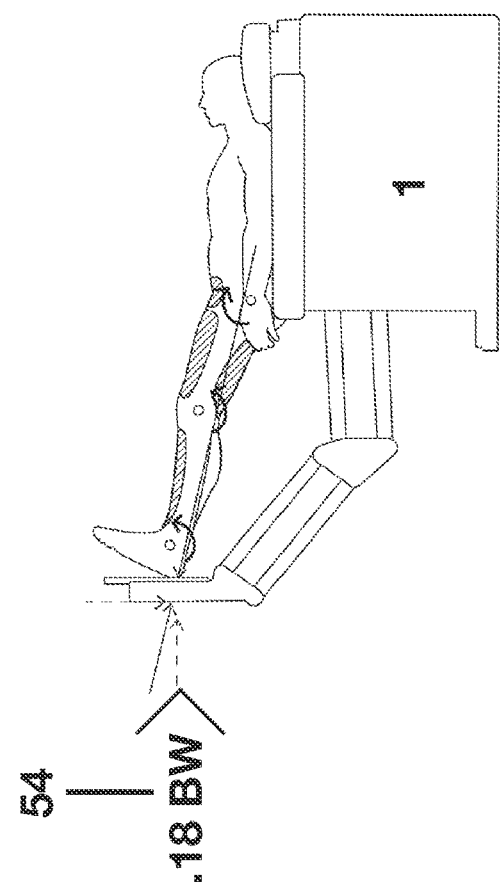
FIGS. 22A-22D illustrate some embodiment of the present invention, describing reduced simulated GRFVs experienced during device use that produce moments of force and initiate muscular activation sequences identical to those experienced during ambulation.
Figure 22B:
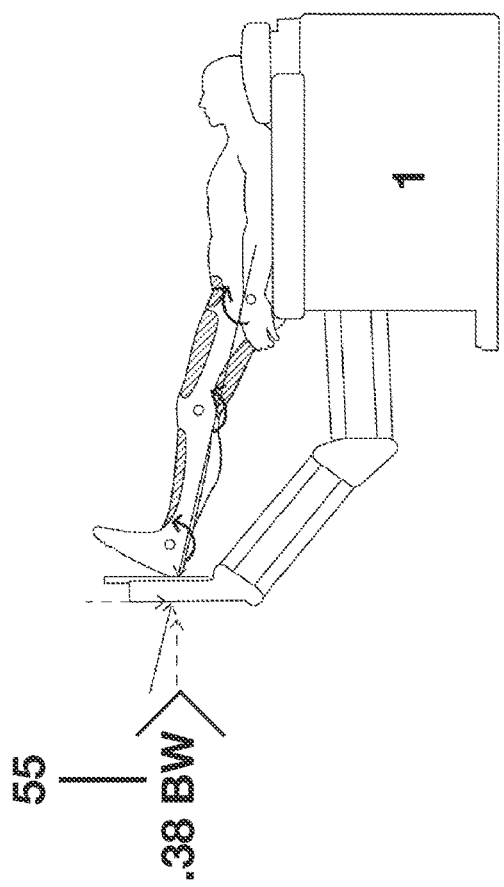
Figure 22C:
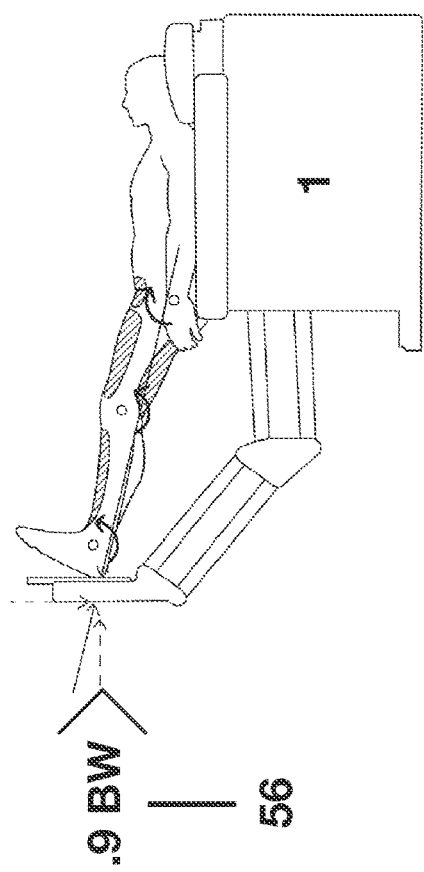
Figure 22D:
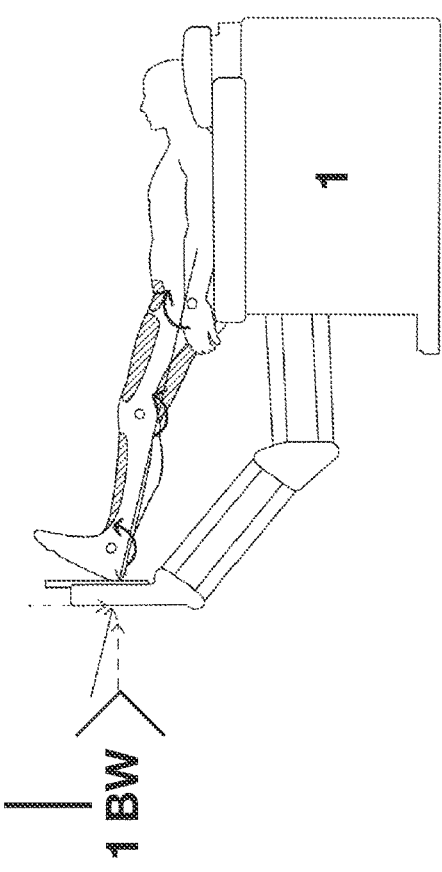

FIGS. 22A-22D illustrate embodiments of the present invention, showing reduced simulated GRFVs during device 1 use that produce identical moments of force and sequences of muscular activation as experienced during ambulation. Reduced BW values during device 1 use produce identical moments of force and sequences of muscular activations as experienced during ambulation. As shown in FIG. 22A, the BW value is reduced to about 0.18 BW 54 during ambulation on the device 1 so as to mimic ambulation on the moon. As shown in FIG. 22B, the BW value is reduced to about 0.38 BW 55 during ambulation on the device 1 so as to mimic ambulation on mars. As shown in FIG. 22C, the BW value is reduced to about 0.9 BW 56 so as to mimic ambulation on Venus. Lastly, as shown in FIG. 22D, the BW value is at about 1 BW 57 so as to mimic ambulation on Earth.

Figure 23D:
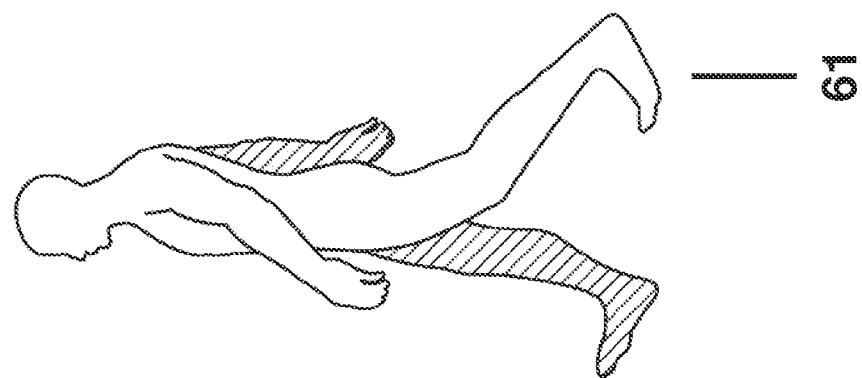
FIGS. 23A-23D illustrate some embodiment of the present invention, describing walking gait functional stance phase ROM.
Figure 23C:
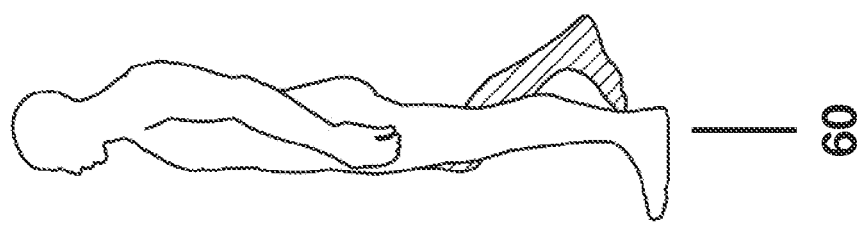
Figure 23B:
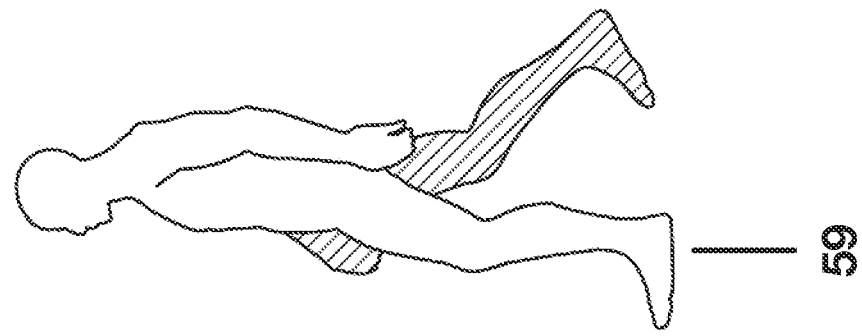
Figure 23A:
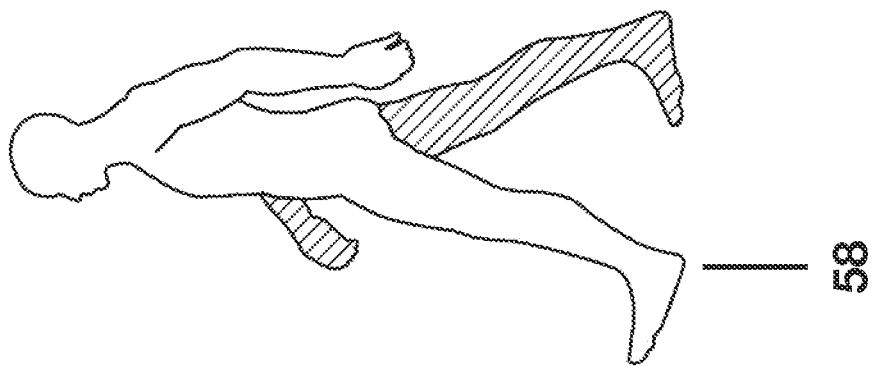

FIGS. 23A-23D illustrate embodiments of the present invention, showing functional stance phase ROM during walking gait on the sagittal plane. FIGS. 23A-23D illustrate ROM during the stance phase of human gait. For example, FIG. 23A illustrates initial contact with hip flexion at approximately 20 degrees, knee flexion at approximately 5 degrees, and dorsal flexion at approximately 0 degrees 58. FIG. 23B illustrates loading response with hip flexion at approximately 17 degrees, knee flexion at approximately 18 degrees, and plantar flexion at approximately 4 degrees 59, FIG. 23C illustrates mid-stance with hip extension at approximately 7 degrees, knee flexion at approximately 3 degrees, and dorsal flexion at approximately 5 degrees 60, and FIG. 23D illustrates pre-swing with hip extension at approximately 16 degrees, knee flexion at approximately 37 degrees, and dorsal flexion at approximately 22 degrees 61.

Figure 24A:
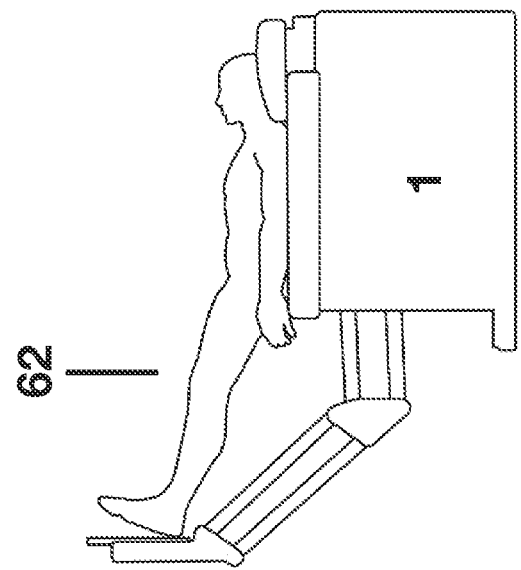
FIGS. 24A-24D illustrate some embodiment of the present invention, describing walking gait functional stance phase ROM during device use.
Figure 24B:
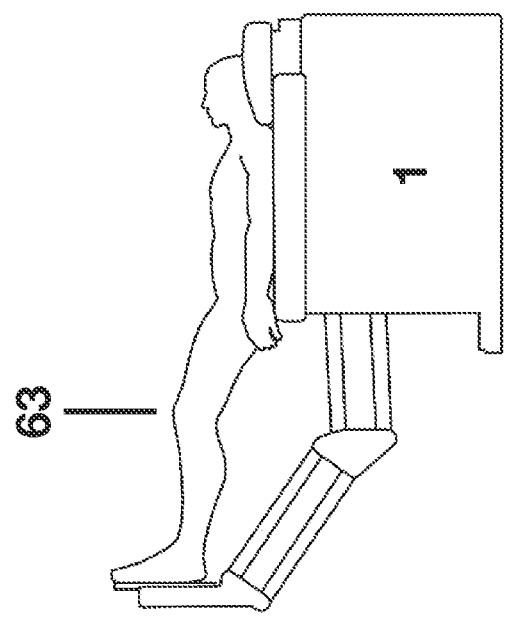
Figure 24C:
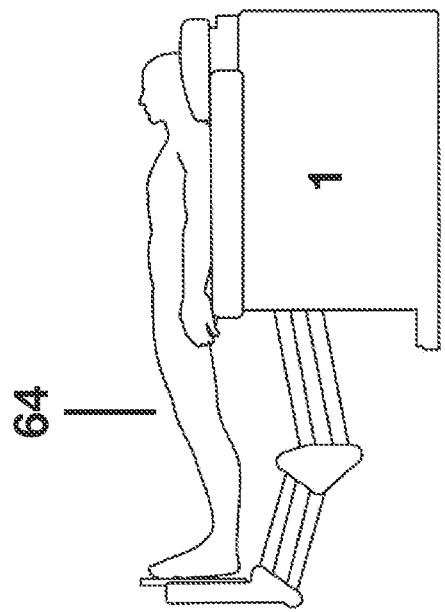
Figure 24D:
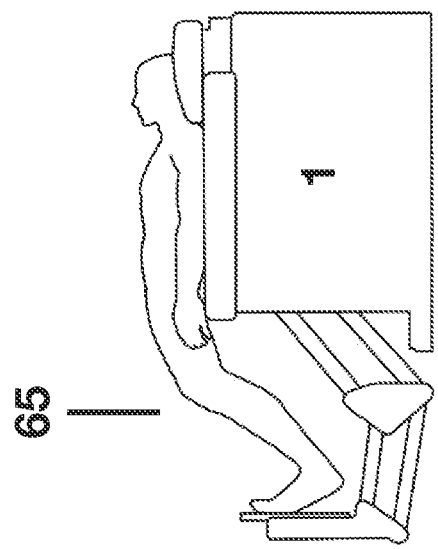

FIGS. 24A-24D illustrate embodiments of the present invention, showing functional stance phase ROM during device 1 use. FIG. 24A illustrates initial contact with hip flexion at approximately 20 degrees, knee flexion at approximately 5 degrees, and dorsal flexion at approximately 0 degrees 62. FIG. 24B illustrates loading response with hip flexion at approximately 17 degrees, knee flexion at approximately 18 degrees, and plantar flexion at approximately 4 degrees 63. FIG. 24C illustrates mid-stance with hip extension at approximately 7 degrees, knee flexion at approximately 3 degrees, and dorsal flexion at approximately 5 degrees 64. FIG. 24D illustrates pre-swing with hip extension at approximately 16 degrees, knee flexion at approximately 37 degrees, and dorsal flexion at approximately 22 degrees 65.

Figure 25A:
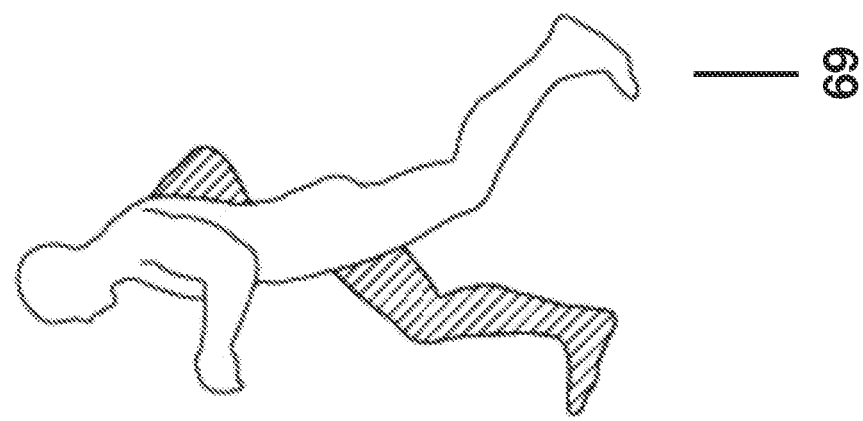
FIGS. 25A-25D illustrate some embodiment of the present invention, describing running gait functional stance phase ROM.
Figure 25B:
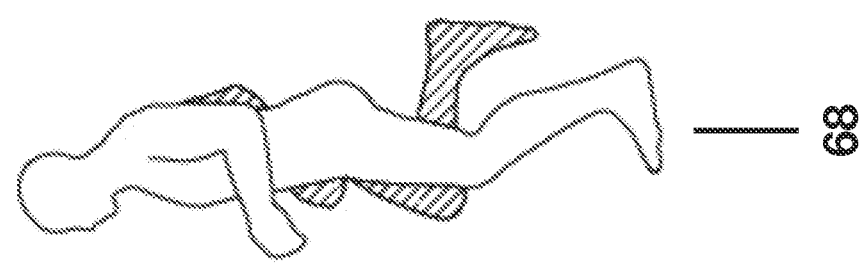
Figure 25C:
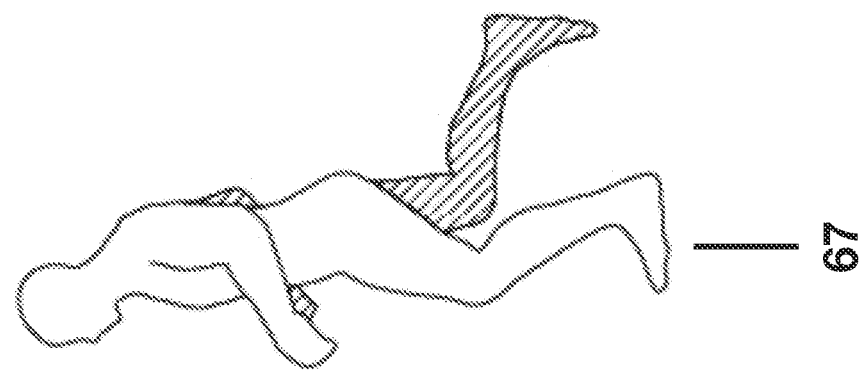
Figure 25D:
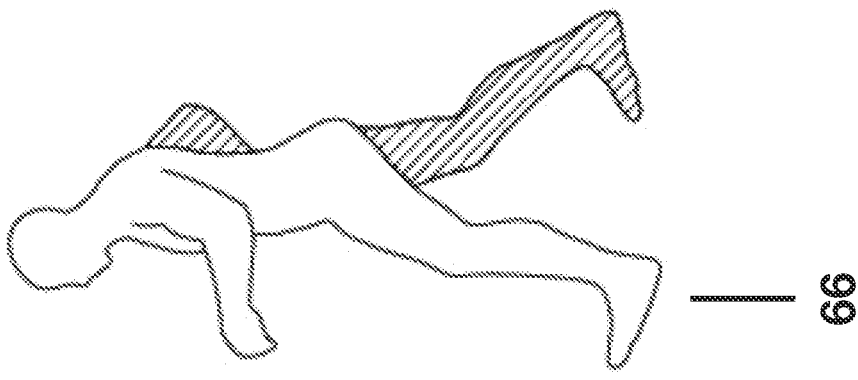

FIGS. 25A-25D illustrate embodiments of the present invention, showing functional stance phase ROM on the sagittal plane during running gait and during device 1 use. FIG. 25A illustrates initial contact with hip flexion at approximately 43 degrees, knee flexion at approximately 14 degrees, and dorsal flexion at approximately 15 degrees 66. FIG. 25B illustrates loading response on the device 1 with hip flexion at approximately 38 degrees, knee flexion at approximately 42 degrees, and dorsal flexion at approximately 25 degrees 67. FIG. 25C illustrates mid-stance on the device 1 with hip flexion at approximately 22 degrees, knee flexion at approximately 40 degrees, and dorsal flexion at approximately 28 degrees 68, and FIG. 25D illustrates pre-swing on the device 1 with hip flexion at approximately 10 degrees, knee flexion at approximately 40 degrees, and plantar flexion at approximately 10 degrees 69.

Figure 26A:
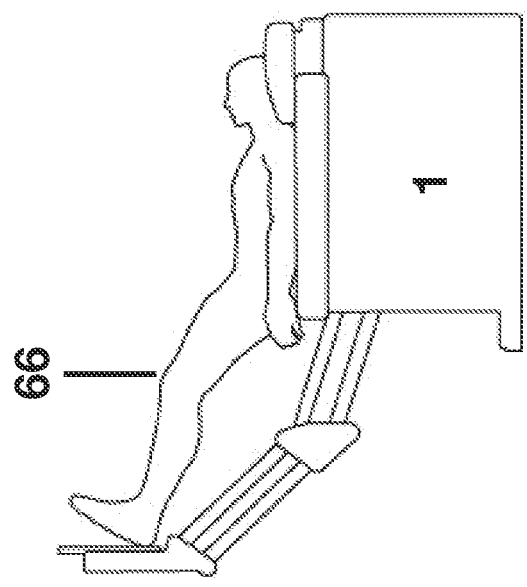
FIGS. 26A-26D illustrate some embodiment of the present invention, describing running gait functional stance phase ROM during device use.
Figure 26B:
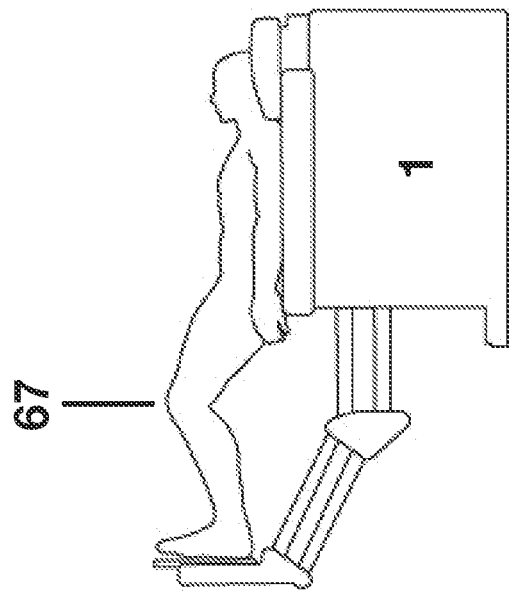
Figure 26C:
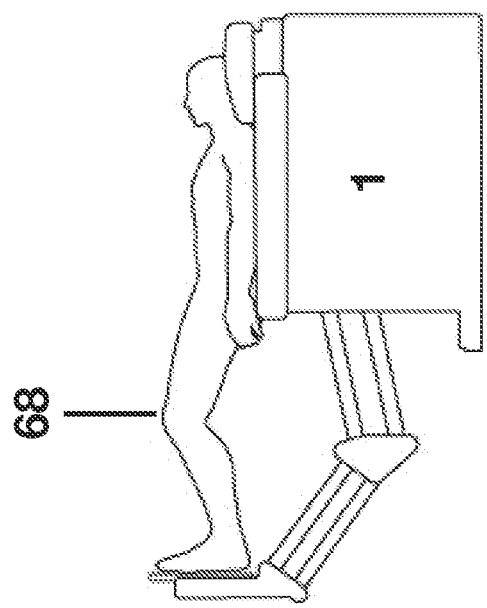
Figure 26D:
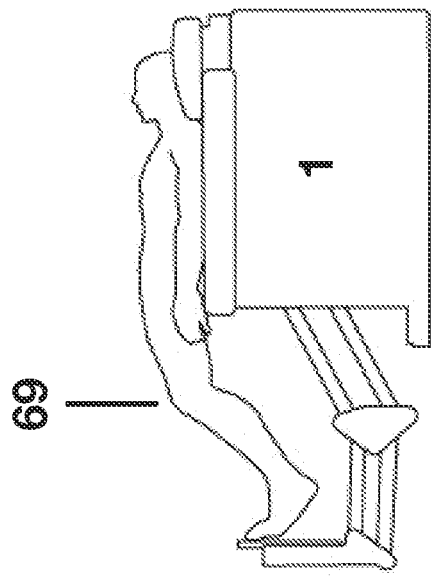

FIGS. 26A-26D illustrate embodiments of the present invention, showing functional stance phase ROM during device 1 use. The functional ROM experienced during running gait can be replicated during device 1 use. FIG. 26A illustrates initial contact with hip flexion at approximately 43 degrees, knee flexion at approximately 14 degrees, and dorsal flexion at approximately 15 degrees 66. FIG. 26B illustrates loading response on the device 1 with hip flexion at approximately 38 degrees, knee flexion at approximately 42 degrees, and dorsal flexion at approximately 25 degrees 67. FIG. 26C illustrates mid-stance on the device 1 with hip flexion at approximately 22 degrees, knee flexion at approximately 40 degrees, and dorsal flexion at approximately 28 degrees 68. FIG. 26D illustrates pre-swing on the device 1 with hip flexion at approximately 10 degrees, knee flexion at approximately 40 degrees, and plantar flexion at approximately 10 degrees 69.

Figure 27B:
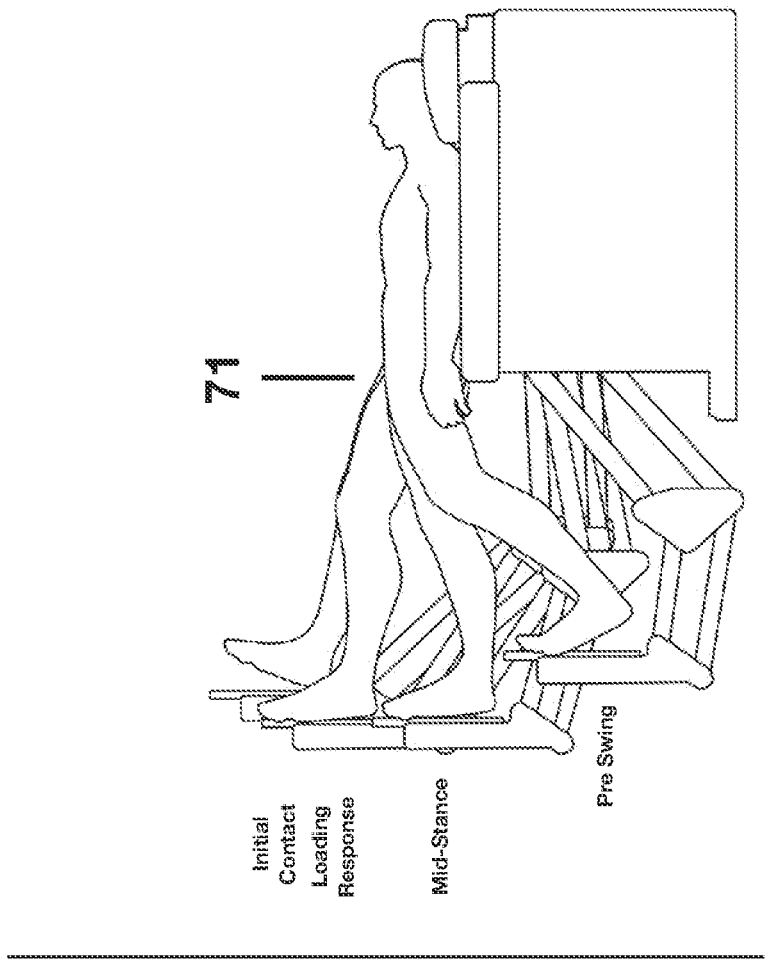
FIGS. 27A-27B illustrate some embodiment of the present invention, describing fixed-foot moving-pelvis motion patterns during walking gait, and the same motion patterns from a stable-pelvis moving-foot perspective during device use.
Figure 27A:
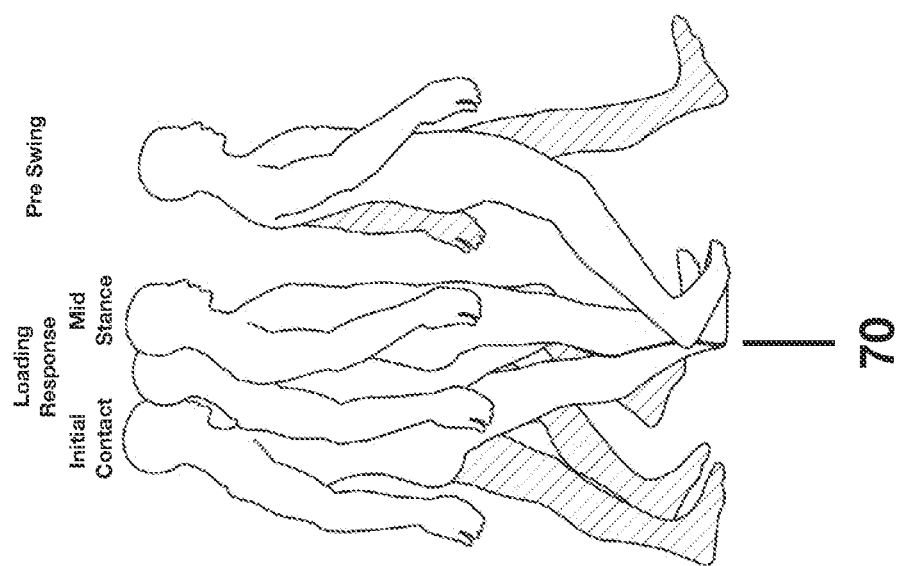

FIGS. 27A-27B illustrate embodiments of the present invention, showing fixed-foot moving-pelvis 70 motion patterns during walking gait and the same patterns performed with a stable-pelvis moving-foot motion 71 during device 1 use. As shown in FIG. 27A, on heel strike during walking gait, the foot is locked in position while the pelvis moves posterior to anterior in relation to a fixed foot. There is loading response, mid-stance, terminal stance, and then pre-swing. As shown in FIG. 27B, on heel strike during device 1 use, the pelvis is locked in position while the foot moves anterior to posterior. Similarly, there is initial contact, loading response, mid-stance and then pre-swing. Motion patterns performed on the device must take into account movement patterns of the pelvis during ambulation and combine them with foot motion patterns to mimic the full range of pelvis-to-foot motion that occurs during ambulation.

FIGS. 28A-28C illustrate embodiments of the present invention, showing stance and swing phase foot motions from a stable-pelvis perspective on the sagittal plane during walking gait. The sagittal stance phase pattern is shown in FIG. 28A. The combined swing phase and stance phase pattern is shown in FIG. 28B. In FIG. 28C, the swing phase pattern is depicted.

Figure 29C:
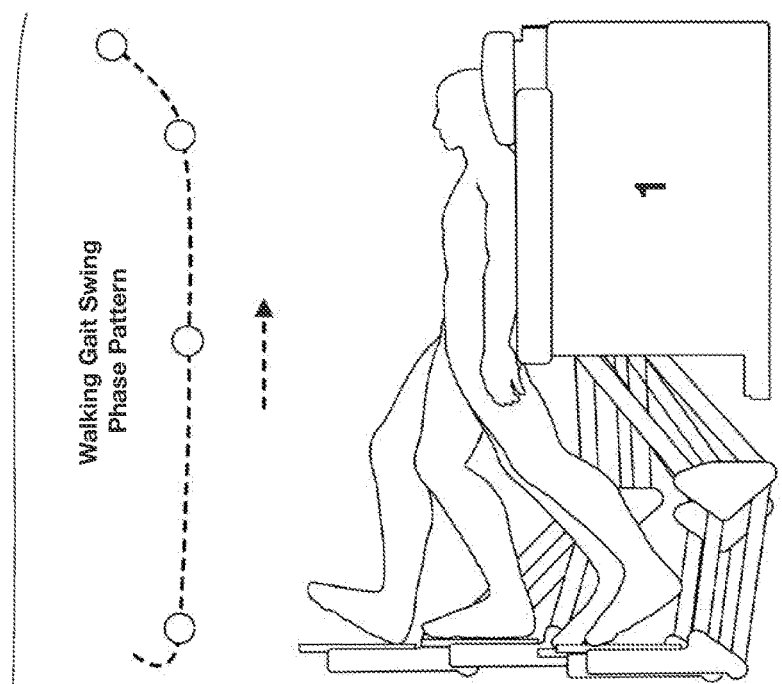
FIGS. 29A-29C illustrate some embodiment of the present invention, describing stance and swing phase footplate motion patterns from a stable-pelvis perspective on the sagittal plane during device use.
Figure 29B:
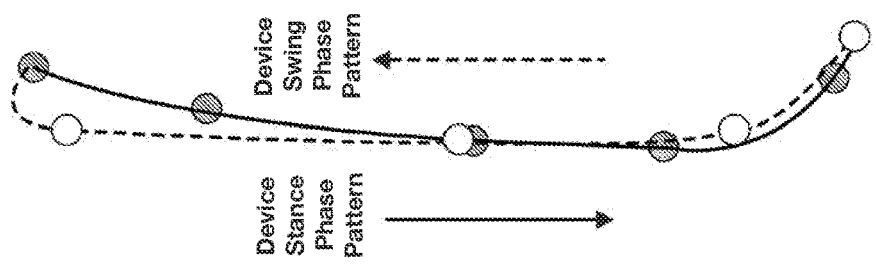
Figure 29A:
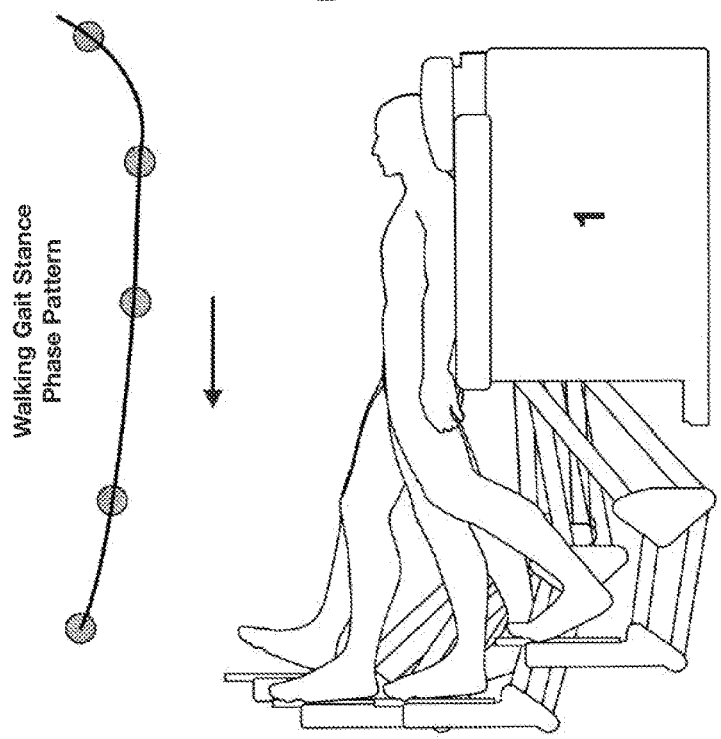

FIGS. 29A-29C illustrate embodiments of the present invention, showing stance and swing phase motion patterns on the device from a sagittal perspective. FIG. 29A shows a stance phase pattern from a stable-pelvis perspective 71 during device 1 use. The combined swing phase and stance phase pattern is shown in FIG. 29B. FIG. 29C illustrates a swing phase pattern with footplate 5 motions from a stable-pelvis perspective 71 during device 1 use.

Figure 30:
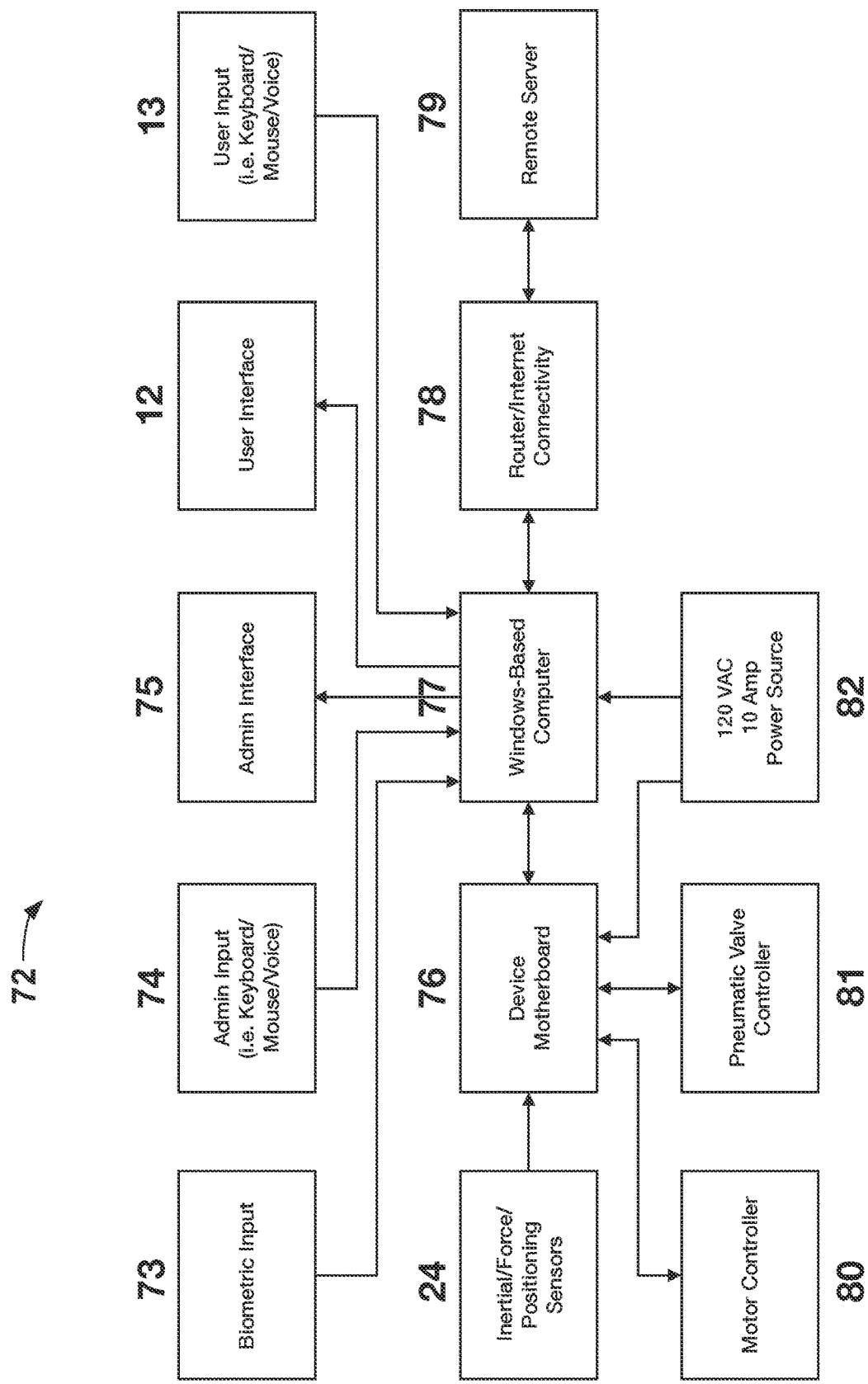
FIG. 30 illustrates some embodiment of the present invention, showing the relationship of electronic modules incorporated into the device.

FIG. 30 illustrates embodiments of the present invention, showing electronic modules incorporated into the device 1. There is an integrated electronics system 72 that controls all device settings, functions and routines. For example, user sizing input can be entered into the computer 77 using an input mechanism 13, 73, 74 such as a keyboard, mouse, or voice. The administrator or user receives output from the user interface 12 and/or the administrative interface 75. Once input is entered into the computer 77, the input travels to the motherboard 76, and from the motherboard 76 there are two-way communications between the motor controller 80, and pneumatic valve controller 81. Information from the inertial, force, positioning sensors 24 is sent to the device motherboard 76. The router/internet connectivity 78 provides for a two-way communication between the remote server 79 and computer 77. The remote server 79 communicates with the router/internet connectivity 78 and computer 77. There is a power source 82 of about 120 VAC, 10 Amp.

Figure 31:
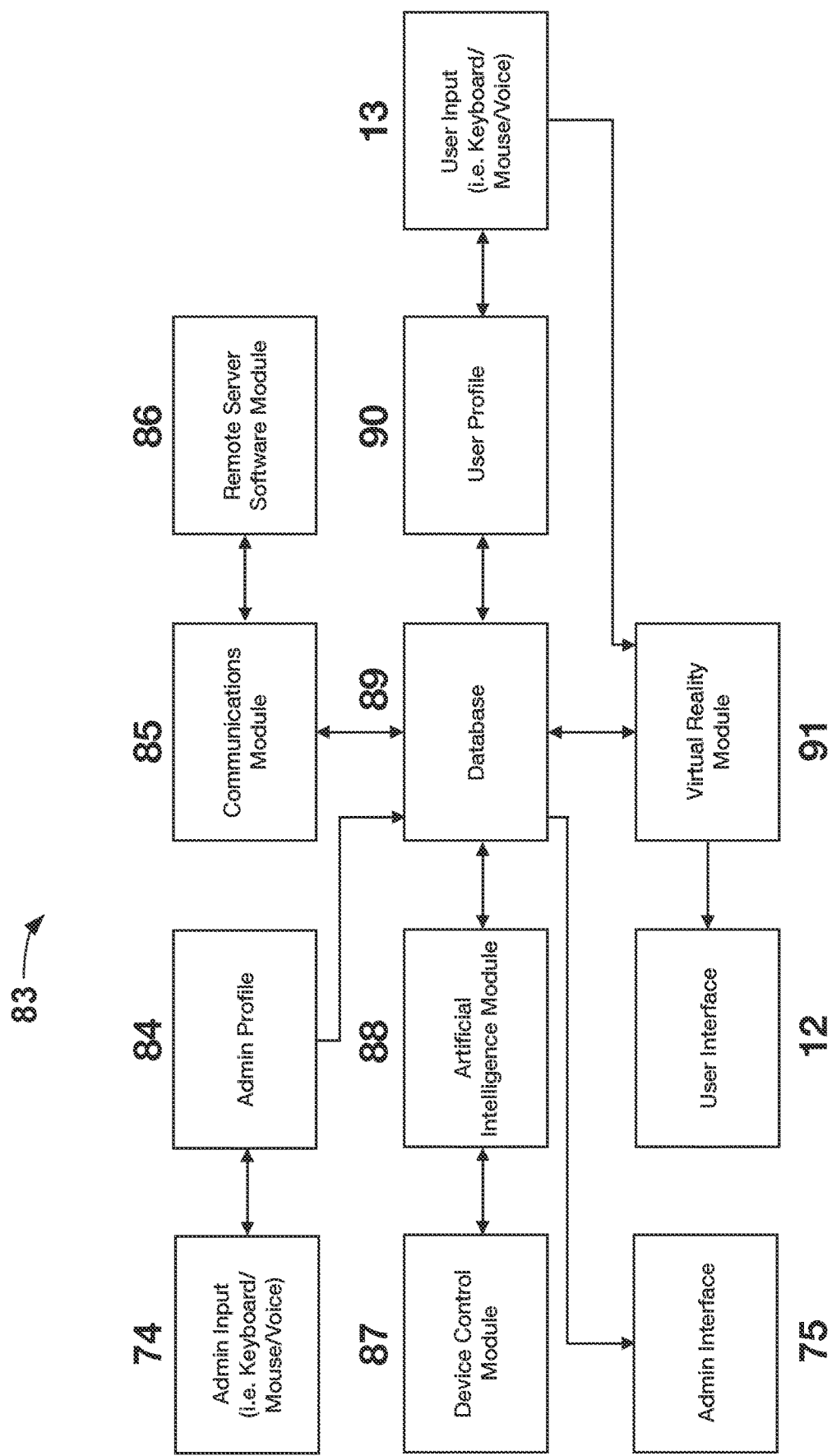
FIG. 31 illustrates some embodiment of the present invention, showing the relationship of software modules incorporated into the device.

FIG. 31 illustrates embodiments of the present invention, showing the relationship of software modules incorporated into the device. An integrated software system 83 drives the device 1 operation and user experience. There is a software system that runs on a separate computer such as a Windows tablet 77 and which includes a database 89, and which interfaces with the electronics 72 to provide for 1) displaying the user interface, 2) creating multiple account categories, 3) inputting data, 4) sizing the device to the user, 5) positioning the device for ingress and egress, 6) positioning the device for use, 7) creating protocol, 8) selecting protocol, 9) modifying protocol, 10) initiating an exercise session, 11) capturing a session, 12) displaying real-time feedback during a session, 13) analyzing session results, 14) communicating session results (i.e., to the user, patient, therapist, physician, or insurer, as appropriate), 15) automating adaptation of settings based on user performance or 16) based on therapeutic or exercise protocol, 17) manual adaptation of settings based on user or therapist preference, and 18) incorporating a VR video game interface to improve user compliance by guiding users to achieve specific 3D ambulatory objectives by (from their perspective) playing a game. The software application that serves as the user interface and includes the database 89 can be incorporated into the on-board electronics 72 or accessed from a remote server, computer, or gaming system (i.e., Magic Leap, Microsoft Xbox, Sony PlayStation, Nintendo Switch, Microsoft Windows, MacOS, Oculus Rift, Apple iOS, Android, Steam, or other console, cloud, wearable, or portable gaming system).

According to some embodiments of the present invention, the database 89 1) records performance parameters (i.e., strength, flexibility, speed, and endurance), 2) assesses patient performance, and 3) identifies injuries, weakness, or control issues, 4) compares and contrasts performance over time, 5) provides quantitative therapeutic analysis, and 6) communicates results to the user or other parties, as appropriate. This database will be hosted either on the device, on a user device such as a wearable or smart phone, or on a cloud-based server. There can be multiple user types, including administrator (i.e., individual responsible for device management), service provider (i.e., manufacturer, authorized independent technician, or internal technician), manager (i.e., trainer, coach, therapist, physician, or other clinician), user (i.e., therapy patient, gamer, athlete, or general fitness user), and payor (i.e., team, company, or insurer). Upon initial installation, an administrator profile 84 must be created, and machine-use parameters must be defined. On first use, a user profile 90 must be created for each user. At a minimum, the user profile 90 must include the unique user name and lower extremity measurements (toe-to-heel or shoe size, ankle-to-knee, and knee-to-hip). The capture and input of these measurements can be done manually (i.e., tape measure or ruler) or automatically (i.e., motion sensors or visual scanners). Once stored, measurements and profile information serve as a baseline for sizing and settings in future sessions.

The software can command the electronics and the sensors to manage resistance on a plurality of planes in real-time while providing user feedback and guidance. FIGS. 32A-32B illustrate embodiments of the present invention, showing how specific segments of ambulatory motion patterns correlate to specific moments of force and resultant muscular activations. The segments of ambulatory motion patterns that elicit specific moments of force and muscular activations can be isolated as complex 3D curves reflecting three planes of motion from the perspective of the footplate (ambulatory surface). These segments serve as virtual guides for the user's active foot motions during device 1 use. FIG. 32A illustrates a combined stance phase/swing phase motion pattern of walking gait 92, with the loading response segment (IC/LR) of walking gait 93 highlighted. FIG. 32B is a chart that identifies force moments and muscular activations that correspond to the loading response segment of walking gait.

Figure 33:
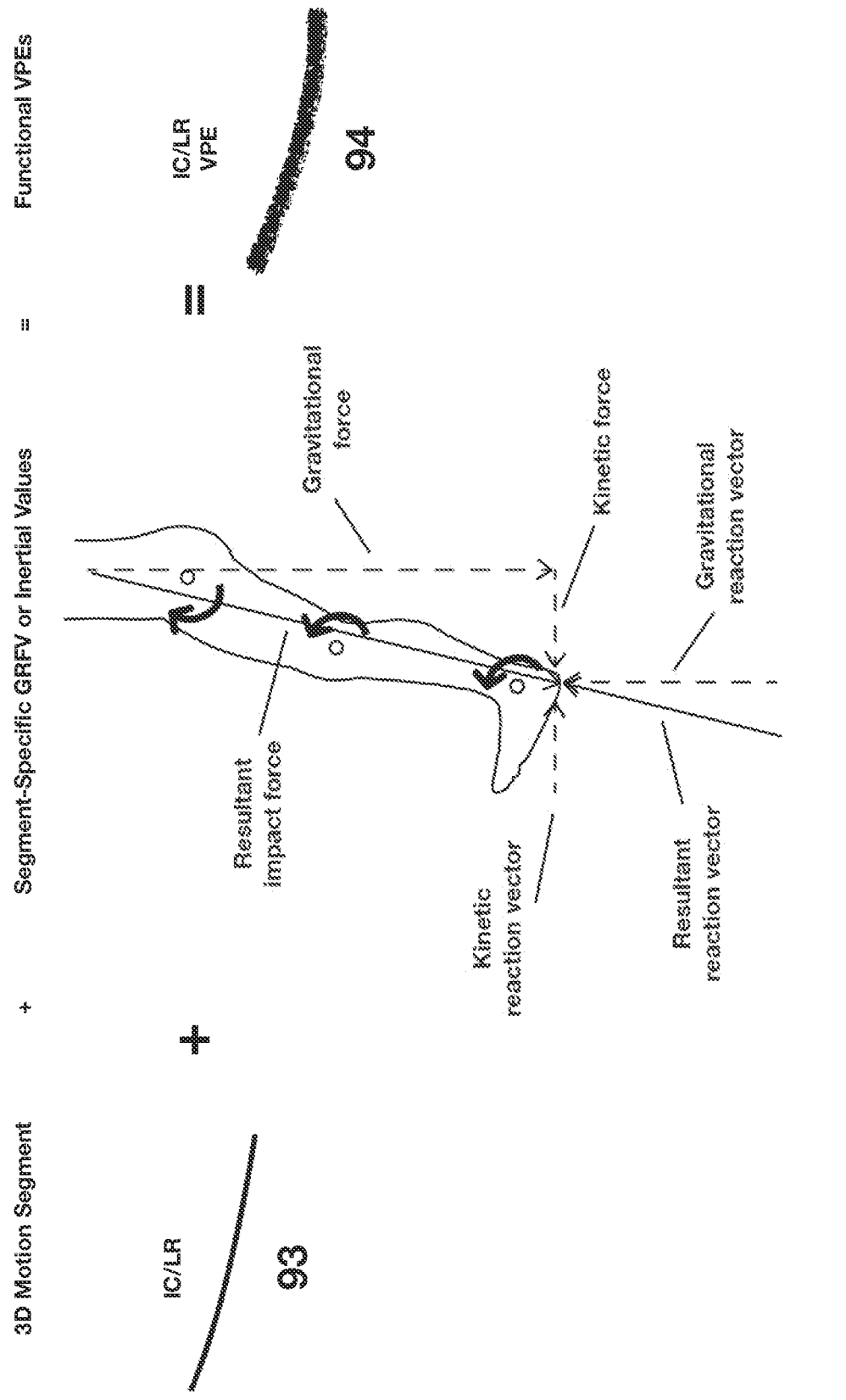
FIG. 33 illustrates some embodiment of the present invention, showing the moments of force and muscular activations that correspond to performance of the initial contact to loading response (IC/LR) segment of walking gait.

FIG. 33 illustrates embodiments of the present invention, showing the moments of force and muscular activations that correspond to performance of the loading response (IC/LR) segment 93 of walking gait. A motion segment can be programmed with appropriate GRFV values to create virtual programming elements (VPEs). These VPEs can then be executed on the device 1 and will elicit moments of force and muscular activations based on the selected motions and GRFVs. VPEs can be created by adding the GRFV values related to the specific segment of ambulatory motion to create functional VPEs. Resistance values of GRFVs can be increased or decreased to provide for functional motions that are adapted to clinical requirements or user performance capabilities.

Figure 34B:
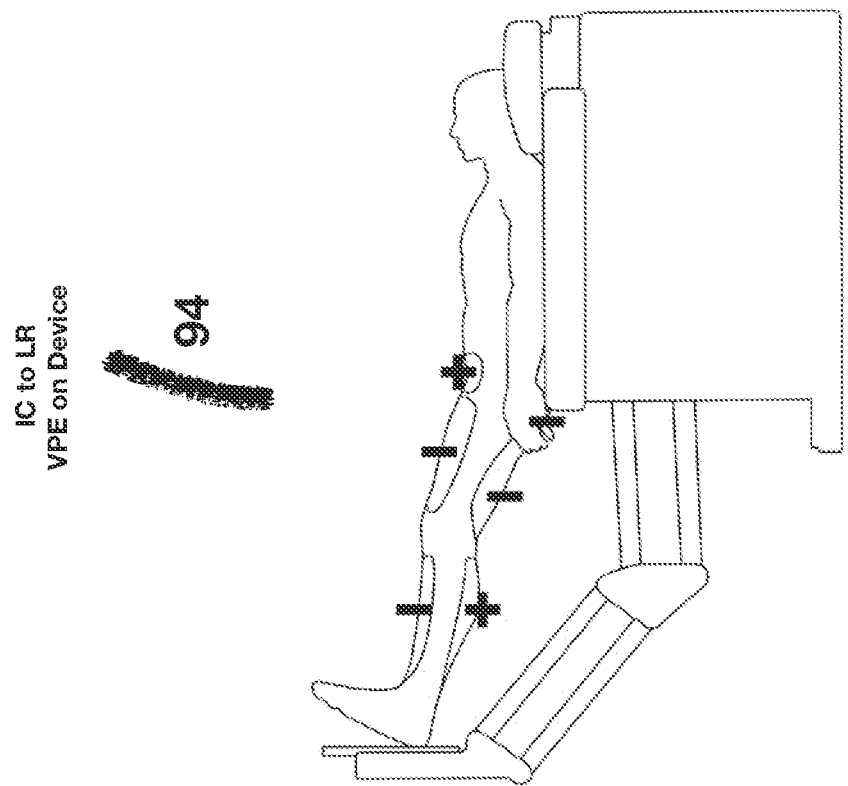
FIG. 34A-34B illustrate some embodiment of the present invention, showing how virtual programming elements (VPEs) are executed on the device by the user to elicit functional kinetic patterns.
Figure 34A:
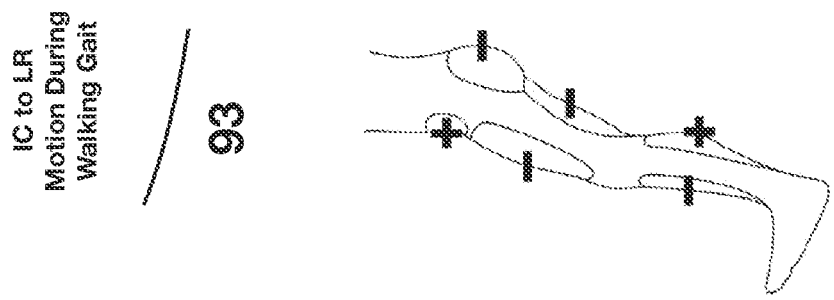

FIGS. 34A-34B illustrate embodiments of the present invention, showing how VPEs are executed on the device 1 by the user to elicit functional kinetic patterns. FIGS. 32A-32B depict a sagittal plane perspective. As an example, FIG. 32A illustrates the muscular activations occurring during the loading response segment of walking gait. In FIG. 32B, the VPE 94 shown is a pattern that guides the user to mimic the performance of loading response 93 during walking gait on the device 1. The moments of force and resultant muscular activations of ambulation can be mimicked through performance of visual programming elements during device use.

Figure 35:
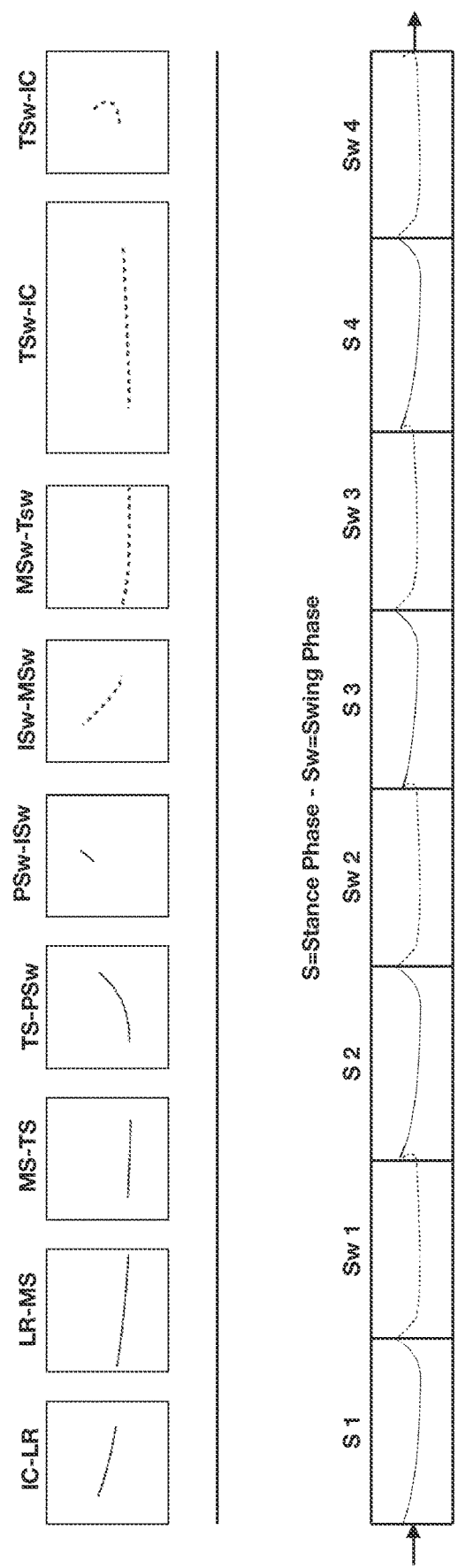
FIG. 35 illustrates some embodiment of the present invention, showing the performance of VPEs in their natural order to mimic various gaits during ambulation.

FIG. 35 illustrates embodiments of the present invention, showing the performance of VPEs in their natural order to mimic various gaits during ambulation. VPEs can be placed in their natural order to mimic functional gait cycles such as walking or running during device 1 use, but with variable ground force values. FIG. 35 illustrates VPEs guiding a single leg in walking gait on the device 1 from a sagittal plane perspective. Other functional segments representing movement outside typical gait kinematics can also be developed, based on motions specific to athletic movements (i.e., kicking, skiing, or jumping). These complex motions drive the performance of the exercise session and serve to satisfy specific or global ambulatory objectives. GRFV values can be increased or decreased to satisfy functional joint-loading and muscle-activation requirements, and specific functional patterns can be performed in sufficient repetitions to promote optimal global ambulatory performance, while simultaneously improving proprioception.

Figure 36:
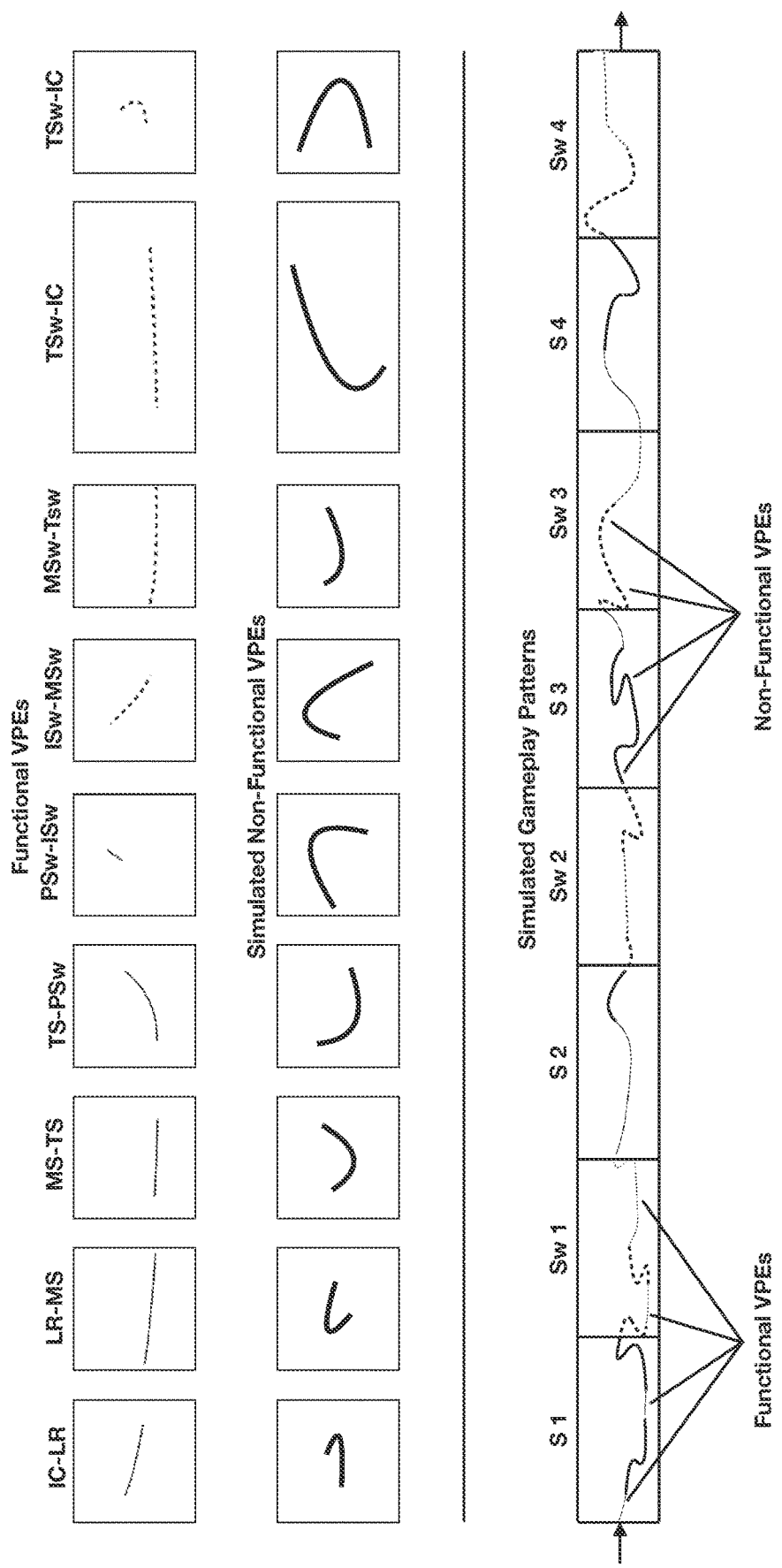
FIG. 36 illustrates some embodiment of the present invention, showing how pattern segments that do not represent segments of functional movements motion can be associated with reduced force values, and how these "non-functional" VPEs can be combined with functional VPEs to create gameplay patterns that satisfy global or specific functional objectives.

FIG. 36 illustrate embodiments of the present invention, showing how VPEs that do not represent segments of functional movements can be associated with reduced force values, and how these "non-functional" VPEs can be combined with functional VPEs to create gameplay patterns that satisfy global or specific functional objectives. Non-functional VPEs comprised of a variety of non-ambulatory motion patterns with reduced force values can be combined with functional VPEs to create gameplay patterns that satisfy specific training or therapeutic objectives. FIG. 36 illustrates a sagittal perspective of use of functional and non-functional VPEs to create gameplay paths. The VPEs are correlated to specific functional deficiencies or ambulatory objectives. The process of creating a protocol requires identifying ambulatory elements needed to affect the desired outcomes, establishing resistance characteristics and settings on all planes, and designating the number of repetitions to be performed. The forces will be dynamically adjusted to replicate GRFVs represented by each segment during the phase of ambulation. Segments are then pieced together, either manually or automatically, to create gameplay paths that serve as a dynamic and functional exercise program. The programming language can be used to design virtual reality (VR) games that support objectives as specific as treatment of patella tendonitis, or as broad as improvement of global ambulatory health and fitness. The individual user's ambulatory health profile can be assessed and serves as a baseline for game play. The footplate 5 becomes a game controller, to be used independently or in conjunction with hand or other controllers. Each game, which is foot-operated, will follow a specific set of routines according to use purpose, with each routine automatically adapted to the biomechanical profile of the individual user. By using VR games as the impetus to perform segments of functional motion patterns in random sequences, sufficient repetitions of functional motions can be achieved in an incremental and sequential order to satisfy all ambulatory objectives, while providing subjective assessments of lower extremity health and fitness. As the user's strength and control improves, the level of resistance and the precision of the tracking parameters can be manually or automatically increased. These VR games can either be realistic, depicting an anatomically-correct real-time representation of lower extremity movement in order to correct kinematics and address specific performance issues (i.e., running or skiing), or unrealistic, where the user attempts to navigate a storyline (i.e., flying a spaceship through an asteroid field, or jumping from cloud-to-cloud) using foot movement to drive on-screen 3D movement of an avatar. Using foot movements to guide computer avatars drives users to follow defined functional motion patterns under realistic joint loads. These movements reinforce proper gait mechanics, strengthen complex muscular chains or individual muscle groups, and provide feedback to improve conscious proprioception. Although the present invention is designed to work for all users across the ambulatory spectrum, different embodiments can be developed to address specific audience needs and ambulatory health profile. For example, the device 1 can incorporate a mechanism that activates the spinal engine, providing functional torso movements and muscular activations from the stable pelvis to the scapula, with stabilized head positioning.

Figure 37B:
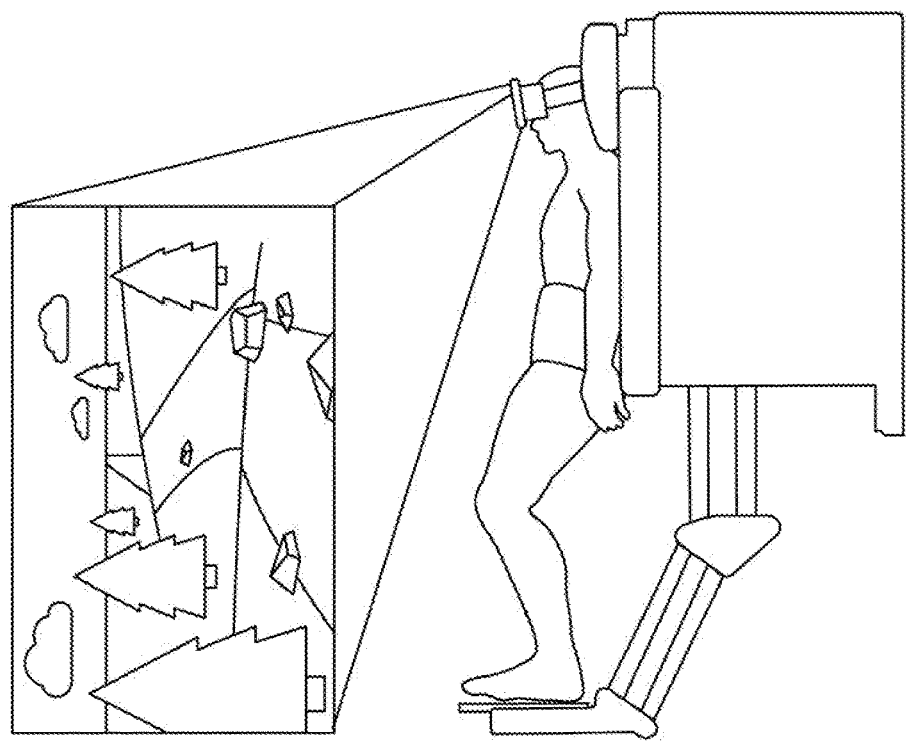
FIGS. 37A-37B illustrate some embodiment of the present invention, showing an actual ambulatory environment and a virtual ambulatory environment as experienced by the user during device use.
Figure 37A:
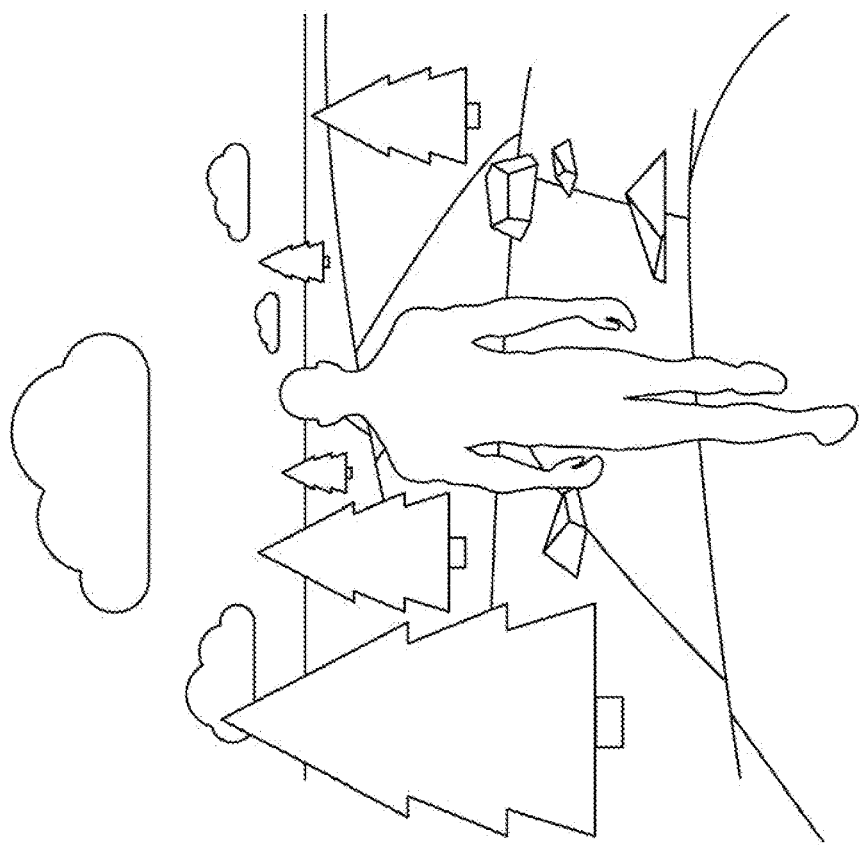
Figure 38A:
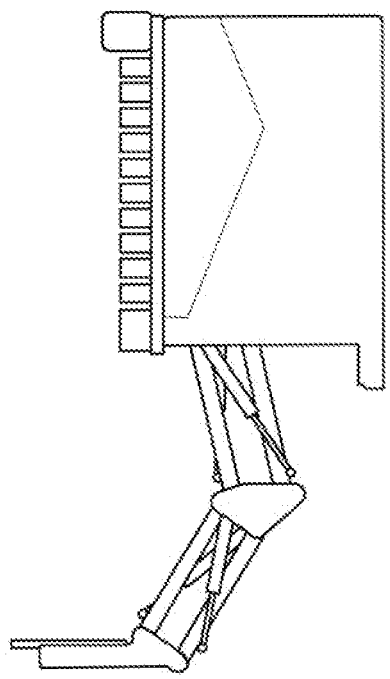
FIGS. 38A-38D illustrate some embodiment of the present invention, describing the device incorporating a mechanism to activate the spinal engine during ambulation.
Figure 38B:
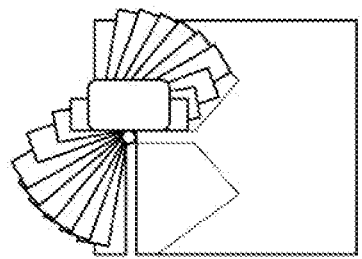
Figure 38C:
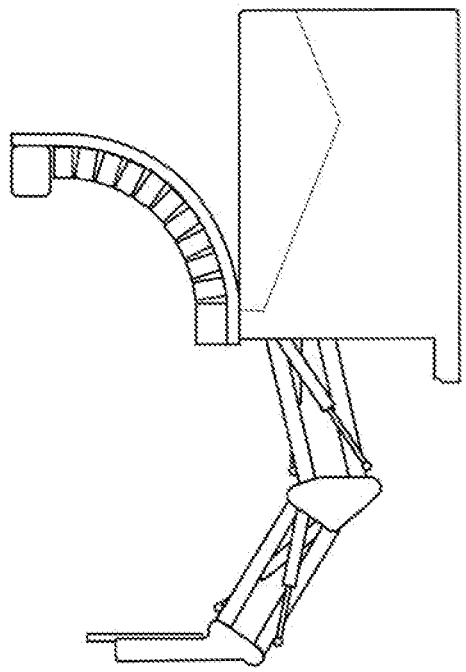
Figure 38D:
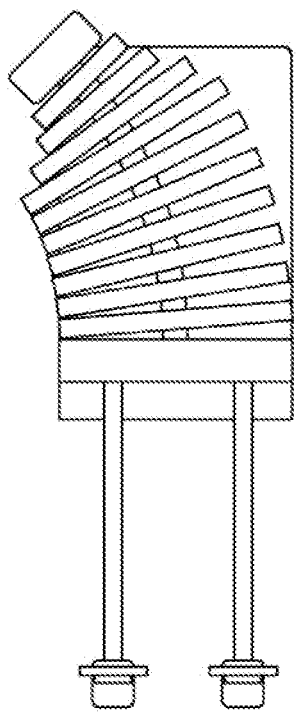

FIGS. 37A-37B illustrate embodiments of the present invention, showing an actual ambulatory environment and a virtual ambulatory environment, or virtual surface, as experienced by the user during device use. FIG. 37A shows an individual walking in a natural environment. FIG. 37B shows an individual on the device viewing a virtual ambulatory environment and walking through that environment while experiencing the same ground forces and physical impediments as experienced during actual ambulation.

FIG. 38 illustrates some embodiments of the present invention, describing the device 1 incorporating a mechanism to allow for activation of the spinal engine during ambulation. The device 1 incorporates a spinal mobility system to allow for functional spinal range of motion from a stable-pelvis perspective on three axes during device 1 use. FIG. 38A illustrates the maximum sagittal range of motion from a side view of the device 1. FIG. 38B illustrates a neutral stance from a side view of the device 1. FIG. 38C illustrates the maximum frontal range of motion from a top view of the device 1. FIG. 38D illustrates a maximum transverse range of motion from an end view of the device 1.

Figure 39B:
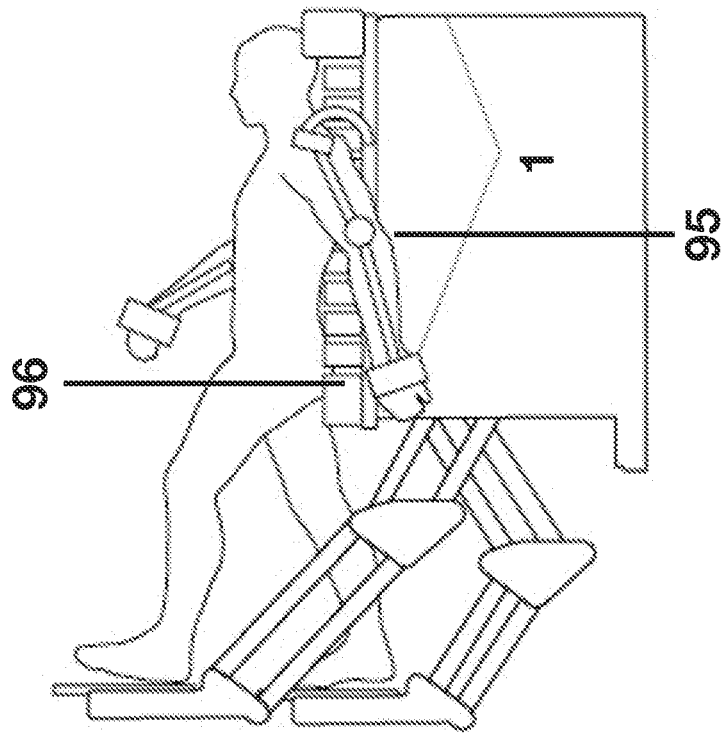
FIGS. 39A-39B illustrate some embodiment of the present invention, describing the device as a multiple-axes whole-body exercise system incorporating the arms and spinal engine into the lower extremity mechanism for the performance of functional and non-functional movements.
Figure 39A:
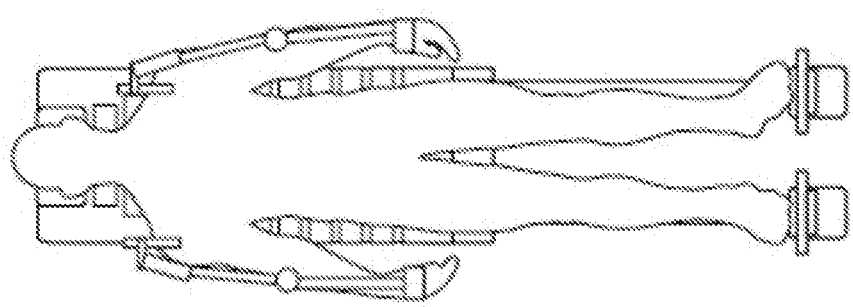

FIG. 39 illustrates some embodiment of the present invention, showing the device 1 as a multi-axes whole-body exercise system incorporating arm and torso performance of functional and non-functional movements. The device 1 incorporates the three axes (simplification of spinal movement) spinal mobility system (FIGS. 38A-38D) and mechanical arms to produce resistance throughout the functional ROM on or about seven upper extremity (per arm), three spine, and seven lower extremity (per leg) axes. A whole-body exercise system can be developed, allowing for functional whole-body exercise about these biomechanical axes. This alternative system will include the device 1, the spinal mobility system, and a fully articulate mechanical arm system 95 that attaches to the scapular section of the spinal engine and allows for complete ROM of the shoulders, arms, and wrists. The user's arms are supported by a contact point that wraps around the palmar and dorsal surfaces of the hand and a cuff that secures around the biceps. The head will be supported by a headrest 8 that is attached to the distal end of the spinal mobility system (FIGS. 38A-38D), and the spine will be supported by a series of horizontal cushion segments 96 that allow for natural spinal movement within functional ranges of motion.

Figure 40:
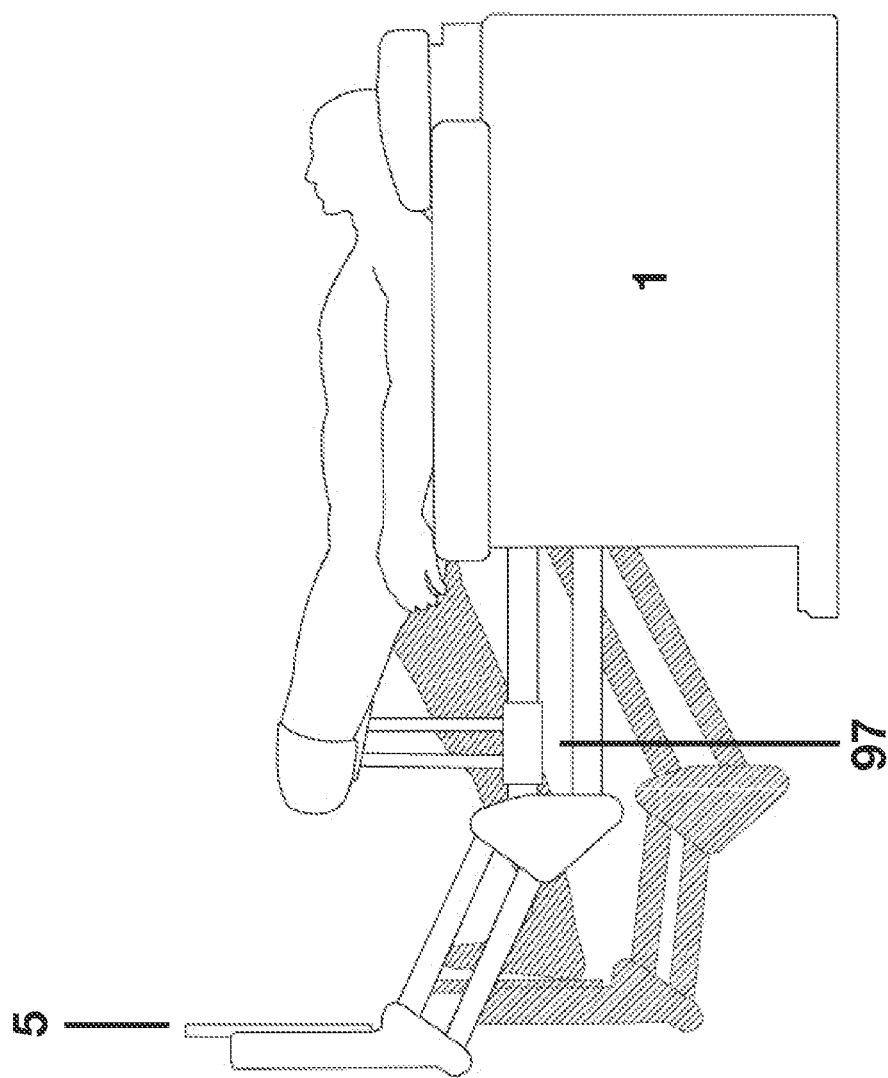
FIG. 40 illustrates some embodiment of the present invention, describing the device with limb positioning devices or splints for use by amputees or individuals unable to perform active resistance through contact with the footplate.

FIG. 40 illustrates some embodiments, showing the device 1 with limb positioning devices 97 or splints for use by amputees or individuals unable to perform active resistance through contact with the footplate 5. Attachments can be developed that allow for use by amputees or individuals whose feet cannot be used to provide resistance against the footplates 5 or for patients who use the device 1 primarily or partially as a passive motion device. Additional mechanical support may be placed on the upper or lower leg (i.e., positioning device or splint) for those with compromised biomechanics or who are incapable of active motion (i.e., due to amputation, brain trauma, stroke, neuromuscular disease, paralysis, unstable joints, or burns).

Figure 41:
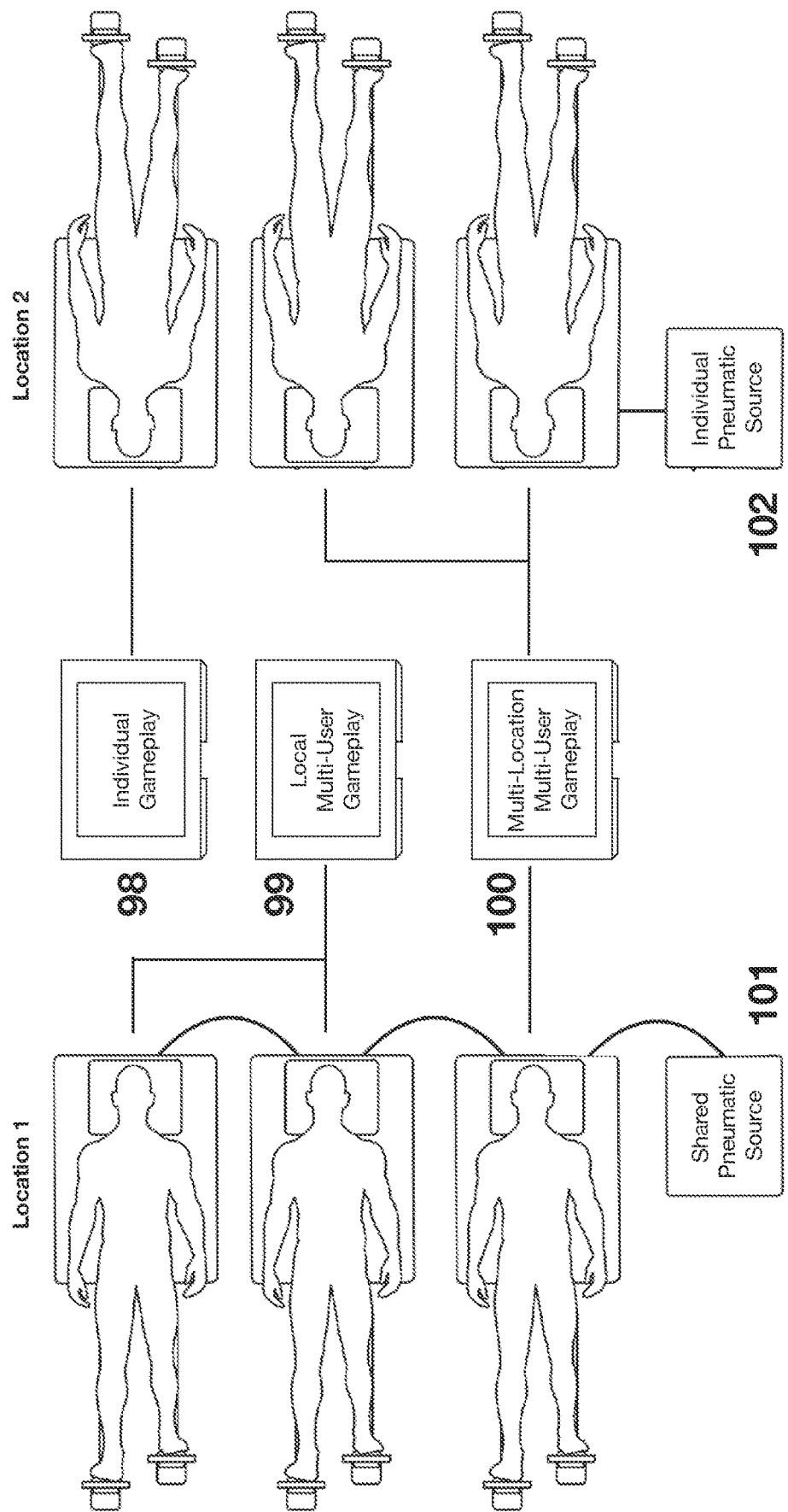
FIG. 41 illustrates some embodiment of the present invention, describing use as an exercise machine in a fitness center or athletic environment.

FIG. 41 illustrates some embodiments showing the device 1 as an exercise machine in a fitness center or athletic environment. The device 1 can be developed as a commercial exercise device placed in fitness centers and which interfaces with a user's wearable device or smart phone to enable access and to allow for tracking and monitoring of global ambulatory health and fitness. Some embodiments may incorporate user data such as heart-rate or oxygen levels to deliver an ambulatory session that adheres to specific cardiovascular requirements in order to promote optimal fitness. Users can exercise through individual gameplay 98, local multi-user gameplay 99, or multi-location multi-user gameplay 100. Local devices may share pneumatic sources 101 or feature individual pneumatic sources 102.

Figure 42:
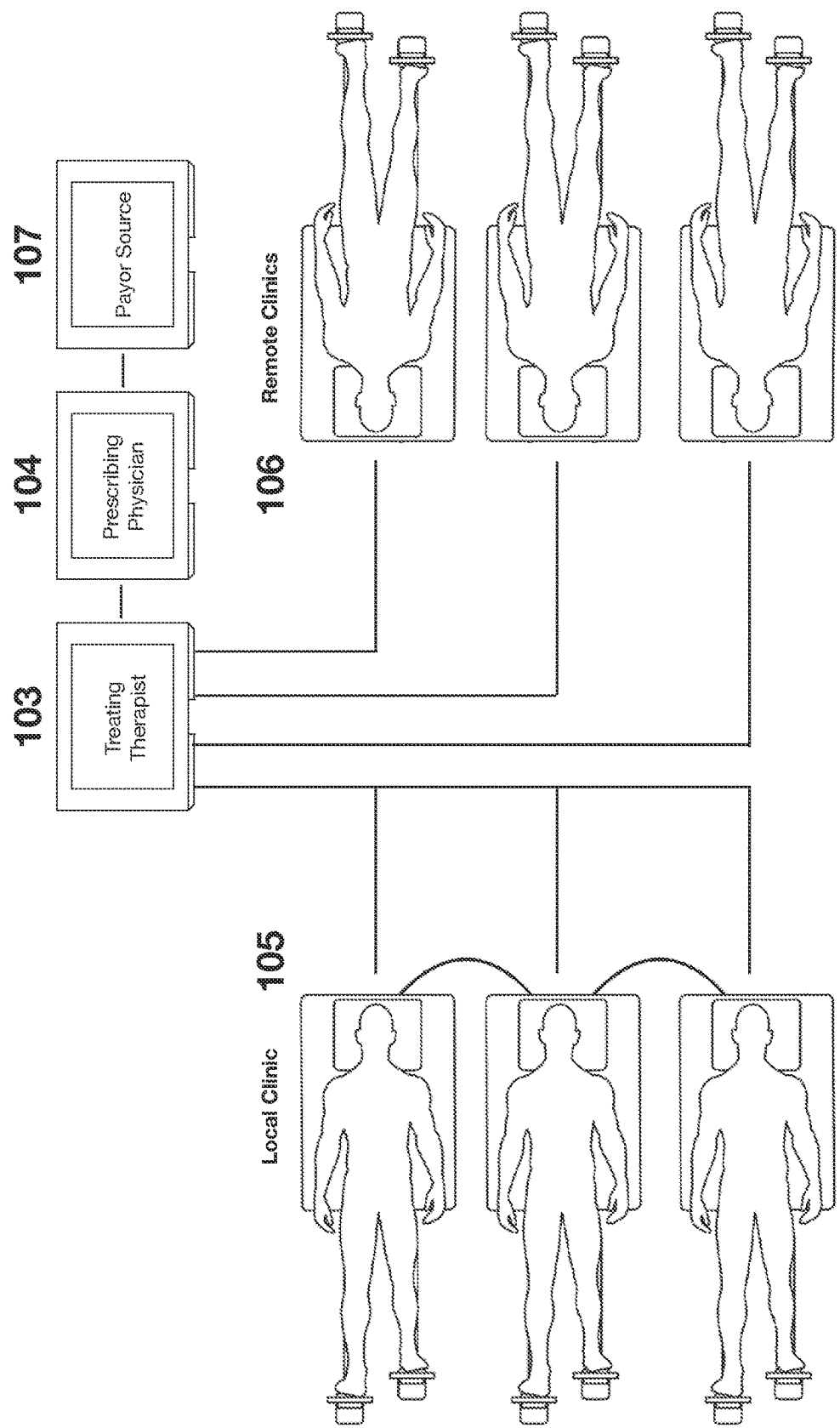
FIG. 42 illustrates some embodiment of the present invention, describing use as a rehabilitation machine in a clinical environment with local or remote clinical oversight.

FIG. 42 illustrates some embodiments showing use as a rehabilitation machine in a clinical environment with local or remote clinical oversight. The device 1 can be developed as a physical therapy device for use by patients under the supervision of a therapist 103 operating under physician 104 orders. One therapist can monitor the rehabilitation of multiple patients locally 105, remotely 106 or both. The therapist can remotely modify protocol in real-time in response to patient performance, and convey information to the prescribing physician, insurer 107, or other party in compliance with applicable HIPPA regulations. This approach allows for a much more efficient and efficacious use of therapy resources and a better means of evaluating the effectiveness of the rehabilitation regimen. Physicians may remotely modify, extend, or end the therapy prescription and insurers can extend or end authorization in response to subjective outcomes.

Figure 43:
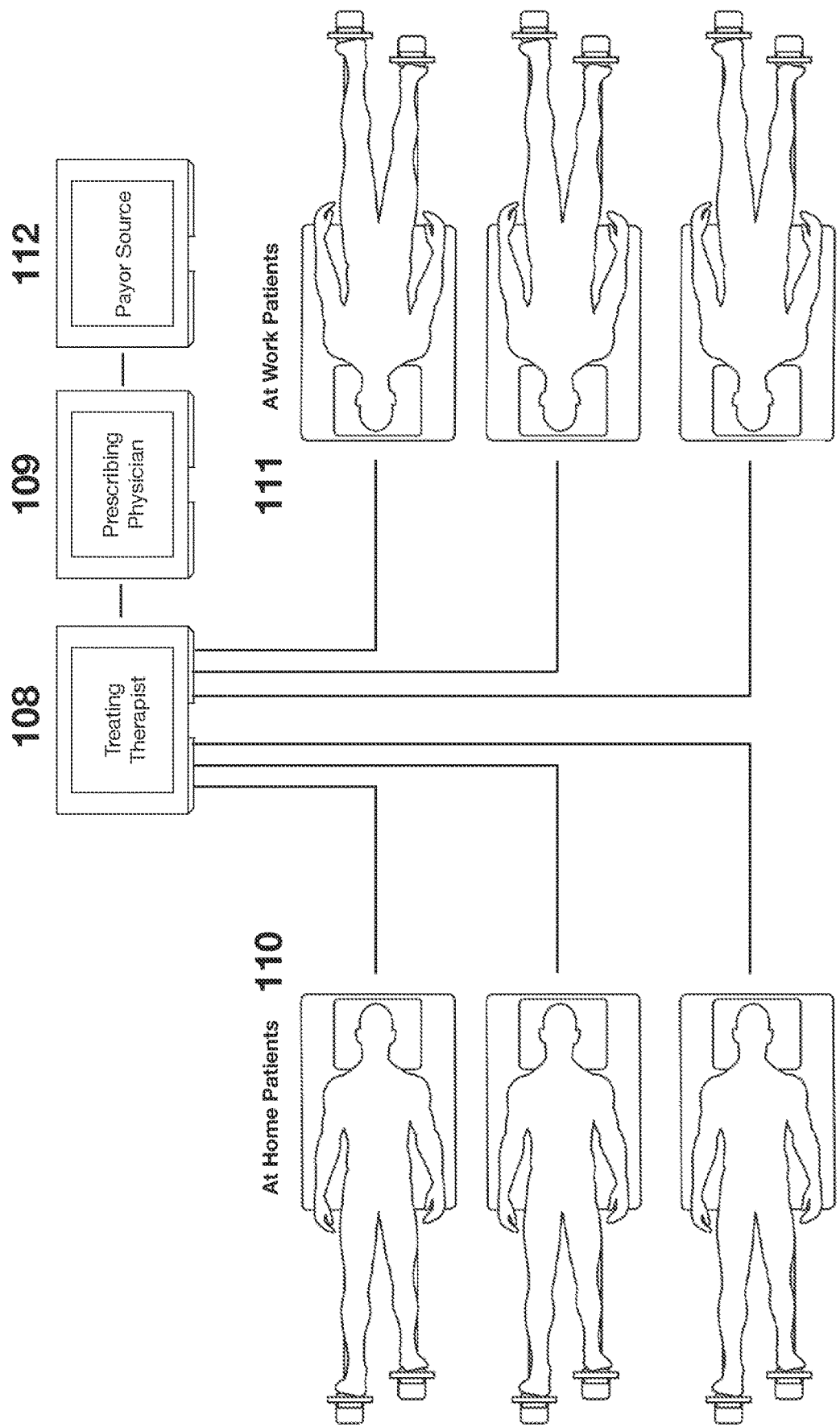
FIG. 43 illustrates some embodiment of the present invention, describing use as a home health device with remote clinical oversight.

FIG. 43 illustrates some embodiments showing the device 1 used as a home health or workplace device with remote clinical oversight. The device 1 can be developed as a home health device or workplace rehabilitation system for use by patients under the supervision of a therapist 108 operating under physician 109 orders. As illustrated in FIG. 43, one therapist can remotely monitor multiple patients who are using devices 1 in their homes 110 or at work 111. The therapist can make changes to protocol in real-time in response to patient performance. Results can be shared with the prescribing physician, insurer 112, or other party in compliance with applicable HIPPA regulations.

Figure 44A:
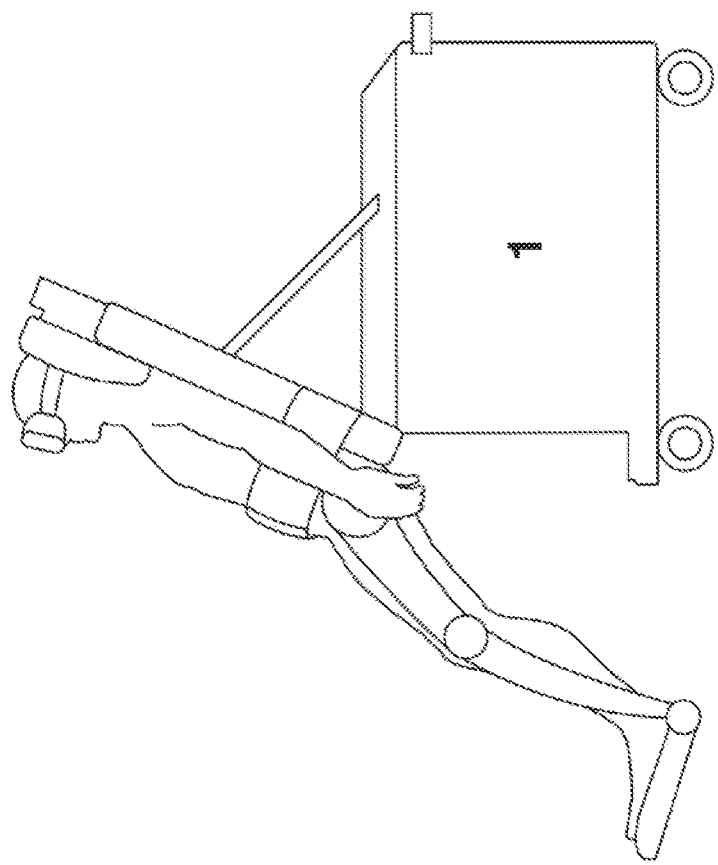
FIG. 44A-44B illustrates some embodiment of the present invention, describing use as a home fitness device with a tilt-to-recline ingress and egress capability.
Figure 44B:
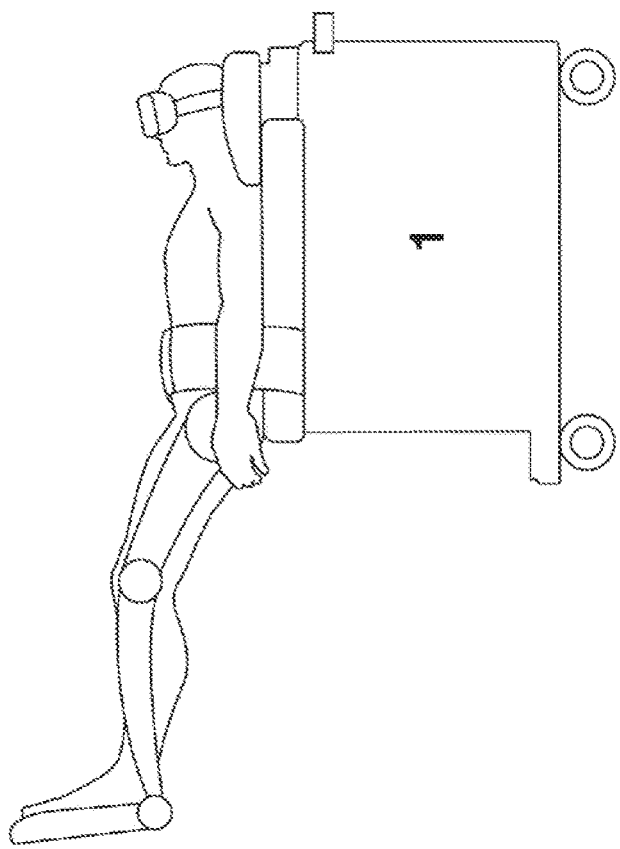

FIG. 44A-44B illustrate some embodiments showing use as a home fitness device with a tilt-to-recline ingress and egress capability. FIG. 44A illustrates the device 1 as a home fitness device that allows for stand-to-recline ingress and egress and a level of capability similar to some embodiments but with reduced resistance values and using less expensive construction techniques. FIG. 44B shows the device in use. Local or cloud-based gaming environments and a less industrial level of construction can be available.

Figure 45:
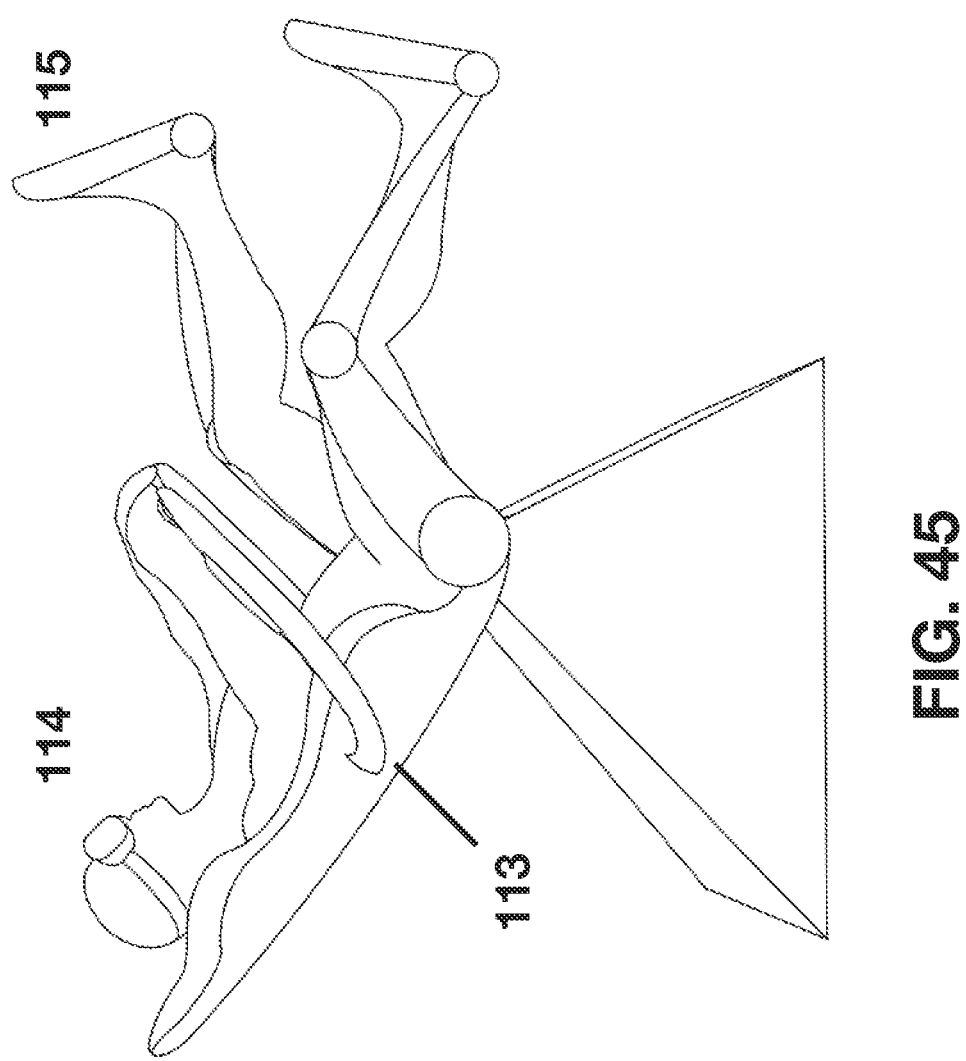
FIG. 45 illustrates some embodiment of the present invention, describing use as a gaming system.

FIG. 45 illustrates some embodiments showing use as a gaming system. An inexpensive gaming chair 113 version of the device 1 with a simple resistance mechanism (such as elastomeric cords and a cable-drive system) and software running on the existing game platforms can serve to improve cardiovascular fitness and ambulatory strength and ROM, without necessarily addressing the full spectrum of ambulatory requirements. Multiple device-specific games can be designed for current or future game platforms that satisfy global ambulatory objectives or are tailored to address performance improvement and injury prevention goals related to specific sports or activities. The gaming system is foot-operated as the software can run on standard virtual reality gaming systems 114 with games adapted to be driven by functional foot-level controllers 115. The gaming system also provides a virtual surface on which the user simulates ambulatory or non-ambulatory functions. Such a system, while not satisfying all ambulatory requirements, can provide many of benefits of the present invention by providing static or progressive resistance throughout the ambulatory cycle about all seven lower extremity biomechanical axes, while maintaining a perpendicular position relative to the longitudinal axis of the users' upper body, and real-time feedback to correct and promote functional motion patterns during gameplay.

Some embodiments can feature a lower-priced, consumer, molded plastic chair base or gaming chair 113 instead of a cabinet. The chair 113 can feature lightweight construction, tilt to recline access, and a simplified alternative resistance mechanism. This version's molded plastic, articulated cable-driven legs feature interchangeable elastomeric bands for user adjustable progressive resistance on all planes. Some embodiments would feature 3D positional monitoring of footplate 5 position and movement and would wirelessly communicate this information to a VR headset, game console, computer, or cloud-based system that runs specialized games. The software can operate on existing VR headsets 114 and current or future gaming systems that are adapted to allow foot-level control 115 in place of or in addition to traditional game controllers.

Figure 46:
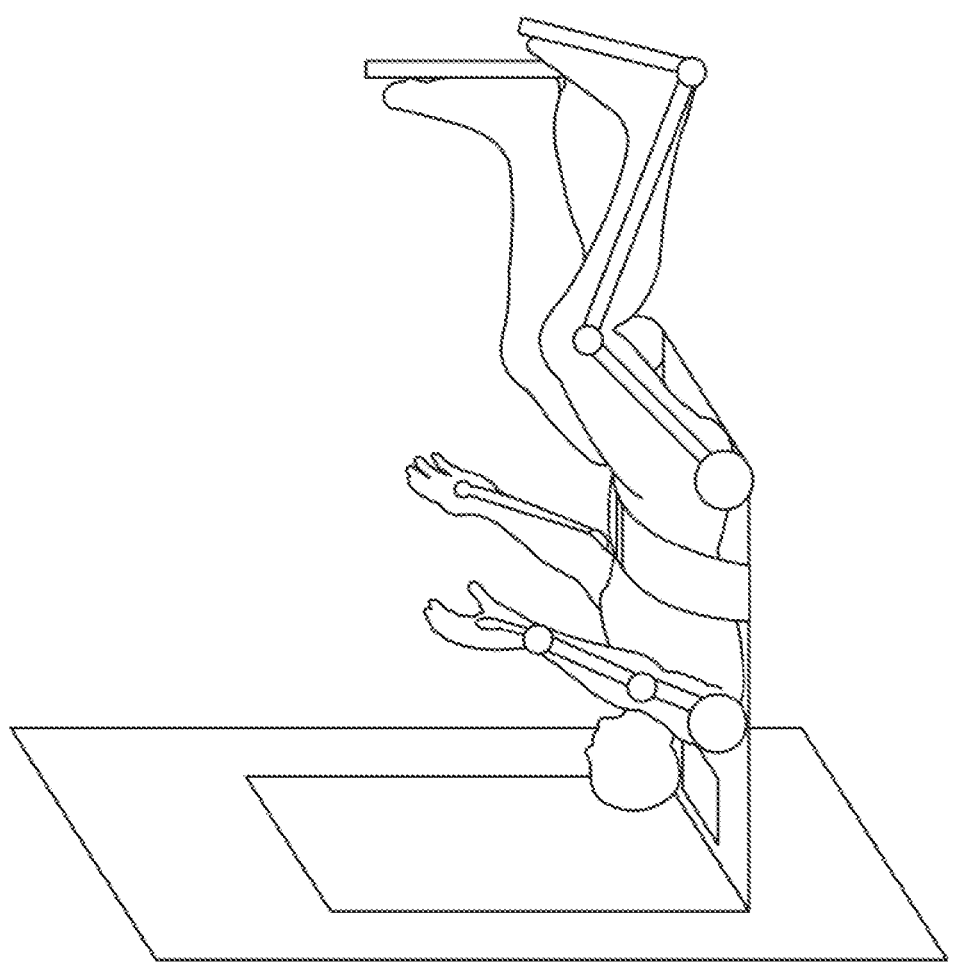
FIG. 46 illustrates some embodiment of the present invention, describing use to maintain musculoskeletal and ambulatory health in low gravity environments, such as outer space or on another celestial body.

FIG. 46 illustrates some embodiments showing use to maintain musculoskeletal health in low gravity environments, such as outer space or on another celestial body. FIG. 46 shows the device 1 can be developed to provide resistance and simulate GRFVs in low-gravity environments, such as on a space station or during interplanetary flight. Since some embodiments create artificial gravity, the device 1 would aid the retention of bone density and promote ambulatory health and fitness in low gravity environments, providing numerous health and fitness benefits to space travelers, while minimizing storage requirements.

Figure 47B:
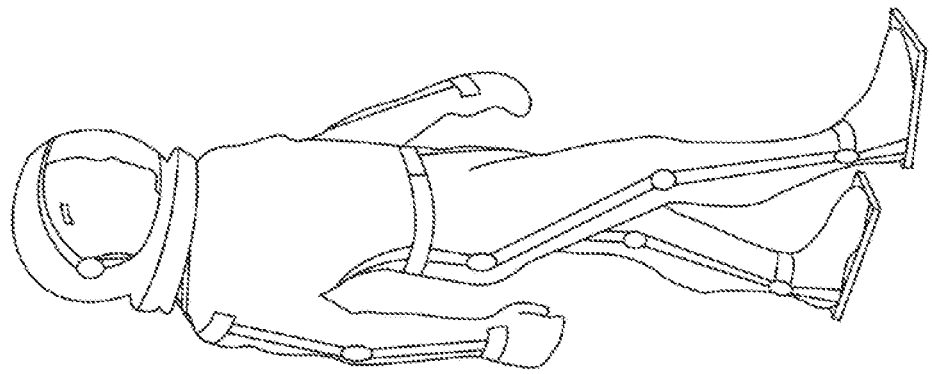
FIGS. 47A-47B illustrates some embodiment of the present invention, describing use as a whole-body joint loading exoskeleton for use during ambulation while exercising or in a low-gravity environment.
Figure 47A:
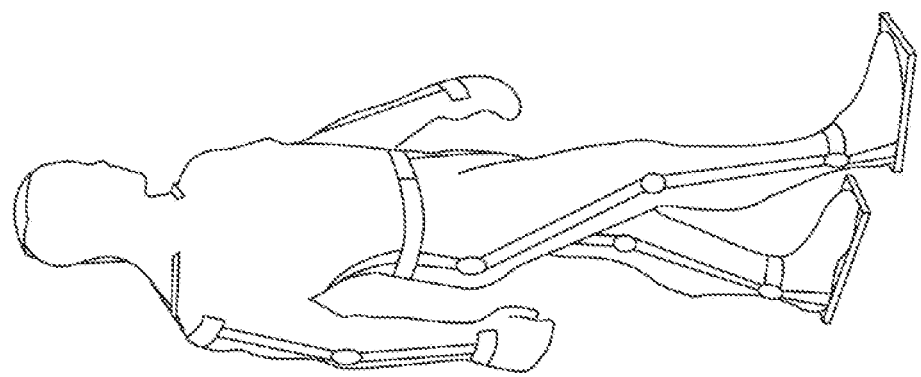

FIGS. 47A-47B illustrate some embodiments showing wearable devices designed to maintain musculoskeletal health in low gravity environments, such as outer space or on another celestial body. FIG. 47A shows a device worn in a low gravity environment with an atmosphere, and which provides joint-loading, functional developed resistance, and simulated GRFVs in low-gravity environments, such as on a space station or during interplanetary flight. FIG. 47b shows a similar device incorporated into a pressurized suit that also provides an artificial atmosphere. Since some embodiments create artificial gravity, they would aid the retention of bone density and promote ambulatory health and fitness in low gravity environments, providing numerous health and fitness benefits to space travelers.

Figure 48:
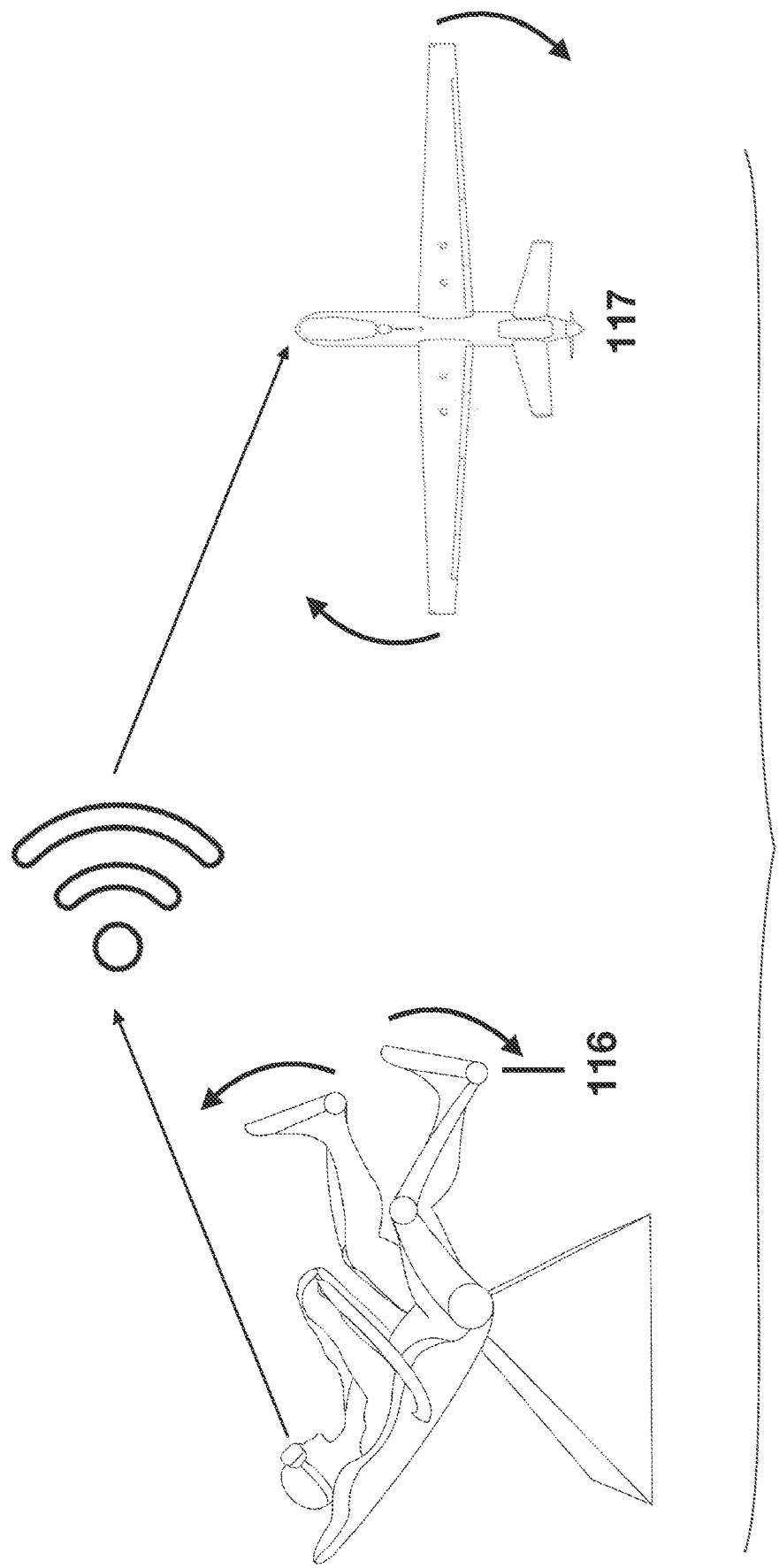
FIG. 48 illustrates some embodiment of the present invention, describing use of the device as a foot controller incorporated into search and rescue, industrial, or military equipment.

FIG. 48 illustrates some embodiments showing use of the device 1 as a foot controller 116 for rescue, industrial or military equipment 117. Some embodiments of the device can be developed for remote control of rescue, industrial, military, or other applications (i.e., alternative control mechanism for aircraft, heavy equipment, military hardware). The foot controller can be used as a controller for devices in hazardous or remote locations while keeping the hands free to perform other functions (i.e., rescue operations, drones, mining equipment, spacecraft or planetary exploration, or police/military robotics).

Figure 49:
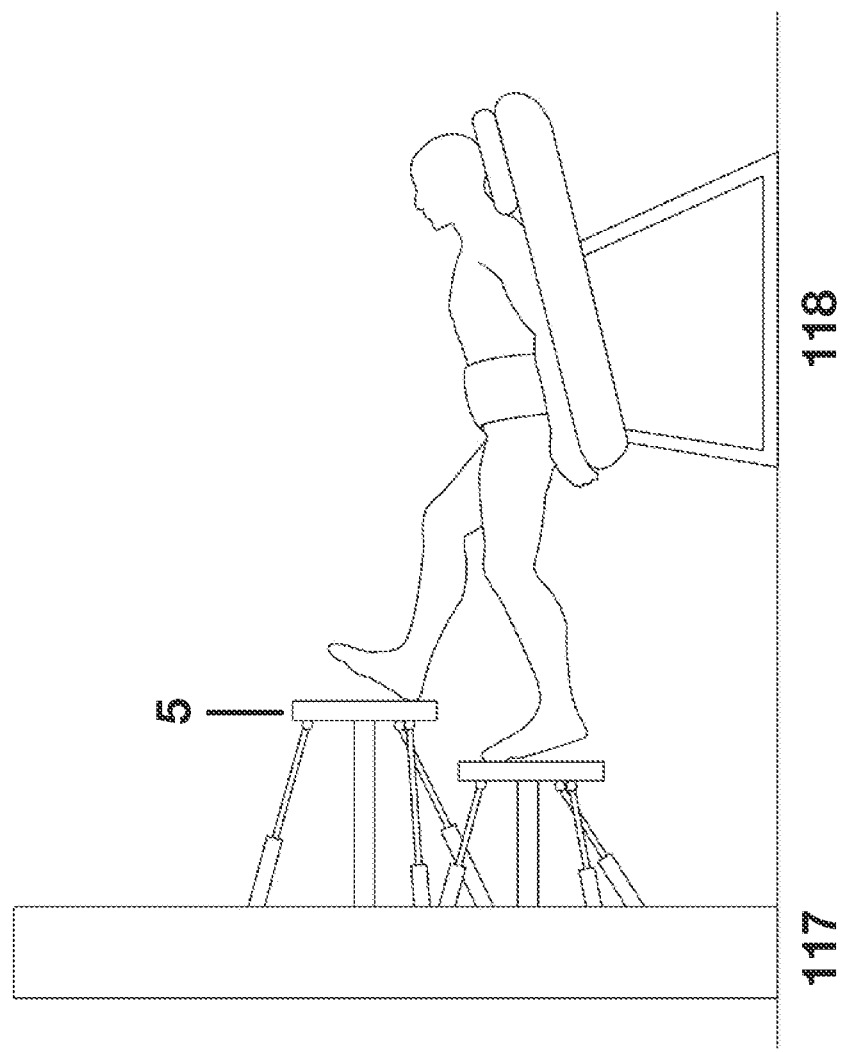
FIG. 49 illustrates some embodiment of the present invention, describing a resistance mechanism aligned with but not physically connected to the user positioning system.

FIG. 49 illustrates some embodiments showing a resistance mechanism 117 aligned with but not physically connected to the user positioning system 118. The device 1 can be developed with the resistance mechanism and footplates 5 located remotely from the main cabinet 2 or chair, such as in a resistance wall where users are seated in a free-standing chair or cabinet.

FIGS. 50A-50B illustrate some embodiments showing use in a vertical orientation 119 where the user stands on the footplates 5. FIG. 50A shows a side view of the device 1 with a vertical (standing) orientation where footplate 5 angulations and sagittal/frontal resistance can be applied to simulate various 3D environments, but do not reduce gravity. FIG. 50B shows the same device from an end view. The user stands on variable angle footplates 5 with a stable pelvis. Other variations can feature vertical or supine/reclined devices allowing for free pelvic movement.

Figure 51A:
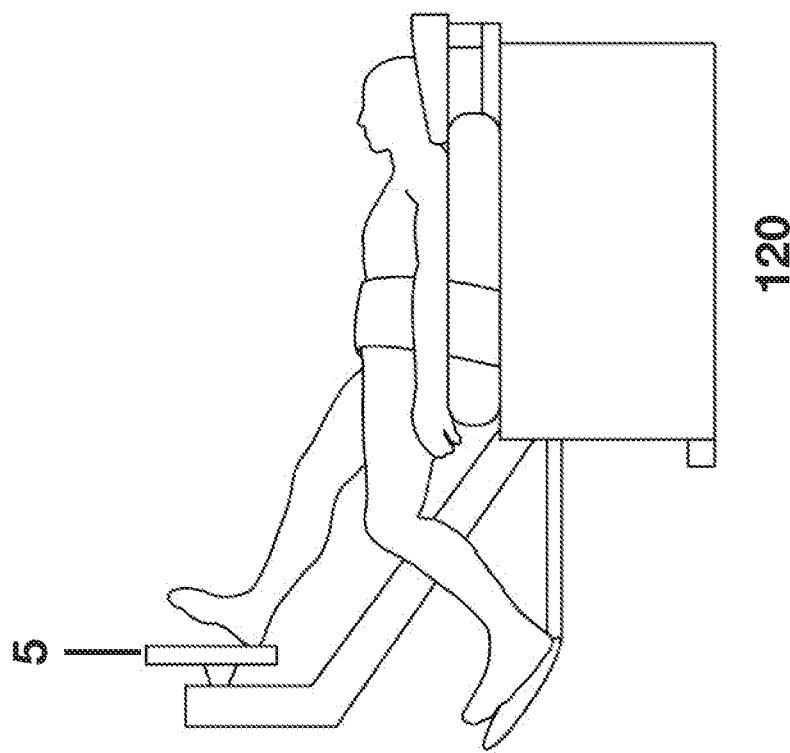
FIG. 51A-51B illustrate some embodiment of the present invention, describing an alternating single-leg machine.
Figure 51B:
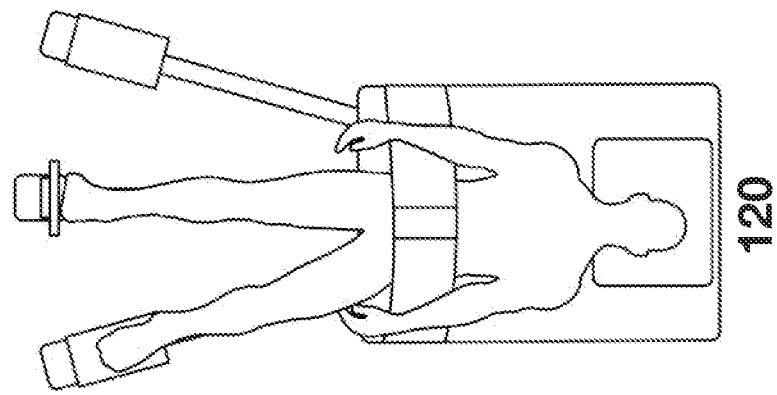

FIG. 51A-51B illustrate some embodiments showing an alternating single-leg machine 120. The user exercises one leg at a time with alternate leg positioned on a fixed footplate 5. Some embodiments can comprise a leg with telescoping sections and fully-motorized footplate positioning. The alternating single-leg machine 120 can be developed as a single-leg exerciser that can alternate between left and right leg control. This or any version of the device 1 may use a three-plane footplate positioning system (i.e., controlled directly by motors, by pneumatic cylinders, or by motors via cable drive) on all planes, instead of the default parallelogram configuration. Other sources of resistance mechanism may also be used (i.e., engines, electric motors, hydraulic loops, elastomeric cords, springs, suspended weights, other force generating devices, or some combination thereof).

The user experience is encompassed in the performance of numerous software routines. For example, upon powering on the device 1, the footplates 5 are moved into in a default position that allows for safe ingress and egress. Upon ingress to the device 1, the user will use the step to sit on the edge of the device's seating surface 7 and then secure their feet to the footplates 5. The user reclines on the surface 7, adjusts the headrest 8 and hand grips 9, and fastens the pelvic positioning device 10 if needed in order to stabilize the hips at the edge of the cushion 7. The cushion 7 provides support for the spine, shoulders, and arms while allowing for free and full movement of the legs within the limits of functional ambulatory ROM. The user initiates the exercise session and grasps the hand grips 9 to further assist upper body stabilization. All lower extremity motions are made relative to the stable pelvis and are monitored through the device's sensors. Upon selection, the exercise session will be initiated, and pressure generated by an external air compressor 36 and fed to the storage tank 27 is directed to actuate the pneumatic cylinders 14 that provide resistance to leg movements. The upper and lower leg pneumatic cylinders 14 are engaged to lift the legs to a simulated standing position, while pulling the footplate 5 towards the body. By applying plantar forces against the footplate 5, simulated gravity is counteracted independently by each leg, and the joint complexes are loaded. The user is now in a neutral stance similar to standing. The user then follows commands (visual or audible), and resistance is applied to the plantar surface of the foot through a footplate 5 that moves freely within functional ambulatory stance ROM on the sagittal, frontal and transverse planes.

The footplate 5 maintains a position perpendicular to the longitudinal axis of the body throughout functional ROM, creating a virtual surface over which the user simulates ambulation. The ground-effect footplate 5 can be programmed to create a stable ambulatory environment, or to safely mimic a variety of GRFVs over diverse ambulatory environments, such as walking on sand or concrete. The device 1 provides dynamic/variable resistance over all planes and in all dimensions and also provides real-time feedback and guidance of ambulatory mechanics throughout functional gait and running cycle ROMs. For example, first-time users will be directed to perform an assessment routine which uses 3D leg movements to control 2D and 3D movement of an on-screen avatar to assess ambulatory health and fitness. Each leg will be assessed individually, and then the two legs will be assessed collaboratively. The user will be directed to complete a cycle by moving their foot in order to follow an onscreen 2D path with minimal resistance and within set movement boundaries and time constraints. Upon successfully completing a pattern, a more challenging pattern will be presented (i.e., by increasing resistance or ROM, introducing 3D patterns, decreasing time allocated to the task, or some combination thereof). Once the user is unable to accomplish a level, the process will be repeated for the other foot. Using the results of the single leg tasks to determine ROM and force settings, a similar set of bilateral tasks will be performed that require coordinated foot movements.

The user's ability to follow these paths against resistance will determine their baseline ambulatory speed, strength, control, and ROM, and a visual image will be generated and displayed illustrating their global ambulatory health and fitness. Protocols will be developed in order to address specific performance improvement or injury prevention objectives (i.e., improving speed, increasing strength, or preventing injuries). Users may select pre-programmed exercises to accomplish specific goals, and these protocols are automatically adapted to their kinematic and performance profile. In some embodiments, the protocol will be developed to conduct patient assessments for the purpose of diagnosis or rehabilitation of certain lower extremity injuries, or to identify strength, control or ROM issues. If the user is a patient performing physical therapy, the therapist may select an appropriate pre-programmed protocol, or may create a custom protocol using VPEs. On subsequent use the user can enter their username or can be automatically identified. Based on the user's profile, the machine will automatically size the device to fit the user, display their exercise history, and provide exercise options. Once situated on the device, the user can select to continue a previous session or to select an alternative game or program. Each game's performance parameters are adapted to reflect historical performance. A warm up cycle is performed prior to a new session. By playing a series of games over artificial ambulatory surfaces that require increasing levels of strength, ROM, speed, and control, the user develops functional global ambulatory strength or accomplishes specific performance objectives, with session results and analysis automatically communicated to the user, therapist, physician, insurer, or other party, as appropriate.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A lower extremity exercise system that creates virtual gravitational and virtual inertial performance environments with simulated ground reaction force vectors that substantially replicate or substantially modify external forces experienced during ambulation, the exercise system comprising:
- a surface that stabilizes a pelvis of a user in a horizontally fixed pelvis position, the surface connected to or positioned in opposition to a footplate which delivers resistance on three planes against which a user reacts with plantar force to perform functional or nonfunctional movement patterns; and
- the footplate provides simulated gravitational values and inertial values of the external forces, wherein the simulated gravitational values and the inertial values are varied to substantially mimic multiple lower extremity performance environments, including gravitational environments, and ambulation modes and speeds in a manner substantially similar to ambulation; wherein moments of force are created about all seven lower extremity biomechanical axes.

2. The lower extremity exercise system of claim 1, wherein the footplate maintains a consistent angular position on a frontal plane and a sagittal plane relative to a longitudinal body axis.

3. The lower extremity exercise system of claim 1, wherein the footplate varies its angular position on the frontal plane and the sagittal plane relative to the longitudinal body axis.

4. The lower extremity exercise system of claim 1, wherein the resistance on three planes is delivered by the footplate to a plantar surface of a foot.

5. The lower extremity exercise system of claim 1, wherein the plantar force against the footplate creates simulated ground reaction force vectors and moments of force that initiate functional kinetic chains as it moves along functional kinematic patterns.

6. The lower extremity exercise system of claim 1, wherein the plantar force against the footplate as it moves along non-functional kinematic patterns creates ground reaction force vectors and moments of force that initiate non-functional kinetic chains.

7. The lower extremity exercise system of claim 1, wherein the plantar force against the footplate creates functional plantar rocking as it moves along functional kinematic patterns.

8. The lower extremity exercise system of claim 1, wherein plantar force against the footplate creates non-functional plantar rocking as it moves along non-functional kinematic patterns.

* * * * *